(12) United States Patent
Taylor

(10) Patent No.: US 10,333,154 B2
(45) Date of Patent: Jun. 25, 2019

(54) SOLID OXIDE FUEL CELL BUNDLE ASSEMBLY WITH INSULATION END PIECES AND TILT PAD TIE DOWN CLAMP

(71) Applicant: PITTSBURGH ELECTRIC ENGINE, INC., Mount Pleasant, PA (US)

(72) Inventor: Owen S. Taylor, Mount Pleasant, PA (US)

(73) Assignee: Pittsburgh Electric Engines, Inc., Mount Pleasant, PA (US)

( * ) Notice: Subject to any disclaimer, the term of this patent is extended or adjusted under 35 U.S.C. 154(b) by 699 days.

(21) Appl. No.: 14/775,881

(22) PCT Filed: Mar. 17, 2014

(86) PCT No.: PCT/US2014/030621
§ 371 (c)(1),
(2) Date: Sep. 14, 2015

(87) PCT Pub. No.: WO2014/145795
PCT Pub. Date: Sep. 18, 2014

(65) Prior Publication Data
US 2016/0020472 A1    Jan. 21, 2016

Related U.S. Application Data

(60) Provisional application No. 61/800,804, filed on Mar. 15, 2013, provisional application No. 61/801,806, filed on Mar. 15, 2013.

(51) Int. Cl.
*H01M 8/243* (2016.01)
*H01M 8/248* (2016.01)
(Continued)

(52) U.S. Cl.
CPC ......... *H01M 8/004* (2013.01); *H01M 8/0247* (2013.01); *H01M 8/0271* (2013.01); *H01M 8/04022* (2013.01); *H01M 8/04097* (2013.01); *H01M 8/243* (2013.01); *H01M 8/248* (2013.01); *H01M 8/249* (2013.01); *H01M 8/2475* (2013.01); *H01M 8/0206* (2013.01); *H01M 2008/1293* (2013.01)

(58) Field of Classification Search
None
See application file for complete search history.

(56) References Cited

U.S. PATENT DOCUMENTS 4,827,606 A    5/1989    Szreders et al.
4,894,297 A    1/1990    Singh et al.
(Continued)

FOREIGN PATENT DOCUMENTS

JP    2009238651 A    10/2009
WO    WO2005/091417 A2    9/2005

*Primary Examiner* — Barbara L Gilliam
*Assistant Examiner* — Helen M McDermott
(74) *Attorney, Agent, or Firm* — Goodwin Procter LLP

(57) ABSTRACT

A fuel cell assembly of one or more fuel cell bundles, wherein each fuel cell bundle comprises an array of elongated tubular fuel cells, comprising: an oxidant supply system; a fuel supply system; a fuel reformation system; and a support structure for integrating as a bundle said elongated tubular fuel cells, said oxidant supply system, said fuel supply system, and said fuel reformation system; a first row of spaced apart, elongated tubular fuel cells; wherein said support structure comprises: a base plate; a plurality of upper insulation end pieces (UIEPs) surrounding a top of the fuel cell assembly to produce a top assembly, wherein each upper insulation end piece has a top surface, a side portion and a beveled portion disposed between the top surface and the side portion to produce a beveled shoulder around the top assembly; a top clamp having a beveled inner surface complementary to the beveled shoulder that interfaces against a plurality of pivot pads disposed on the beveled shoulder when the top clamp is tensioned against the top assembly.

18 Claims, 35 Drawing Sheets

(51) Int. Cl.
*H01M 8/249* (2016.01)
*H01M 8/00* (2016.01)
*H01M 8/2475* (2016.01)
*H01M 8/0247* (2016.01)
*H01M 8/04014* (2016.01)
*H01M 8/04089* (2016.01)
*H01M 8/0271* (2016.01)
H01M 8/124 (2016.01)
H01M 8/0206 (2016.01)

(56) References Cited

U.S. PATENT DOCUMENTS

| | | | |
|---|---|---|---|
| 6,379,831 | B1 | 4/2002 | Draper et al. |
| 6,461,756 | B1 | 10/2002 | Blanchet et al. |
| 8,163,433 | B2 | 4/2012 | Zafred et al. |
| 2005/0208363 | A1* | 9/2005 | Taylor ............... H01M 8/0625 429/423 |
| 2008/0038622 | A1* | 2/2008 | Valensa ............... H01M 8/2475 429/420 |
| 2008/0102345 | A1* | 5/2008 | Andreas-Schott .......................... H01M 8/2475 429/470 |
| 2009/0317688 | A1* | 12/2009 | Inagaki ............... H01M 8/248 429/465 |
| 2011/0039180 | A1* | 2/2011 | Kading ............... H01M 8/2465 429/454 |
| 2011/0045372 | A1 | 2/2011 | Zafred et al. |
| 2011/0045373 | A1 | 2/2011 | Gillett et al. |
| 2011/0318658 | A1 | 12/2011 | Taylor et al. |

\* cited by examiner

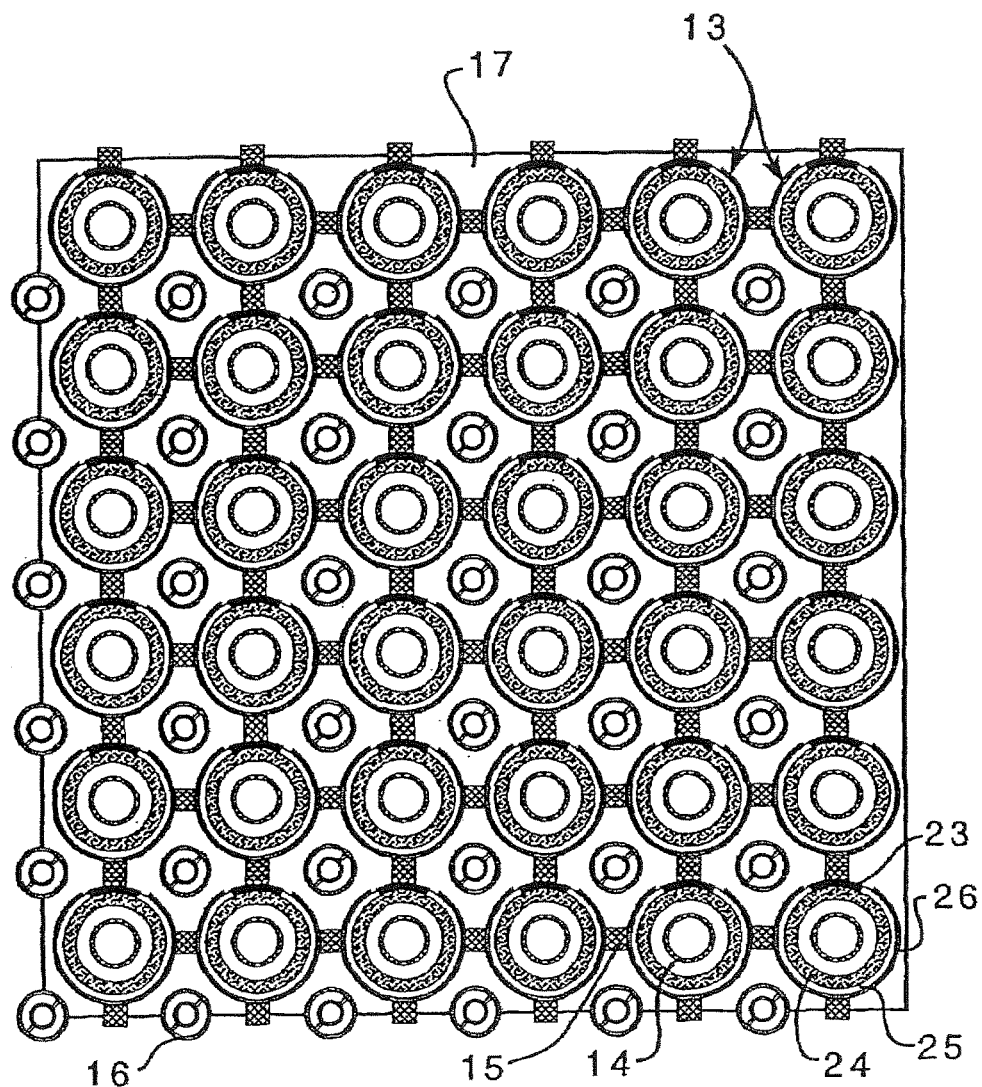
Figure 6-B

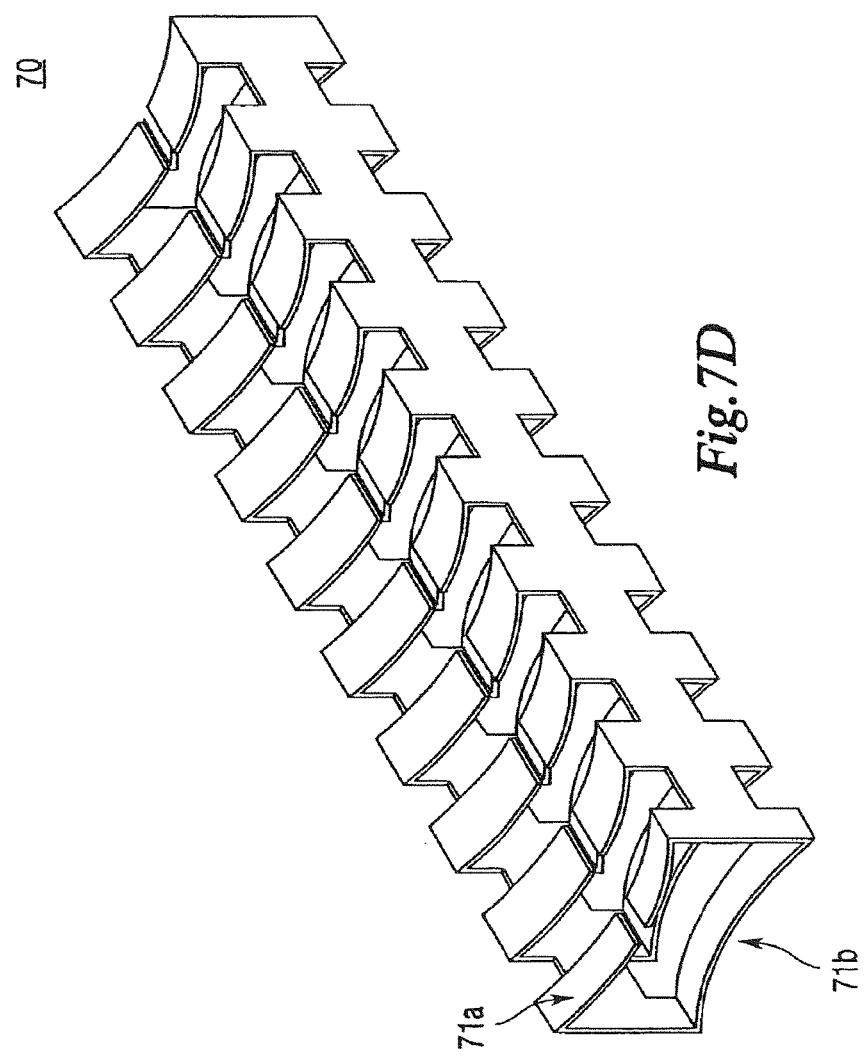

SOLID OXIDE FUEL CELL BUNDLE ASSEMBLY WITH INSULATION END PIECES AND TILT PAD TIE DOWN CLAMP

CROSS REFERENCE TO RELATED APPLICATIONS

This application is a U.S. national stage application under 35 U.S.C. § 371 of International Application No. PCT/US2014/30621, filed on Mar. 17, 2014, which claims priority to, and the benefit of, U.S. Patent Application Nos. 61/801,806 and 61/800,804, both filed on Mar. 15, 2013, each of which is hereby incorporated by reference in its entirety for all purposes.

This invention was made with government support under Contract Nos.: DAAE07-01-9-0002; W56HZV-07-C-0656 and W56HZV-10-C-0475 awarded by the U.S. Army, TACOM. The government has certain rights in the invention.

TECHNICAL FIELD OF THE INVENTION

The present invention relates generally to fuel cells and more particularly to a multi-function fuel cell bundle having all of the basic support functions integrated therein.

BACKGROUND

Internal combustion engines have evolved to the point where advancements are not effective because of fundamental limitations in the basic technology. Several technologies (e.g., electric engines, hydrogen engines, gas/electric hybrid engines, fuel cell engines, etc.) have been proposed as possible substitutes for the internal combustion engine. Of the proposed technologies, fuel cells perhaps offer the most attractive solution for replacing the internal combustion engine. In addition to increased efficiency and decreased pollution, fuel cells are capable of using the same fuel sources (e.g., gasoline, diesel, natural gas, etc.), and thus existing fuel distribution networks, that are currently used by the internal combustion engine. Therefore, conversion to fuel cells is a more cost effective solution than the other proposed technologies.

A fuel cell combines fuel and air in an electrochemical reaction that produces both electricity and heat. Typically, a fuel cell is comprised of an electrolyte sandwiched between two electrodes (i.e., positive and negative terminals). The electrodes have pores that allow fuel, air, and reaction products to flow with minimal flow resistance. The electrodes are good electrical conductors (i.e., have minimal resistance) and may also act as catalysts to increase the rate of the electrochemical reaction within the fuel cell.

Fuel cells are typically classified according to the type of electrolyte employed. For example, proton exchange membrane fuel cells (PEMFC) typically use synthetic polymers as an electrolyte, phosphoric acid fuel cells (PAFC) use a phosphoric acid (similar to a car battery), molten carbonate fuel cells (MCFC) typically use a molten alkali carbonate of potassium hydroxide solution, and solid oxide fuel cells (SOFC) typically use a solid ceramic made mostly of zirconia.

The type of fuel used by a fuel cell may vary. Generally, the fuel can be any substance that is capable of being reacted with oxygen (i.e., burned) and is capable of flowing through the porous electrode structure. Gaseous hydrogen is typically the most desirable fuel for use within fuel cells. Because gaseous hydrogen is somewhat difficult and dangerous to transport, however, an adequate fuel distribution system is not currently available for gaseous hydrogen. Distribution systems do exist, however, for common hydrocarbon fuels such as natural gas, gasoline, and diesel. These fuels are composed of particular combinations of hydrogen and carbon (hence the name "hydrocarbon"). Gaseous hydrogen can be extracted from these hydrocarbon fuels for use by a fuel cell through a process called reformation.

Reformation generally refers to the conversion of common hydrocarbon fuel into a different form. One common type of reformation that is employed is known as steam reformation. During steam reformation, water is heated to a high temperature to form steam which is then mixed with the hydrocarbon fuel. The water/steam ($H_2O$) provides a source of oxygen that combines with the carbon in the hydrocarbon, to form $CO_2$ and CO. Thus, the reformation process produces $CO_2$, CO, and hydrogen. Although most of the hydrogen is supplied by the hydrocarbon, a significant portion may come from the water/steam.

The fuel reformation process may be divided into two parts: partial reformation and final reformation. Partial reformation represents breaking down (reforming) a long chain hydrocarbon fuel to a first level. Final reformation represents breaking down (reforming) the particular compound formed by partial reformation to a final reformed fuel.

The distinction between partial and final reformation can be made due to the way the two parts of the reformation process are carried out. Partial reformation is typically performed by a partial reformer which employs a bed of suitable catalyst material such that the rate of heat absorbed by the reforming fuel mixture does not exceed the level at which carbon will precipitate (i.e., so coking does not occur). Final reformation is typically performed by a final reformer which has no heat transfer limitations and can therefore absorb heat at high rates without precipitating carbon (i.e., without coking).

Although fuel cells offer a promising alternative to internal combustion engines, the application of fuel cell technology to create a viable fuel cell engine has proven to be very difficult. Each type of fuel cell has inherent limitations which impede its adaptation for use as an alternative to the internal combustion engine. For example, PEMFC's and PAFC's are classified as low-temperature fuel cells because they operate at approximately 180 degrees Fahrenheit and 360 degrees Fahrenheit, respectively. At these temperatures, the PEMFC and PAFC engines require separate, external hydrocarbon fuel reformation equipment to supply reformation heat to the fuel. Typically, the reformation heat is extracted directly from the fuel, thus reducing engine efficiency. Furthermore, the additional weight and space needed to house the external reformation system make PEMFC and PAFC engines impractical as replacements for internal combustion engines.

In contrast, SOFCs operate at approximately 1800 degrees Fahrenheit and are classified as high temperature fuel cells. SOFCs are capable of providing their own reformation heat. The reformation heat can be efficiently extracted from the SOFCs exhaust, or through convection and/or radiation from the cell itself, thus offering improved efficiency over PEMFC and PAFC engines and eliminating the need for external reformation systems. Accordingly, SOFCs are more promising than PEMFC and PAFC engines for replacing the internal combustion engine.

Typical SOFCs are constructed in either a tubular or planar configuration. In a planar configuration, the electrolyte is sandwiched between two electrode "plates." An inherent problem with the planar configuration is that, near the edges of the plates, the reactants (fuel and air) are in close proximity to each other without an electrolyte material to prevent the reactants from chemically combining (as opposed to electrochemically combining through the electrolyte). Thus, the planar configuration requires sophisticated edge seals to prevent the reactants from chemically combining.

The tubular configuration eliminates the need for sophisticated edge seals. In a simplified example, a tubular SOFC is formed by rolling the thin sheet-like layers of electrodes and electrolyte into a tube such that the edges at one end of the sheet-like layer meet the corresponding edges from the opposite end of the sheet-like layer. The result is a composite tube that consists of three basic layers, where one of the porous electrodes (e.g. the fuel electrode) is on the outside of the cell, the other porous electrode (e.g., the oxidant electrode) is on the inside of the cell, and the electrolyte is sandwiched between the two electrodes. Typically, one end of the tube is closed to further reduce edge sealing problems.

During operation, fuel is supplied to the fuel electrode, whereas an oxidant (i.e., feed air or oxygen) is supplied to the oxidant electrode. The fuel and oxidant pass through the pores of their respective electrodes and electrochemically react on the surface of the electrolyte, thereby producing heat and electricity.

The configurations for various SOFCs and for various stationary SOFC generators are taught, for example, by Isenberg in U.S. Pat. No. 4,490,444, Isenberg in U.S. Pat. No. 4,664,987, Makiel in U.S. Pat. No. 4,640,875, Somers et al. in U.S. Pat. No. 4,374,184 and Singh et al. in U.S. Pat. No. 4,894,297. In all of these patents, an axially elongated, tubular air cathode has a solid oxide electrolyte deposited over it. A small radial segment which contains a deposit of interconnection material down the length of the tube is placed in contact with the air electrode. A fuel anode forms an outer layer over the electrolyte completing the fuel cell. A current collector felt with metal fibers may be attached to the interconnection material. Other fuel cell configurations are also known, such as those taught by Isenberg, in U.S. Pat. No. 4,728,584.

One or more fuel cells may be grouped together to form a cell bundle. The current collector felt of each cell in the bundle may be electrically connected to its neighbor in series and parallel. For example, the cells in each row may be connected in series to the other cells in that row. Each row may be then connected in parallel with the other rows in the cell bundle.

The generators discussed in the above-mentioned patents are typically used in stationary settings (for example, within a power plant) or are designed to provide power for relatively stable loads (for example in large marine applications that have a large hotel load). Thus, these generators may not be easily adapted to withstand the physical shock (for example, caused by a bumpy road) and thermal shock (for example, caused by frequent load swings) encountered by an internal combustion engine for a transportation application.

Additionally, assembly of prior art SOFC generators is time consuming and complex, making their use as a replacement for the internal combustion engine cost prohibitive. Typically, prior art SOFC generators must be assembled from individual parts within the confines of a housing which surrounds the generator. Conventional assembly procedures require excessive handling of the fuel cells and require extra space in the generator housing for assembly clearance. To reduce assembly time, the individual fuel cells may be combined to form a basic cell bundle prior to insertion into the generator housing. Multiple basic cell bundles may then be combined to form a fuel cell stack within the generator housing. However, the assembly of the generator is further complicated because each cell in the stack must be connected to, for example, an oxidant supply, a fuel supply, cell supports, generator walls, recirculation tubing, exhaust tubing, combustion chambers, and an external fuel reformer, among others.

Another problem with prior art generators is that the fuel reformation systems are not fully distributed (i.e., each cell within the cell stack is not directly coupled with the same amount of fuel reformation). Some cells may be cooled much more than others as a result of non-uniform fuel reformation. As a consequence, cells that do not transfer heat for fuel reformation may operate at a higher temperature than the cells that do transfer heat for fuel reformation. Thus, large variations in temperature may occur throughout the cell stack causing additional thermal stresses within the generator and/or reducing the performance of certain cells.

Thus, there exists a need for a multi-function bundle having all of the basic support functions integrated therein which can be used as a component in a fuel cell engine. A need also exists for a multi-function bundle that is modular, easy to assemble, and able to withstand the physical and thermal shocks encountered in a mobile application. A further need exists for a multi-function bundle that utilizes fully distributed fuel reformation systems to eliminate temperature variations throughout the bundle and which may preferably utilize insulation end pieces and a tilt-pad tie down clamping system that maintains engine integrity in the event of a complete vehicle rollover and that overcomes these and other limitations inherent in prior art.

SUMMARY

In a preferred aspect, the present disclosure comprises a fuel cell assembly of one or more fuel cell bundles, wherein each fuel cell bundle comprises an array of elongated tubular fuel cells, comprising: an oxidant supply system; a fuel supply system; a fuel reformation system; and a support structure for integrating as a bundle said elongated tubular fuel cells, said oxidant supply system, said fuel supply system, and said fuel reformation system a first row of spaced apart, elongated tubular fuel cells; wherein said support structure comprises: a base plate; a plurality of upper insulation end pieces (UIEPs) surrounding a top of the fuel cell assembly to produce a top assembly, wherein each upper insulation end piece has a top surface, a side portion and a beveled portion disposed between the top surface and the side portion to produce a beveled shoulder around the top assembly; a top clamp having a beveled inner surface complementary to the beveled shoulder that interfaces against a plurality of pivot pads disposed on the beveled shoulder when the top clamp is tensioned against the top assembly. Preferably, the top clamp may be made from high-temperature, high-strength material or composite.

In another preferred aspect, the top clamp is preferably tensioned against the top assembly by a plurality of tie rods attached to the top clamp and releasably secured to the base plate.

In another preferred aspect, the top clamp comprises a clamping ring, the top assembly is generally cylindrically shaped and the beveled shoulder is annular.

In another preferred aspect, each pivot pad comprises an upper plate and a half sphere connected to the bottom thereof disposed in a hole defined by the beveled shoulder.

In yet another preferred aspect, the upper plate is rectangular.

In a further preferred aspect, the upper plate is circular.

In another preferred aspect, each pivot pad comprises an upper plate and a half sphere connected to the bottom thereof disposed in a hole defined by the beveled shoulder.

In a further preferred aspect, the upper plate is rectangular and each hole in the beveled shoulder for receiving the half sphere of a pivot pad is generally half spherically shaped to allow for the pivot pad to tilt in all directions to accommodate the angle of inner beveled surface of the clamping ring and also deform slightly to accommodate the spherical shape of the pivot pad and to uniformly distribute the load to the UIEP.

In a further preferred aspect, each pivot pad is made of ceramic or composite.

In a further preferred aspect, the long-lengths of the rectangular plates are installed perpendicular to a tangent of the clamping ring.

In another preferred aspect, the edges of the rectangular plates are radiused.

In a further preferred aspect, the clamping ring defines an arc across its diameter.

In another preferred aspect, the present disclosure comprises a fuel cell assembly of one or more fuel cell bundles, wherein each fuel cell bundle comprises an array of elongated tubular fuel cells, comprising: an oxidant supply system; a fuel supply system; a fuel reformation system; and a support structure for integrating as a bundle said elongated tubular fuel cells, said oxidant supply system, said fuel supply system, and said fuel reformation system a first row of spaced apart, elongated tubular fuel cells; wherein said support structure comprises: a base plate; and a plurality of lower insulation end pieces disposed on the base plate and surrounding the lower ends of each of the one or more fuel cell bundles to provide a uniform circular outer shape of the bottom assembly.

In a further preferred aspect, each lower insulation end piece is made of alumina having large particle double-coat or single coat and fired at 1300 C. Preferably, vacuum-formed high-purity alumina insulation coated with high-purity alumina slurry and fired for added strength may be used for this application. In addition, other ceramic insulators and coating combinations fired at different temperatures preferably may be used for doing the same thing. The coatings reduce bypass leakage (through the insulation) and increase strength.

In another preferred aspect, ceramic paper may be disposed between adjacent lower insulation end pieces.

Another preferred aspect of the fuel cell assembly further comprises a band and clamping mechanism to secure together the lower insulation end pieces and the bottom assembly.

In another preferred aspect, one of the lower insulation end pieces defines an outer cavity in which the clamping mechanism is disposed.

In another preferred aspect, one or more of the lower insulation end pieces define apertures for one or more of a power lead bar, a tie down rod, an exhaust port, a gas recirculation port, shear pin, fuel inlet line, and instrumentation port.

Another preferred aspect of the fuel cell assembly further comprises ceramic paper disposed between the IEPs and the base plate. Preferably, the thermally expanding mat gasket (material made by Unifrax) is used sealing around and between ACR boxes.

BRIEF DESCRIPTION OF THE DRAWINGS

To enable the present invention to be easily understood and readily practiced, the present invention will now be described for purposes of illustration and not limitation, in connection with the following figures wherein:

FIG. 6B is a cut-away view of the multi-function bundle of FIG. 6A according to one embodiment.

FIG. 7D is a perspective view of a cell-to-cell electrical connector according to one embodiment.

DETAILED DESCRIPTION

Figure 1A:
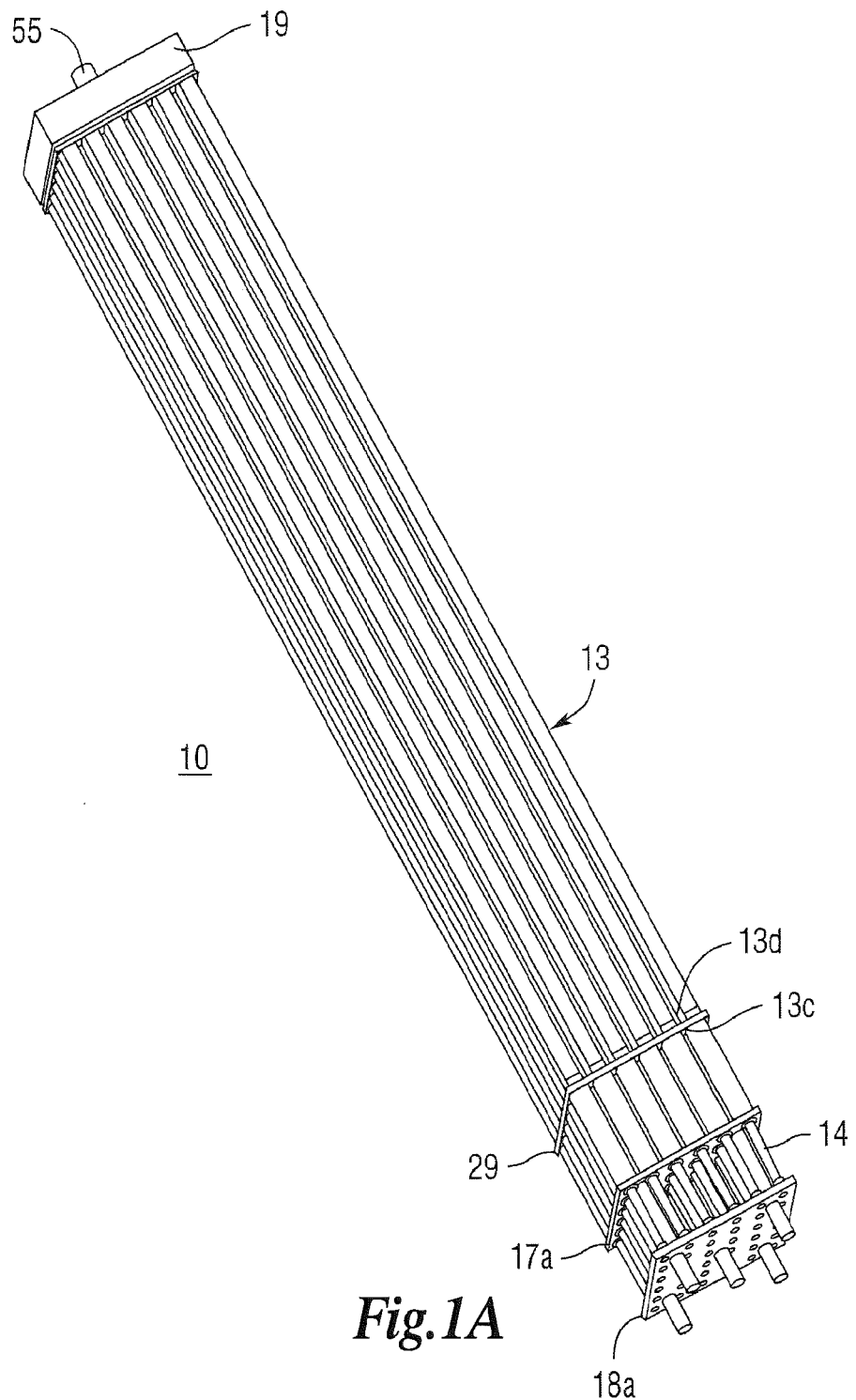
FIG. 1A is a perspective view of a preferred multi-function bundle according to a preferred embodiment of the present disclosure (TPD).
Figure 15:
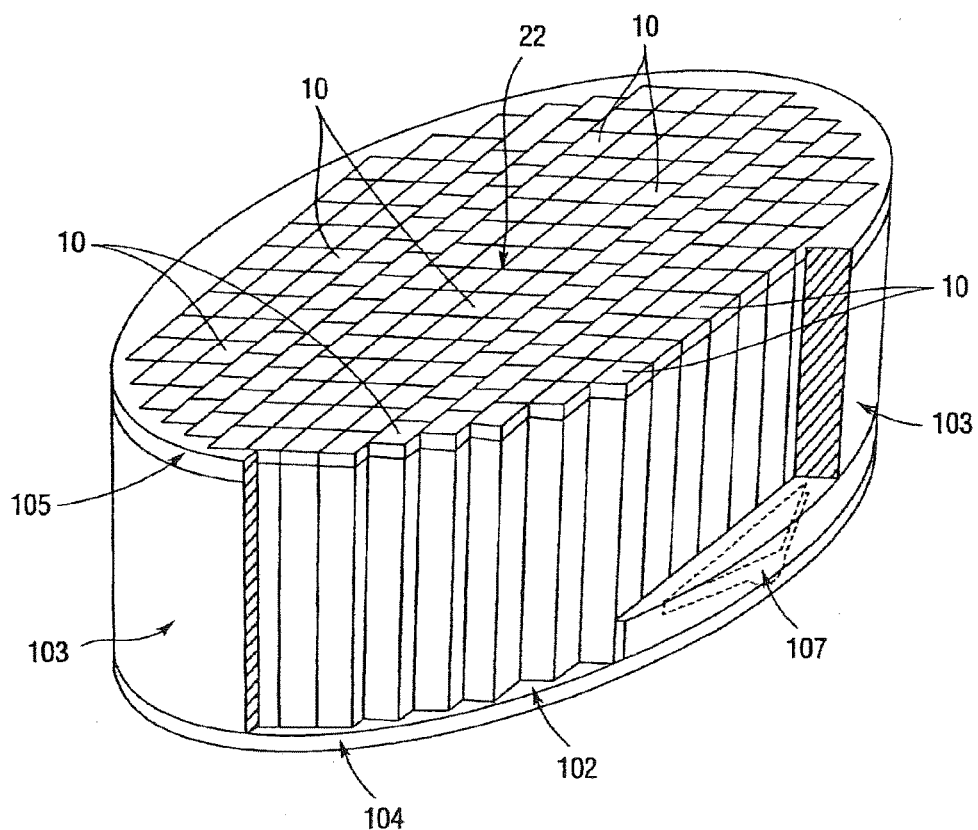
FIG. 15 is an isometric view of a stack of multi-function fuel cell bundles and associated support structures for the fuel cell engine of FIG. 13 according to one embodiment.

FIG. 1A is a perspective view of a multi-function bundle according to one embodiment. The multi-function bundle 10 embodies all of the basic support functions for the fuel cells 13 in a single, integrated unit. For example, the multi-function bundle may embody one or more of the following functions in a single, integrated unit: cell-to-cell electrical connections, oxidant distribution, fuel distribution, fuel reformation, process exhaust, process gas recirculation, and oxidant/fuel combustion, among others. Accordingly, the multi-function bundle 10 may be a modular unit that serves as a building block for building larger assemblies, for example, a generator stack (as best shown in FIG. 15). Thus, the multi-function bundle 10 reduces the effort needed (and eliminates extra costs typically encountered) during generator stack assembly and/or repair.

Figure 1B:
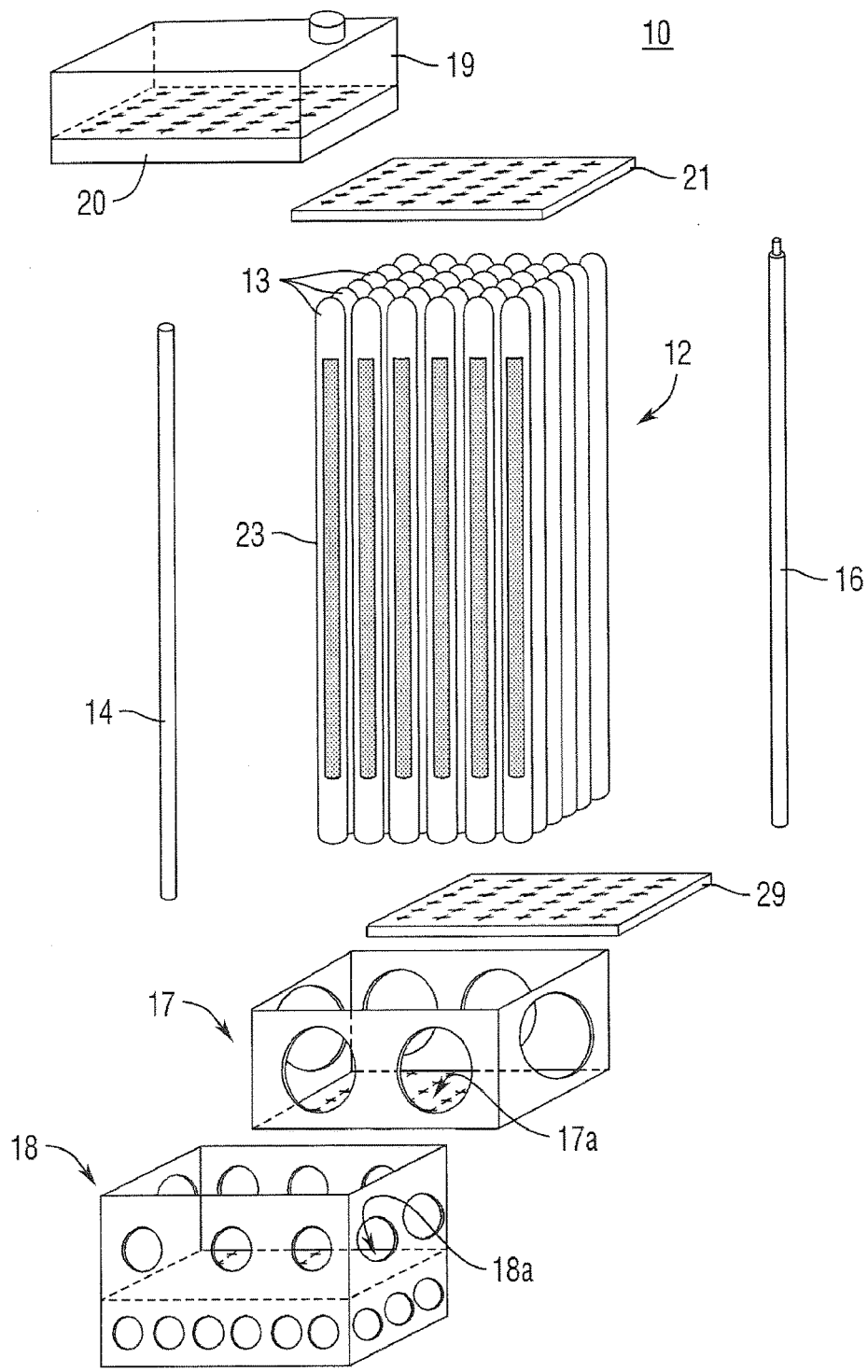
FIG. 1B is an exploded view of the multi-function bundle of FIG. 1A. A preferred embodiment of TPD.

FIG. 1B is an exploded view of the multi-function bundle 10 of FIG. 1A according to one embodiment. The multi-function bundle 10 is comprised of a primitive bundle 12 of fuel cells 13, oxidant feed tubes 14 (which may be positioned within fuel cells 13), fuel feed tube assemblies 16 (which may be positioned between and/or around fuel cells 13), a recirculation box 17, an exhaust/air distribution box (EAB) 18, a fuel box 19, a cell and fuel feed spacer (CFF Spacer) 20, a glide plate 21, and a cell spacer 29. The primitive bundle 12 may be comprised of a plurality of tubular solid oxide fuel cells (SOFCs) 13 each having an electrolyte 25 placed between oxidant 24 and fuel 26 electrodes, and an interconnection 23 contacting the oxidant electrode 24 (as best shown in FIG. 6B), the construction of which is well known in the art. The SOFCs 13 may be electrically connected to each other using flexible electrical connections 70, 72, 74 (not shown in FIG. 1B) that axially traverse each SOFC 13. The SOFCs 13 may be connected in series and/or in parallel within the primitive bundle 12.

It should be noted that the term "primitive bundle" 12 as used herein refers to a group of electrically connected fuel cells 13 and the term "multi-function bundle" as used herein refers to a primitive bundle 12 of fuel cells with fully distributed oxidant, fuel, and/or fuel reformation systems and an appropriate bundle support structure (e.g. 17, 18, 19, etc.). The bundle support structure enables the primitive bundle 12 and the oxidant supply, fuel supply, and fuel reformation systems to operate as an integrated unit. In one embodiment, the bundle support structure also provides separation and proper flow distribution between different process zones (as discussed in conjunction with FIG. 6A) within each multi-function bundle 10 and between two or more multi-function bundles 10, for example, when combined to form a stack.

As illustrated in FIG. 1B, the primitive bundle 12 is comprised of thirty-six (36) SOFCs 13 arranged in a six-by-six (6×6) array. The number of SOFCs 13 used in the primitive bundle 12, the array dimensions, and the manner of electrically connecting the individual SOFCs 13 within the primitive bundle 12 may be altered while remaining within scope of the present invention. Additionally, other types of fuel cells may be used while remaining within the scope of the present invention.

In one embodiment, the tubular SOFCs 13 also provide a means of holding the multi-function bundle 10 together (i.e., end-to-end) and help to accommodate thermal growth experienced by the multi-function bundle 10. However, other end-to-end support arrangements may be used while remaining within the scope of the present invention. For example, tie rods with thermal expansion characteristics similar to the SOFCs 13 may be embedded between and around the SOFCs 13. The end-to-end supports may be needed only during construction of the multi-function bundle 10, thus, the "embedded tie rods" may be made from a material that disintegrates when the multi-function SOFC bundle 10 is operated.

The multi-function bundle 10 has fully distributed oxidant supply, fuel supply, and/or fuel reformation systems. In the present discussion, a "fully distributed" oxidant supply system and a "fully distributed" fuel supply system refers to systems in which each SOFC 13 is provided with a desired amount of oxidant/fuel (e.g., an amount necessary for one SOFC 13 to produce an electrochemical reaction at the same rate/proportion as the other SOFCs 13 in the multi-function bundle 10). For example, in one embodiment, the multi-function bundle may be designed to electrochemically react approximately 75 to 85% of the fuel supplied to each SOFC. Accordingly, if each SOFC 13 is supplied with a given amount of fuel, then each SOFC 13 will be supplied with an amount of oxidant necessary to electrochemically react 75-85% of supplied fuel within the active region 32, an amount of oxidant to combust the remainder of the fuel in the combustion zone 36, and an amount of excess oxidant to maintain the desired temperature of the SOFC 13.

Additionally, in the present discussion, a "fully distributed" fuel reformation system refers to a system in which a portion of the fuel reformation system uses a portion of the heat generated by the electrochemical cell reaction to aid in reformation. For example in the current embodiment, fuel feed tube assemblies 16 may be located among the SOFCs 13. As the fuel mixture passes through the fuel feed tubes assemblies 16, it absorbs heat from the electrochemical cell reaction and is reformed into a hydrogen-rich fuel mixture. A fully distributed fuel reformation system may reduce parasitic heat loss, may minimize the cooling impact that the fuel reformation process has on the operation of the multi-function bundle 10, and may prevent localized adverse cooling within the multi-function bundle 10.

Figure 1C:
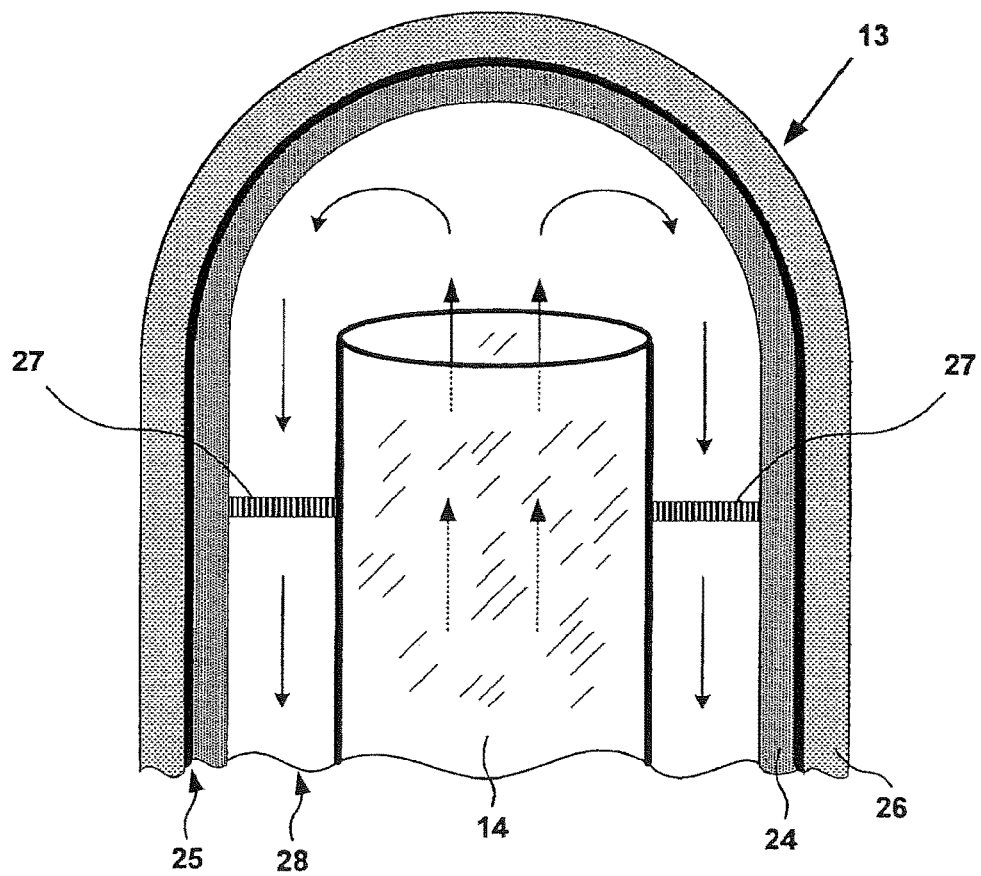
FIG. 1C is a detailed view of the closed end of an SOFC of FIG. 1A with an oxidant feed tube inserted therein according to a preferred embodiment of TPD.

The oxidant supply system may include the oxidant feed tubes 14 and the EAB 18. Oxidant may be distributed, for example, by inserting an oxidant feed tube 14 within each SOFC 13. FIG. 1C is a detailed view of the closed end of an SOFC 13 with an oxidant feed tube 14 inserted therein according to one embodiment. The SOFC 13 is comprised of an oxidant electrode 24, an electrolyte 25, and a fuel electrode 26. Because the outer diameter of the oxidant feed tube 14 is less than the inner diameter of the SOFC 13, a cavity 28 is formed between the outer diameter of the oxidant feed tube 14 and the inner diameter of the SOFC 13 when the oxidant feed tube 14 is inserted within the SOFC 13. The outlet of the oxidant feed tube 14 is near, but not touching, the closed end of the SOFC 13. Thus, oxidant (represented by a series of arrows in FIG. 1C) is able to exit the oxidant feed tube 14, reverse direction, and flow in the cavity 28 between the oxidant feed tube 14 and the oxidant electrode 24. It should be noted that other arrangements may be used while remaining within the scope of the present invention. For example, the oxidant feed tube 14 may include a closed end with one or more ports in its walls to allow oxidant flow.

To prevent lateral vibration of the oxidant feed tube 14, a porous washer 27 (for example, a short sleeve of Zirconia felt material) may be installed inside the cavity 28 formed between the SOFC 13 and the oxidant feed tube 14. In one embodiment, the outer surface of the washer 27 bonds to the oxidant electrode 24 during manufacturing and/or operation. A hole in the center of the washer 27 accommodates and holds the oxidant feed tube 14. The porosity of the felt material (e.g., >90%) provides minimal resistance to the flow of the oxidant within the cavity 28. Other techniques for preventing lateral vibration between the oxidant feed tube 14 and/or the SOFC 13 may also be used while remaining within the scope of the present invention. Additionally, the oxidant feed tubes 14 may be made of a ceramic material having thermal expansion qualities similar to that of the SOFCs 13 to maintain the clearance between the oxidant feed tube 14 and the closed end of the SOFC 13 during thermal expansion.

Oxidant is supplied to the oxidant feed tubes 14 via the EAB 18. The EAB 18 may include a horizontal flat plate 18a having individual seats (not shown) for carrying each of the oxidant feed tubes 14. To ensure a tight fitting seal and prevent undesirable movement, each oxidant feed tube 14 may be fitted into the individual seats and bonded to the EAB flat plate 18a with ceramic paste. During sintering and/or initial operation, the ceramic paste cures to bond the oxidant feed tube 14 to the EAB flat plate 18a and maintain the seal.

The fuel supply system may include the fuel feed tube assemblies 16 and the fuel box 19. The fuel reformation system may include a partial reformer and a final reformer. In the current embodiment, the fuel feed tube assemblies 16 may be considered as a part of both the fuel supply system and the fuel reformation system. Fuel may be distributed by associating one or more SOFCs 13 with each fuel feed tube 16.

It should be noted that the EAB 18 may serve multiple roles as part of the oxidant distribution system, the support structure, and the exhaust plenum. Likewise, the fuel box 19 may serve a dual role as part of both the fuel feed supply system and the support structure.

Figure 2A:
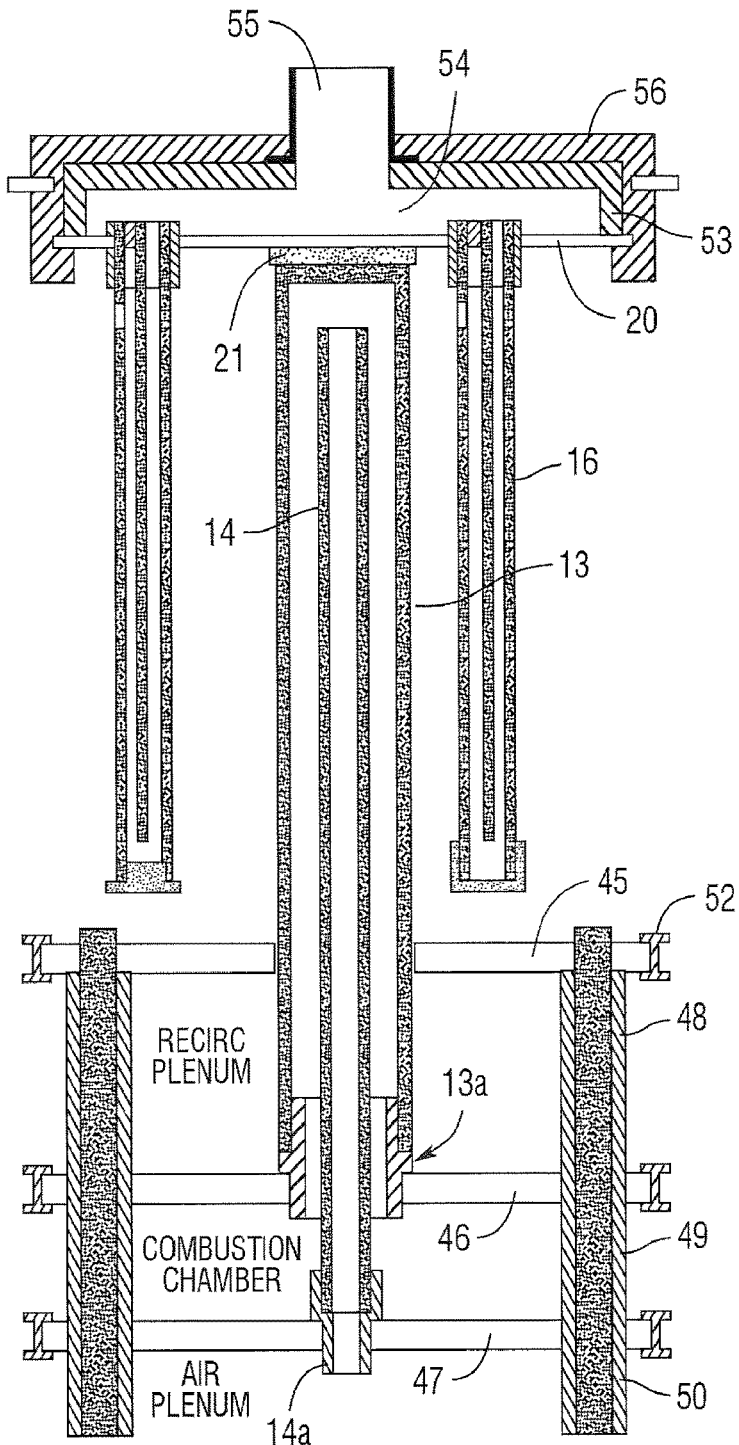
FIG. 2A is a simplified view of an arrangement of a portion of a preferred multi-function bundle according to a preferred embodiment or TPD.

FIG. 2A illustrates a simplified arrangement of a single SOFC 13 of a multi-function bundle 10A according to another embodiment. As illustrated in FIG. 2A, the support structure of the multi-function bundle 10A is comprised of a plurality of spacer plates (e.g., 20, 45, 46, 47, etc.), supports (e.g., 48, 49, 50, etc.), and a plurality of alignment pins. For simplicity, a single SOFC 13 with an associated oxidant feed tube 14 is shown located between two fuel feed tube assemblies 16, however, it should be apparent to one skilled in the art that the number of SOFCs 13 and fuel feed tube assemblies 16 may be altered while remaining within the scope of the present invention. The SOFC 13 passes through an upper cell spacer plate 45 and is carried by a cell extender 13a which is carried by a lower cell spacer plate 46. The oxidant feed tube 14 is carried by an oxidant feed tube extender 14a which is carried by an air tube spacer plate 47.

The air tube spacer plate 47 is supported by a plurality of air chamber supports 50. The air tube spacer plate 47 and air chamber supports 50 define an air plenum. The lower cell spacer plate 46 is supported by a plurality of combustion chamber supports 49. The lower cell spacer plate 46, combustion chamber supports 49, and the air tube spacer plate 47 define a combustion chamber. The upper cell spacer plate 45 is carried by a plurality of recirc chamber supports 48. The upper cell spacer plate 45, recirc chamber supports 48, and the lower cell spacer plate 46 define a recirc plenum. The placement of the air chamber supports 50, combustion chamber supports 49 and recirc chamber supports 48 is set using alignment pins. A plurality of seal locator strips 52 may be used to connect adjacent multifunction bundles 10A. In one embodiment, the seal locator strip 52 has an "H" cross-section that allows it to mate with the edge of the spacer plate 45.

The fuel feed tube assembly 16 passes through a CFF spacer 20 into the active region 32. The fuel feed tube assembly 16 receives fuel from a fuel manifold 54 defined by a reformer box 53 and the CFF spacer 20, among others. Fuel is supplied to the fuel manifold 54 by a fuel manifold entrance port 55. In the current embodiment, the reformer box 53 is nickel impregnated to aid fuel reformation.

The closed end of the SOFC 13 with an oxidant feed tube 14 inserted therein is similar to that as shown in FIG. 1C. Oxidant is supplied to the oxidant feed tubes 14 via the air plenum. As discussed above in conjunction with FIG. 2A, each oxidant feed tube 14 may be fitted to an oxidant feed tube extender 14a (further shown in FIG. 2B) which is carried by air tube spacer plate 47. Alternatively, the air tube spacer plate 47 may include individual seats (not shown) for carrying each of the oxidant feed tubes 14 thus eliminating the need for oxidant feed tube extenders 14a. To ensure a tight fitting seal and prevent undesirable movement, each oxidant feed tube 14 may be fitted into the individual seats and bonded to the air tube spacer plate 47 with ceramic paste. During sintering and/or initial operation, the ceramic paste cures to bond the oxidant feed tube 14 to the air tube spacer plate 47 and maintain the seal.

Figure 2B:
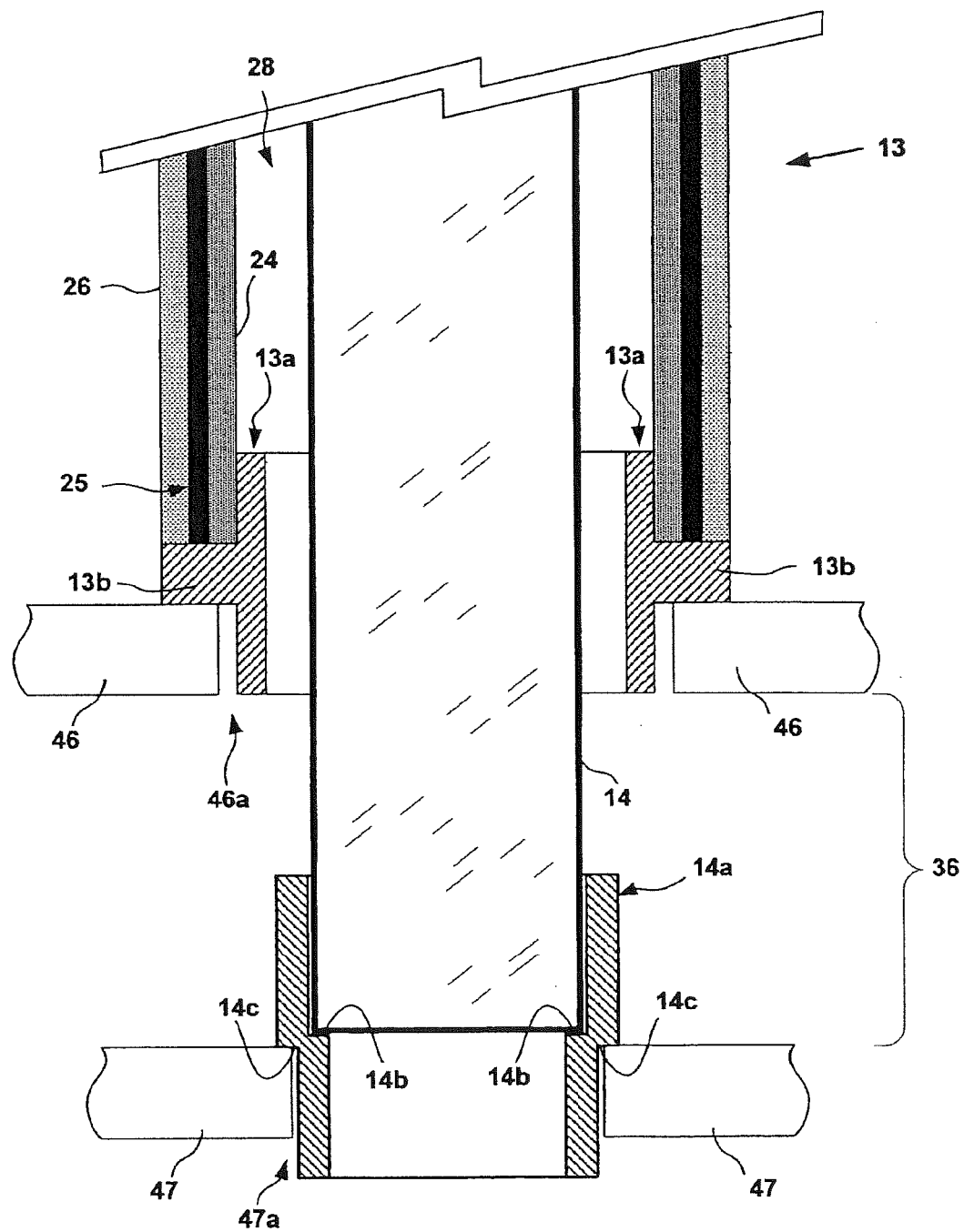
FIG. 2B is a detailed view of the open end of the single SOFC of FIG. 2A with its cell extender attached and its associated oxidant feed tube inserted therein.

FIG. 2B is a detailed view of the open end of the SOFC 13 with the cell extender 13a attached and the associated oxidant feed tube 14 inserted therein as illustrated in FIG. 2A. In the current embodiment, cell extender 13a is a hollow collar through which the oxidant feed tube 14 passes. The cell extender 13a has a shoulder 13b located on its outside diameter, the top of which carries the SOFC 13 and the bottom of which rests on the lower cell spacer plate 46. In addition to carrying the SOFC 13, the shoulder 13b provides a seal that prevents oxidant and fuel from reacting at the open end of the SOFC 13.

The outer diameter of the cell extender 13a (excluding the shoulder 13b) may be less than the diameter of the lower cell spacer plate clearance holes 46a. Thus, the bottom portion of the cell extender 13a may fit within the inner diameter of the lower cell spacer plate clearance hole 46a. Accordingly, the alignment of the SOFC 13 can be adjusted as needed and movement caused by shock and/or thermal expansion can be accommodated. In the current embodiment, the inner diameter of the cell extender 13a is greater than the outer diameter of the oxidant feed tube 14 such that oxidant may flow from the cavity 28 into the combustion zone 36.

As shown in FIG. 2B, the oxidant feed tube 14 may be carried by an oxidant feed tube extender 14a. In the current embodiment, the oxidant feed tube extender 14a is a hollow collar to allow oxidant to flow into the oxidant feed tube 14. The oxidant feed tube extender 14a has an inner shoulder 14b for carrying the oxidant feed tube 14 and an outer shoulder 14c which rests on the air tube spacer plate 47. In addition to carrying the oxidant feed tube 14, the oxidant feed tube extender 14a provides a seal that prevents leakage through the air tube spacer plate clearance holes 47a.

The outer diameter of the lower portion of the oxidant feed tube extender 14a (e.g., below the shoulder 14c) may be less than the diameter of the air tube spacer plate clearance holes 47a. Thus, the bottom portion of the oxidant feed tube extender 14a may fit within the inner diameter of the air tube spacer plate clearance hole 47a. Accordingly, the alignment of the oxidant feed tube 14 can be adjusted as needed during manufacturing assembly.

As briefly discussed above, the multi-function bundle 10 may have a fully distributed final fuel reformation system. For example, final fuel reformation may be distributed by a plurality of fuel feed tube assemblies 16 which are inserted between and around the SOFCs 13. Partially reformed (i.e., methane-rich) fuel may be supplied to the feed tube assemblies 16 by a manifold 54 contained within the fuel box 19 according to one embodiment.

Figure 3A:
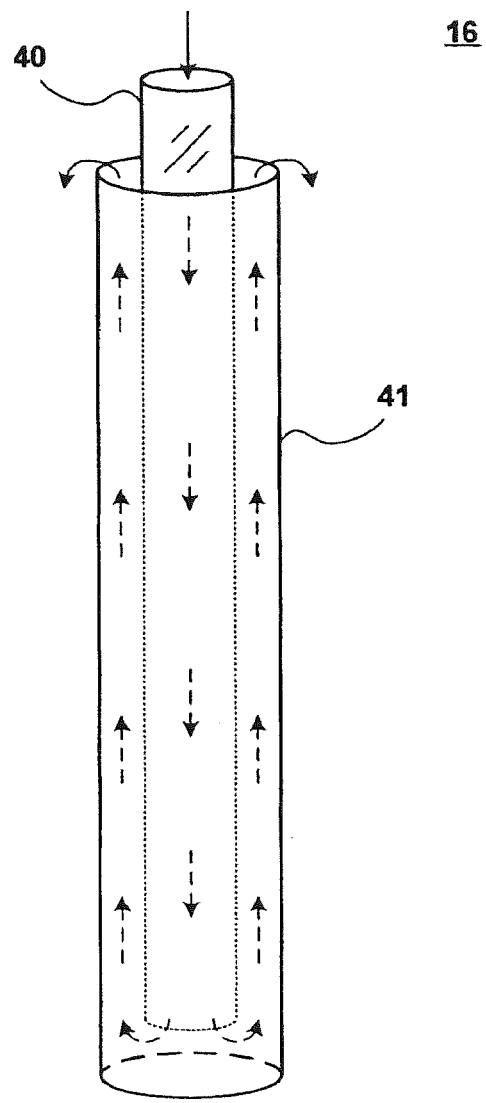
FIG. 3A is a perspective view of a fuel feed tube assembly of the multi-function bundle of FIG. 1A according to one embodiment.
Figure 3B:
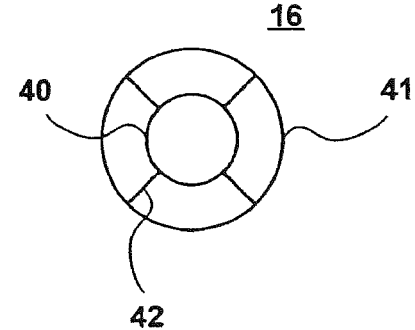
FIG. 3B is a top end view of the fuel feed tube assembly of FIG. 3A according to one embodiment.

FIGS. 3A and 3B are perspective and end views, respectively, of a fuel feed tube assembly 16 for the multi-function bundle 10 of FIG. 1A according to one embodiment. The fuel feed tube assembly 16 includes a fuel feed tube entrance leg 40, a return leg 41, and (as best seen in FIG. 3B) one or more support fins 42. As best shown in FIG. 3A, the fuel feed entrance leg 40 may be longer that the fuel feed return leg 41 to accommodate connection to the fuel supply system.

Figure 5A:
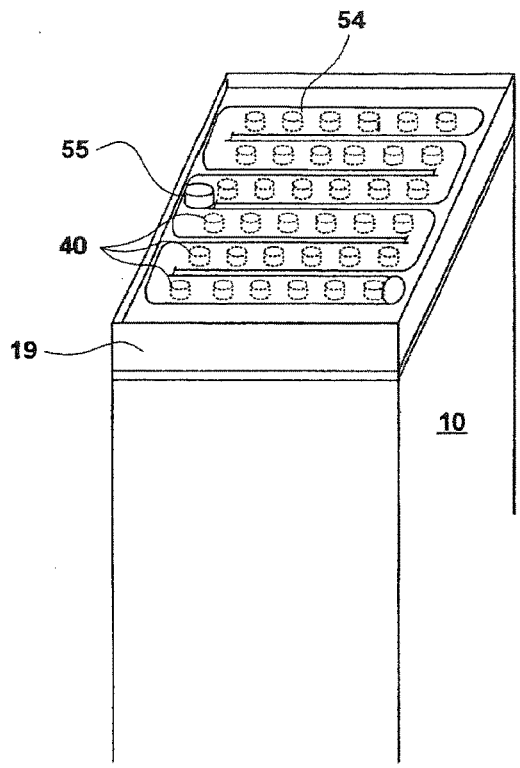
FIGS. 5A-5C are perspective views of a portion of the fuel distribution system for one or more multi-function bundles according to one embodiment.

The flow of fuel within the fuel feed tube assembly 16 is best illustrated in FIG. 3A. Fuel is supplied to the entrance leg 40 (for example, from a fuel supply manifold 54 as shown in FIG. 5A) and flows within the entrance leg 40 towards the closed end of the fuel feed tube assembly 16. At the closed end, the fuel exits the entrance leg 40, reverses direction, and flows in the cavity formed between the outside of the entrance leg 40 and the inside of the return leg 41. The fuel exits the cavity between the entrance leg 40 and the return leg 41 at the open end, opposite the closed end of the fuel feed tube assembly 16.

In one embodiment, final fuel reformation occurs inside the fuel feed tube assemblies 16. Thus, partially reformed fuel supplied to the entrance leg 40 exits as fully reformed fuel from the open end of the return leg 41. To aid the reformation process, one or more components of the fuel feed tube assembly 16 may be made from, or coated with, a catalyst material. For example, the surfaces of the entrance leg 40, return leg 41, and the fins 42 may be flash coated with nickel. It should be noted that other catalysts may be used while remaining within the scope of the present invention. The catalyst choice will depend upon, in part, the fuel to be reformed.

Support fins 42 may insure that the cavity between the outside of the entrance leg 40 and inside of the return leg 41 remains open to allow fuel flow, may enhance the physical strength of the fuel feed assembly 16, may aid in reformation (as discussed above), and may facilitate the transfer of heat between the entrance leg 40 and the return leg 41, among others. As shown in FIG. 3B, the fuel feed tube assembly has four fins spaced to form four flow paths within the cavity between the outside of the entrance leg 40 and inside of the return leg 41. The number of fins 42 used, and their relative positioning within the fuel feed tube assembly 16, may be altered while remaining within the scope of the present invention. The length of the fins 42 relative to the axis of the entrance leg 40 and return leg 41 may be varied while remaining within the scope of the present invention.

The fuel feed tube assembly 16 may function as a counter-flow heat exchanger which improves the thermal distribution within the multi-function bundle 10. For example, the fuel feed tube assembly 16 may help reduce the localized cooling impact that the fuel reformation process has on the operation of the array of fuel cells 13.

In one embodiment, the fuel feed tube assembly 16 may be extruded as an integrated unit, however, other methods of construction may be used while remaining within the scope of the present invention. For example, the fuel feed entrance leg 40 may be formed as an elongated sleeve having an inlet and an outlet and the fuel feed tube return leg 41 may be formed as an elongated sleeve having an open end and a closed end. The fuel feed tube entrance leg 40 may be nested inside the fuel feed tube return leg 41 to form a fuel flow path similar to that shown in FIG. 3A. The fuel feed tube assembly 16 illustrated in FIGS. 3A and 3B is substantially cylindrical in shape, however, other shapes may be used while remaining within the scope of the present invention. In addition, tube configurations other than concentric flow passages such as adjoined, side-by-side flow passages (as shown in FIGS. 4A and 4B) may be used while remaining within the scope of the present invention.

Figure 4A:
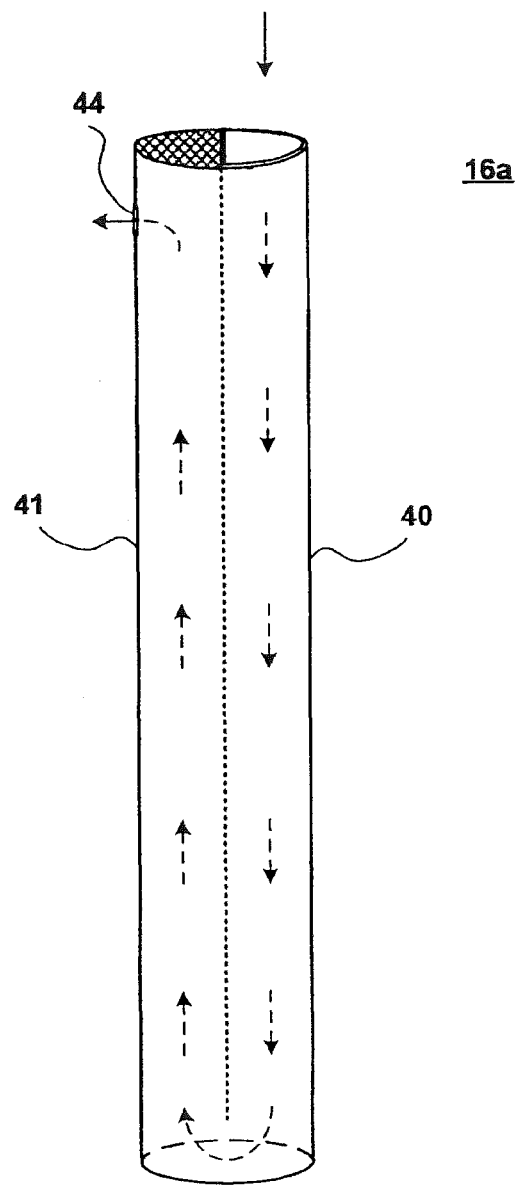
FIG. 4A is a perspective view of a fuel feed tube assembly of the multi-function bundle of FIG. 1A according to one embodiment.
Figure 4B:
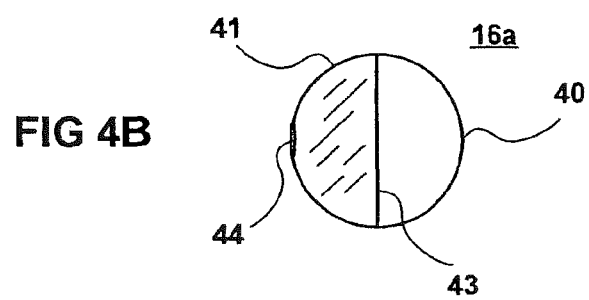
FIG. 4B is a top end view of a fuel feed tube assembly of FIG. 4A according to one embodiment.

FIGS. 4A and 4B are a perspective view and an end view, respectively, of a fuel feed tube assembly 16a for the multi-function bundle 10 of FIG. 1A according to another embodiment. The fuel feed tube assembly 16a includes a fuel feed tube entrance leg 40, a return leg 41, and (as best seen in FIG. 4B) one or more divider/support fins 43. As best shown in FIG. 4A, the fuel feed tube entrance leg 40 may be the same length as the fuel feed tube return leg 41 and the fuel feed tube return leg 41 plugged. In an alternative embodiment, the fuel feed entrance leg 40 may be longer than the fuel feed return leg 41 to accommodate connection to the fuel supply system.

The flow of fuel within the fuel feed tube assembly 16a is best illustrated in FIG. 4A. Fuel is supplied to the entrance leg 40 (for example, from one embodiment of a fuel supply manifold 54 as shown in FIG. 5A) and flows within the entrance leg 40 towards the closed end of the fuel feed tube assembly 16a. At the closed end, the fuel exits the entrance leg 40, reverses direction, and flows within the return leg 41. As illustrated in FIG. 4A, the top of the fuel feed return leg 41 may be sealed. Accordingly, the fuel exits the fuel feed tube assembly 16a via one or more fuel feed tube exit ports 44 (e.g., located in the side walls of the fuel feed return leg 41, opposite the closed, bottom end of the fuel feed tube assembly 16a). It should be apparent to one skilled in the art that other designs may be used while remaining within the scope of the present invention, for example, the top of the fuel feed return leg 41 may be open such that the fuel may flow directly out of the top of fuel feed return leg 41.

In one embodiment, final fuel reformation occurs inside the fuel feed tube assemblies 16a. Thus, partially reformed fuel supplied to the entrance leg 40 exits as fully reformed fuel from the fuel exit ports 44. To aid the reformation process, one or more components of the fuel feed tube assembly 16a may be made from, or coated with, a catalyst material. For example, the surfaces of the entrance leg 40, return leg 41, and the divider/support fin 43 may be flash coated with nickel. It should be noted that other catalysts may be used while remaining within the scope of the present invention. The catalyst choice will depend upon, in part, the fuel to be reformed.

In one embodiment, the fuel feed tube assembly 16a may be extruded as an integrated unit, however, other methods of construction may be used while remaining within the scope of the present invention. For example, the fuel feed entrance leg 40 and fuel feed return leg 41 may be constructed separately and then combined to from the fuel feed tube assembly 16a. As shown, the fuel feed entrance leg 40 and fuel feed return leg 41 are substantially "D-shaped," such that when combined, the fuel feed tube assembly 16a illustrated in FIGS. 4A and 4B is substantially cylindrical in shape. However, other shapes may be used while remaining within the scope of the present invention.

Figure 5B:
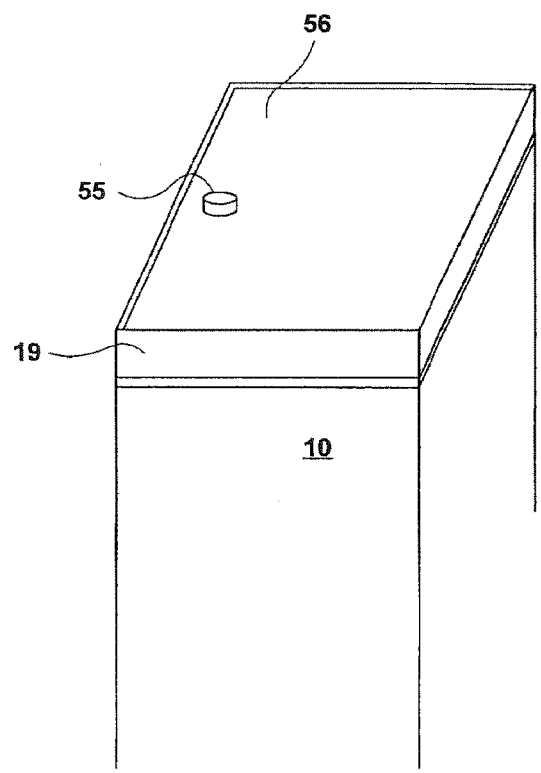

FIGS. 5A-5B are perspective views of the fuel distribution system for the multi-function bundle 10 according to one embodiment. Referring to FIG. 5A, the fuel feed tube entrance legs 40 for each fuel feed tube assembly 16, 16a passes through clearance holes in the bottom of the fuel box 19. The fuel feed tube entrance legs 40 are contained within a space defined by the fuel box 19 bottom and side walls. A thin layer of cast insulation material may be used to hold the fuel feed tube entrance legs 40 in place relative to bottom of the fuel box 19 and may also provide a seal around the entrance legs 40 relative to the clearance holes in the bottom of the fuel box 19.

A fuel manifold 54 is placed over and connects each of the fuel feed tube entrance legs 40. The fuel manifold 54 may be made from thin-walled tubing. For example, thin-walled nickel tubing may be used to connect the fuel feed tube entrance legs 40 and to enhance the fuel reformation process. The walls of the tubing may be very thin (e.g., approximately 1/64 in. thick) to allow the serpentine path of the fuel manifold 54 to be easily formed. The serpentine path helps to reduce the forces caused by thermal expansion differences between the metal and ceramic materials. It should be apparent to one skilled in the art that other designs may be used while remaining within the scope of the present invention.

Each fuel manifold 54 may include an associated fuel manifold entrance port 55. In one embodiment, the fuel manifold entrance port 55 extends past the top of the fuel box's 19 side walls.

Referring to FIG. 5B, after the fuel manifold 54 is placed over the projecting ends of the fuel feed tube entrance legs 40, the fuel feed assembly may be cast in a cement-like insulation material 56. The cast insulation material 56 occupies the space defined by the fuel box's 19 bottom and side walls. The cast insulation material 56 provides support to the multi-function bundle 10 and provides a seal between the manifold 54 and the fuel feed entrance legs 40. In one embodiment, a ceramic cast insulation 56 is used. The ceramic cast insulation 56 may be applied to a level flush with the top of the fuel box's 19 side walls such that only the fuel manifold entrance port 55 remains exposed. In one embodiment, the ceramic cast insulation may form the sides of the fuel box 19.

Figure 5C:
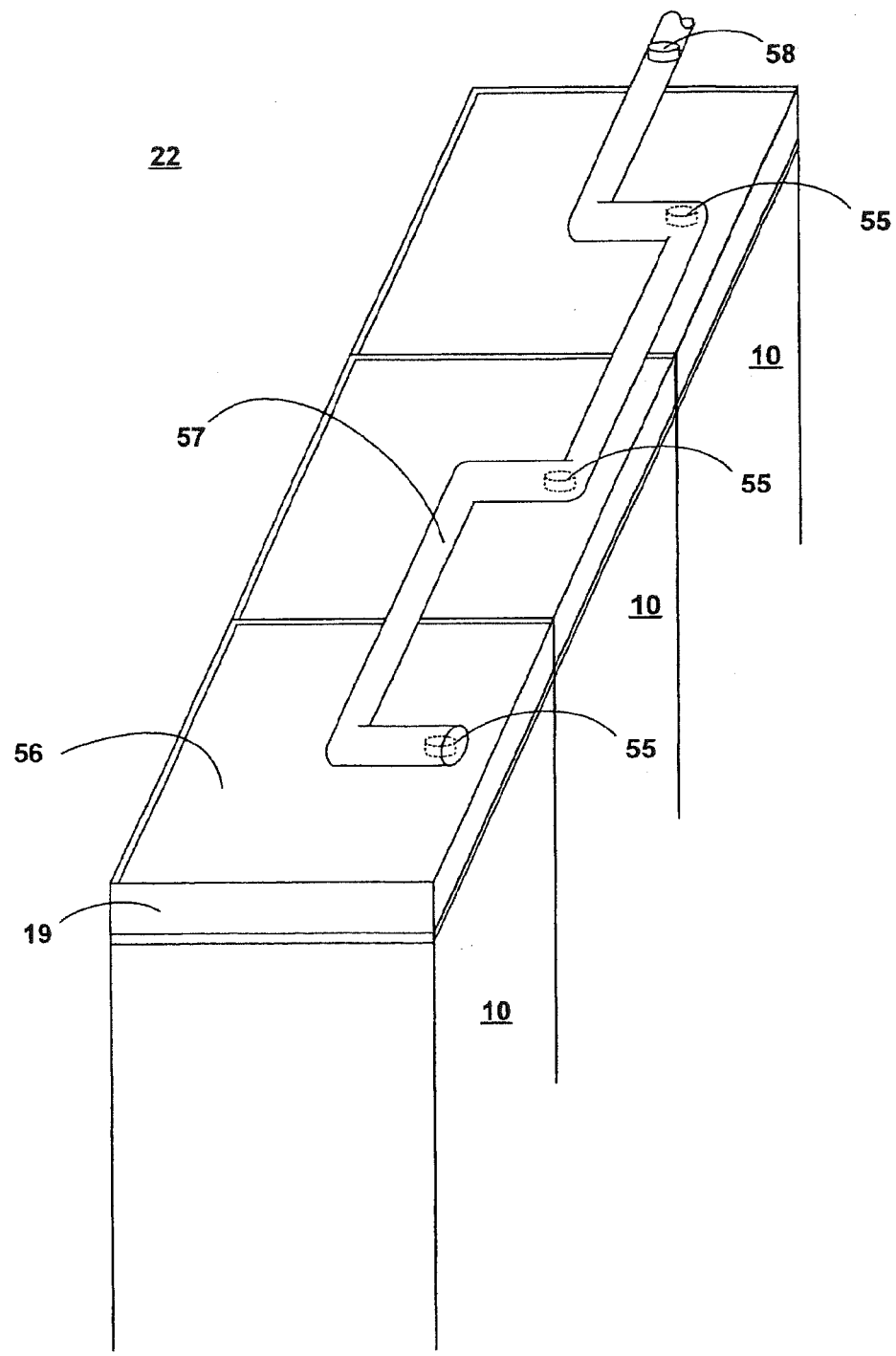

FIG. 5C is a perspective view of three multi-functional bundles 10 joined together in a stack 22. After the cast ceramic insulation 56 is applied, a row header 57 may be placed over the fuel manifold entrance ports 55 of each multi-function bundle 10. Each row header 57 may have an associated row header entrance port 58 for connecting the fuel distribution system to a fuel supply and/or to a recirculation system. In one embodiment, the row header 57 is made from a thin piece of nickel tubing (e.g., to aid in the reformation process) bent in a serpentine pattern (e.g., to accommodate thermal expansion). It should be noted that other designs for the fuel distribution system may be used while remaining within the scope of the present invention.

In one embodiment, the fuel feed tube assemblies 16, 16a may be omitted from the multi-function bundle 10. For example, the fuel manifold 54 and/or row header 57 may be made from, or coated with, a catalyst material to enhance fuel reformation within the manifold 54 and/or row header 57. After reformation, the fuel may be distributed directly from the fuel manifold 54 to the SOFCs 13 through the holes in the fuel box 19. Fuel that does not require reformation may also be supplied directly to the SOFCs 13 thus eliminating the need to have a catalyst material present in the fuel manifold 54 and/or row header 57.

When the multi-function bundles 10 are placed in a stack 22 (i.e., are stacked next to each other) the edges of the EAB 18, the recirculation box 17, and the fuel box 19 of a first multi-function bundle 10 contact (and transfer side loads to) the EAB 18, the recirculation box 17, and fuel box 19, respectively, of adjacent multi-function bundles 10. In one embodiment, the EAB 18, the recirculation box 17, and fuel box 19 include tongue-and-groove fits (not shown). The tongue- and groove-fits ensure the relative location of adjacent bundles and enhance the zone-to-zone sealing capability. The tongue-and-groove fits allow the stack 22 to endure large loads (such as those encountered during shock loading), without significant and potentially damaging relative movement. Large relative movement normal to the axis of the tongue-and-groove is prevented.

The tongue-and-groove fits of the EABs 18 may also form a partial gas seal between adjacent multi-function bundles 10. Although the tongue-and-groove seals may include gaps resulting from assembly and manufacturing imperfections, they provide a seal that may be more effective than the conventional controlled leakage seals formed by the clearance between SOFCs 13 and the feed through holes in porous spacer boards.

It should be noted that the edges of the recirculation boxes 17 may also form a partial gas seal and provide side load support when two or more multi-function bundles 10 are combined to form a stack 22. However, the edge dimensions and tolerances of the boxes may be designed to ensure that the EABs 18 provide the predominant side load support (for the lower end of the bundle 10).

Figure 6A:
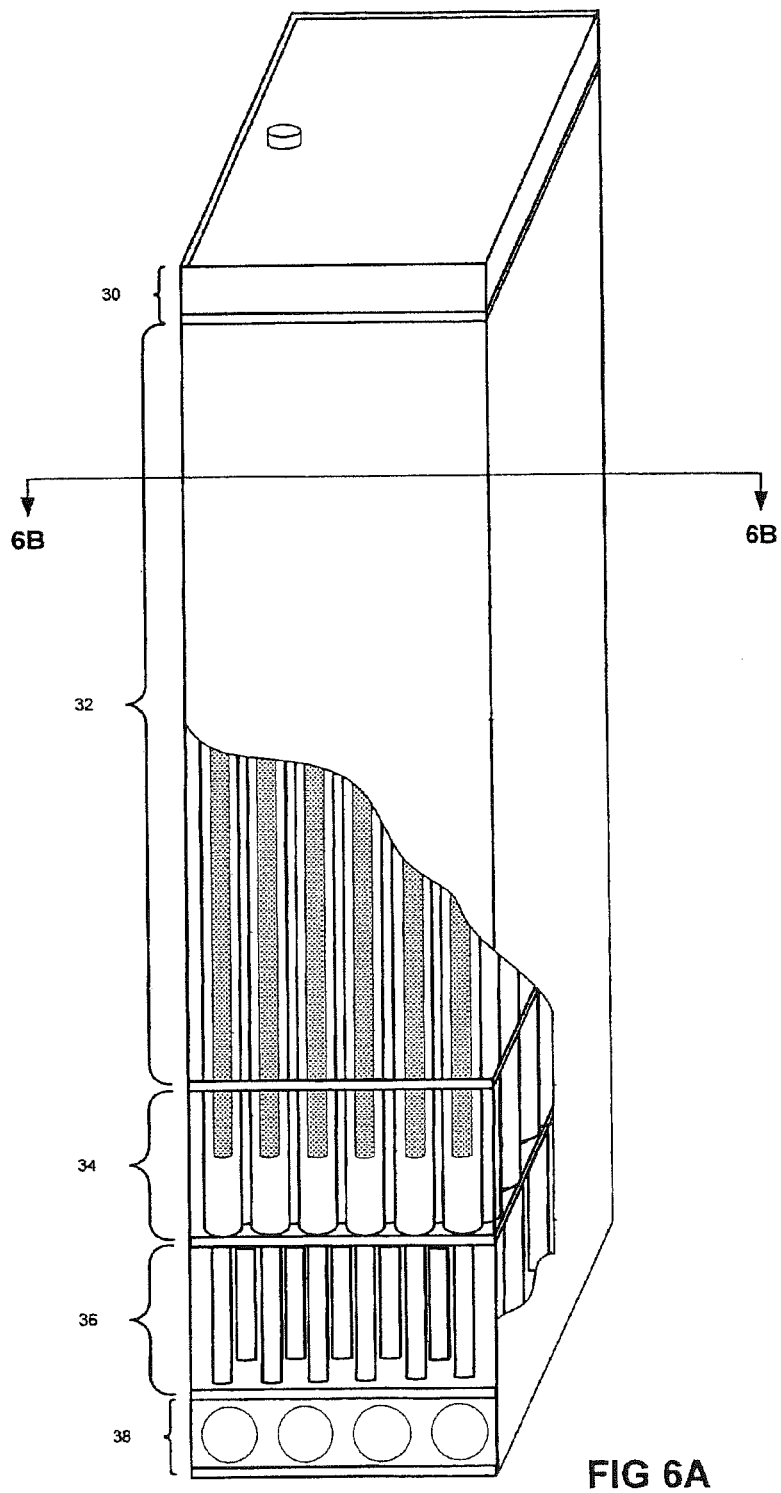
FIG. 6A is a perspective view of a multi-function bundle of FIG. 1A illustrating the different process zones according to one embodiment.

FIG. 6A is a perspective view of the multi-function bundle of FIG. 1A illustrating the different process zones according to one embodiment. For example, fuel distribution zone 30 refers to the region in which the fuel is provided for supply to the fuel cells 13 (for example through fuel feed tube assemblies 16 shown in FIG. 1A). The active zone 32 refers to the region in which the fuel and oxidant combine in an electrochemical reaction. The recirculation zone 34 refers to the region in which a portion of the depleted exit fuel mixture is extracted and used, for example, by an external partial reformer before being sent back as partially reformed, methane-rich fuel to the fuel distribution zone 30. The combustion zone 36 refers to the region in which the portion of the fuel mixture remaining after the recirculation zone 34 is combusted with oxidant entering the combustion zone from the open ends of the SOFCs 13. The oxidant (air) distribution zone 38 refers to the zone in which oxidant is supplied to the oxidant feed tubes 14, for example, via the EAB 18.

FIG. 6B illustrates a cut-away end view along line 6B-6B of the multi-function bundle 10 with the fuel feed tube assemblies 16 inserted according to one embodiment. The fuel feed tube assemblies 16 are located between and around the SOFCs 13. Flexible electrical connectors 15 may be used to connect the SOFCs 13. For example, a flexible electrical connector 15 may be used to connect the fuel electrode 26 of one SOFC 13 to the fuel electrode 26, or to the cell electrical interconnect 23, of another SOFC 13. Flexible electrical connectors 15 may be made, for example, from a single piece of conductive material (e.g., nickel sheet).

The distribution of fuel feed tube assemblies 16 among the SOFCs 13 allows the fuel reformation process to occur in close proximity to the electrochemical reaction heat source. Thus, parasitic heat loss is greatly reduced. As the fuel mixture passes through the fuel feed tubes assemblies 16, it absorbs heat from the electrochemical cell reaction and is reformed into a hydrogen-rich fuel mixture.

Returning briefly to FIG. 6A, the basic operation of the multi-function bundle 10 will be discussed. Oxidant is fed to the oxidant feed tubes 14 (located within the SOFCs 13) by the EAB 18. The oxidant enters the oxidant feed tubes 14 and flows the length of the active region 32 (i.e., towards the fuel distribution zone 30), exits the oxidant feed tubes 14, reverses direction, and flows inside the cavity 28 between the outer surface of the oxidant feed tube 14 and the inner surface the SOFCs 13 (i.e., towards the recirculation zone 34).

At the same time that oxidant is being fed to the oxidant feed tubes 14, fuel is fed to the outside surface of the SOFCs 13. In one embodiment, a methane rich, partially reformed fuel is distributed to the fuel feed tube assemblies 16 via the fuel manifolds 54. The partially reformed fuel enters the inside of the fuel feed tube entrance leg 40 (i.e., in the fuel distribution zone 30) and flows the length of the active region 32 (i.e., towards the recirculation zone 34). The fuel exits the inside of the fuel feed tube entrance leg 40, reverses direction, and flows back along the length of the active region 32 (i.e., towards the fuel distribution zone 30) and exits the inside of the fuel feed tube return leg 41.

As the fuel mixture passes through the fuel feed tube assemblies 16, it absorbs heat from the electrochemical cell reaction and is fully reformed into a hydrogen-rich fuel mixture. The fuel feed tube assemblies 16 allow the final reformation to occur in close proximity to the electrochemical reaction heat source. Accordingly, heat loss is eliminated for the fuel feed tube assemblies 16 that are surrounded by cells and minimized (through the use of thermal insulation) for the fuel feed tube assemblies 16 exposed to the periphery. As a result essentially all of the heat supplied to reform the fuel inside the bundle 10 is available to the cell's electrochemical reaction.

The fully reformed fuel exits the fuel feed tube assemblies 16 in the active zone 32 near the fuel distribution zone 30. The fully reformed fuel then reverses direction in the active zone and flows (i.e., towards the recirculation zone 34) along the outside of the SOFCs where it electrochemically reacts with oxygen ions that move through the solid electrolyte 25 as a result of the oxidant flowing within the cavity 28. In one embodiment, approximately 75 to 85% of the available fuel is used in the electrochemical reaction.

A depleted fuel mixture arrives at the exit of active zone 32 (i.e., next to the recirculation zone 34). The depleted fuel mixture contains un-reacted fuel and reaction products (for example, a significant amount of water) that may be used to initiate the partial fuel reformation. The depleted fuel mixture passes from the active zone 32, through a set of controlled leakage seals (not shown), and into the recirculation zone 34. In one embodiment, a portion of the depleted fuel mixture is extracted from the recirculation zone 34, fed to an external partial reformer (not shown) via a re-circulated fuel loop and re-supplied as partially reformed methane-rich fuel to the fuel distribution zone 30.

In the external partial reformer, raw liquid fuel (such as diesel, kerosene, JP-8, etc.) is vaporized and added to the depleted fuel mixture which contains water vapor to enable steam reformation to occur. After adding vaporized raw fuel, the fuel mixture passes through a catalyst bed where the fuel mixture is partially reformed to become a methane-rich fuel mixture. A fan or blower may be used to overcome the small pressure drop through the external partial reformer and pump the partially reformed, methane-rich fuel mixture back to the fuel distribution zone 30.

The remaining portion of the depleted fuel mixture passes from the recirculation zone 34, through a lower set of controlled leakage seals (not shown), and into the combustion zone 36. Combustion occurs immediately as the fuel mixture combines with depleted oxidant entering the combustion zone 36 from the open ends of the SOFCs 13. The dimensions, such as length, width and/or height of the combustion zone 36 may preferably be varied to maintain proper temperature within a Turbo Fuel Cell Engine comprising bundles 10 and/or stacks 22 of SOFCs 13 according to the present disclosure.

It should be noted that some of the heat produced in the combustion zone 36 may be absorbed by the oxidant within the oxidant feed tubes 14 which pass through the combustion zone 36. Thus, heat that would otherwise be lost from within the combustion zone 36 may be re-captured. Additionally, the oxidant distribution system may be used to cool the multi-function bundle 10 (i.e., to keep the bundle 10 at the desired operating temperature). The total height (fuel distribution zone 30, active region 32, recirculation zone 34, combustion zone 36, and air distribution zone 38) may be fixed for a particular engine. The ratio between the height of the active region 32 and the height of the combustion zone 36 may be used to establish the maximum power for the engine volume. Unlike typical heat engine practices, the multi-function bundle 10 does not utilize a recouperator to capture excess heat from the exhaust stream (i.e., after the exhaust has left the combustion zone 36) to pre-heat the incoming oxidant because doing so would require larger air flow passages to accommodate the low density air from the recouperator and thereby make the engine larger to accommodate the larger flow passages.

Figure 13:
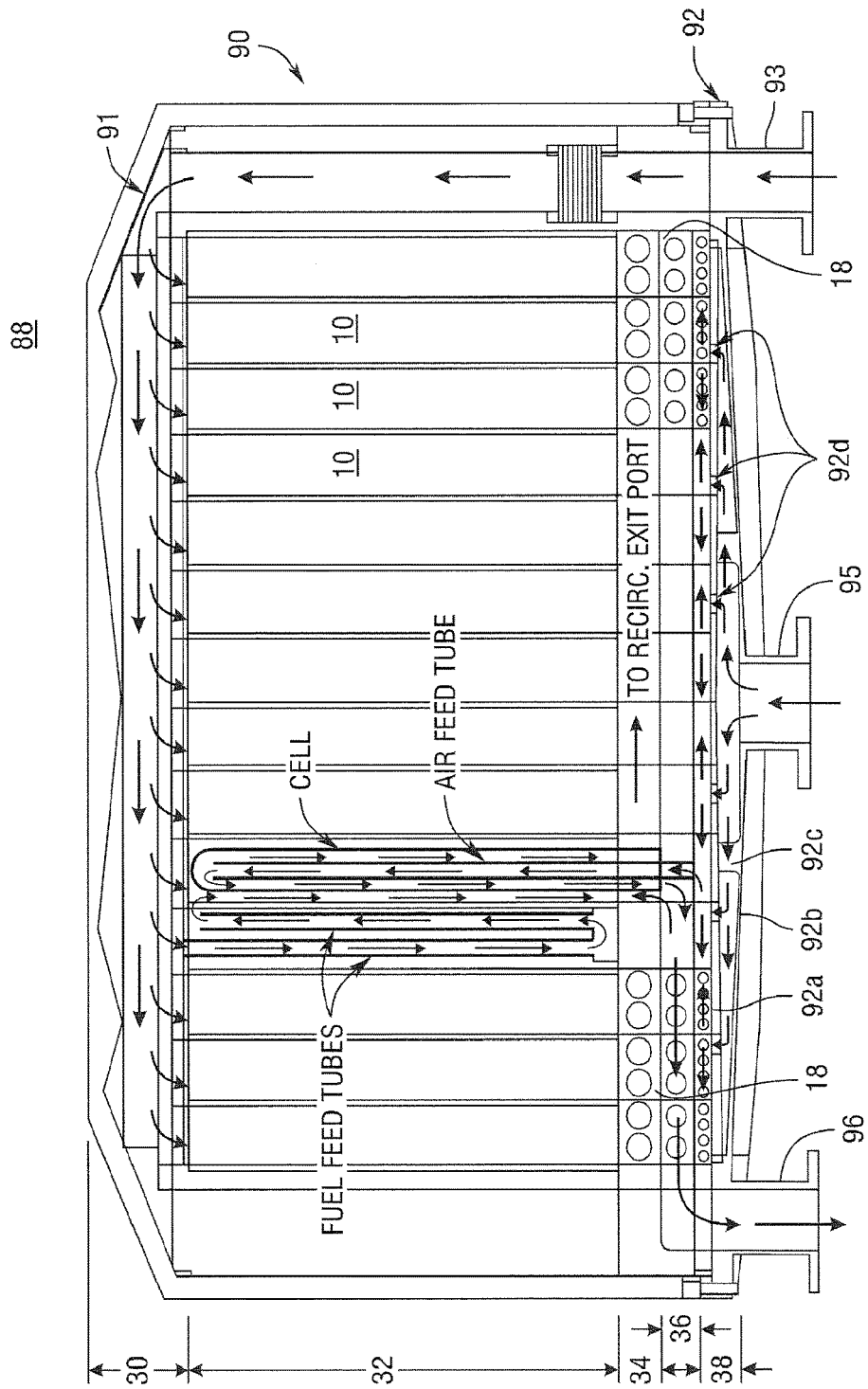
FIG. 13 is a cut-away side view of a fuel cell engine according to one embodiment.

In one embodiment, when two or more multi-function bundles 10 are aligned next to each other, the large circular holes in the sides of the recirculation box 17 and the EAB 18 allow the gas mixtures to flow laterally through the adjacent bundles 10. Thus, three separate flow channels are formed by the recirculation box 17 and the EAB 18 when the bundles 10 are aligned together. The upper channel (i.e., the recirculation channel) may be connected to a re-circulated fuel loop via a side port 107 (e.g., as shown in FIG. 15). The intermediate channel (i.e., the exhaust channel) may be connected to a module exhaust line via a side port similar to side port 107 but located on the opposite side of the module and at the appropriate height to accommodate the combustion zone. Similarly, other large circular holes in the lower sides of the EAB 18 allow the oxidant to flow laterally through adjacent bundles 10 resulting in a flow channel when the bundles 10 are aligned together. This flow channel may be connected to oxidant supply holes (e.g., as shown in FIG. 13). In another embodiment (for example, the arrangement shown in FIG. 2A), there are no sides; the plates are separated by pin and support arrangements.

Figure 7A:
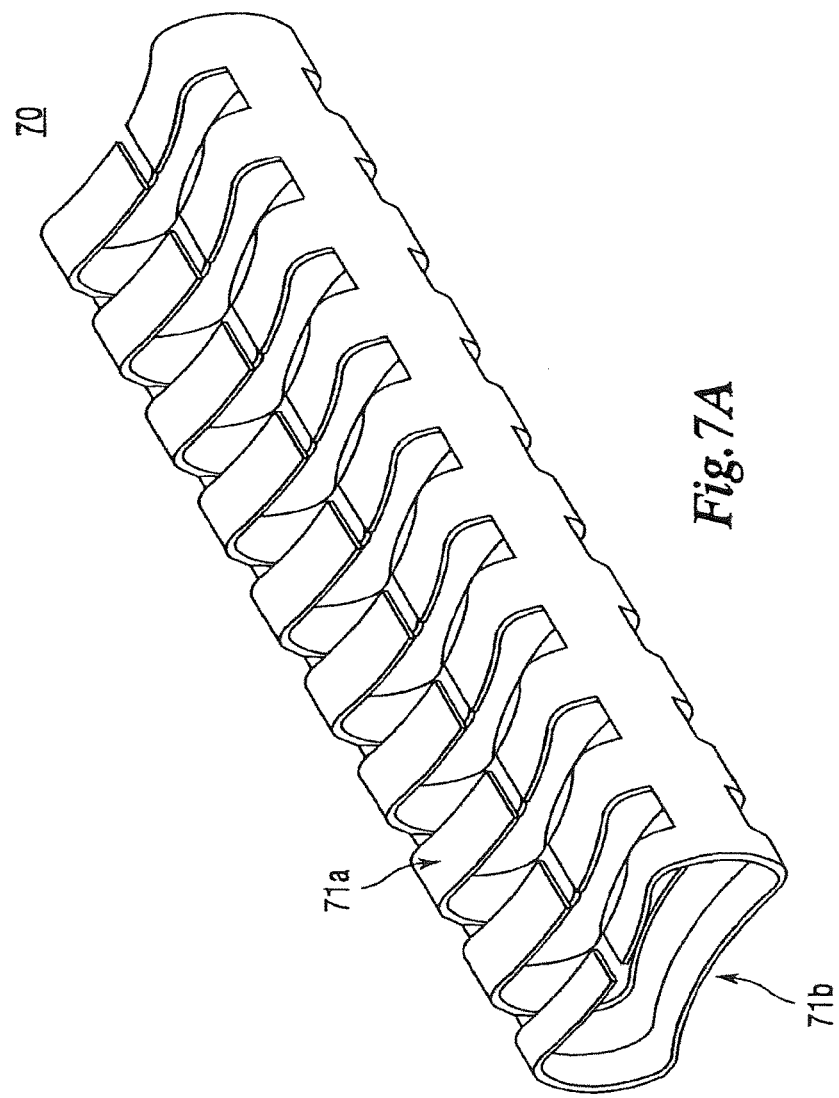
FIG. 7A is a perspective view of a cell-to-cell electrical connector according to one embodiment.
Figure 7B:
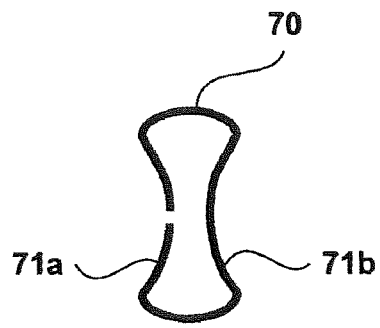
FIG. 7B is an end view of the cell-to-cell electrical connector of FIG. 7A according to one embodiment.
Figure 7C:
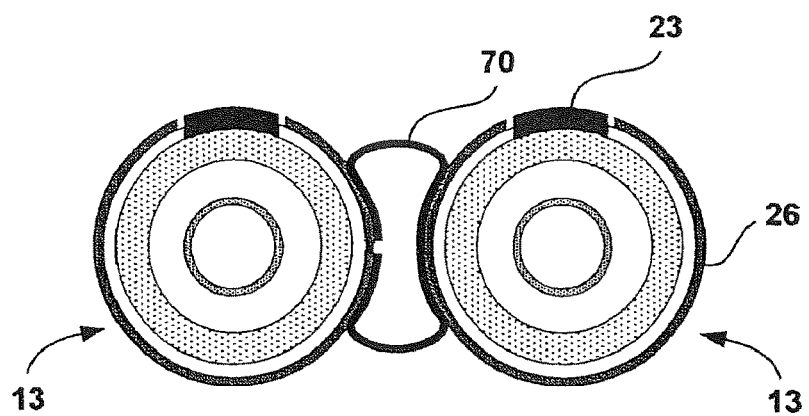
FIG. 7C is an end view of the electrical connector of FIG. 7A between two adjacent SOFCs.

FIGS. 7A and 7B are a perspective view and an end view, respectively, of a cell-to-cell electrical connector 70 according to one embodiment. FIG. 7C is an end view of the electrical connector 70 between two adjacent SOFCs 13. Electrical connector 70 is substantially shaped as an elongated oval (ovals of Cassini) and is sized to fit between adjacent SOFCs 13 in the multi-function bundle 10. As best seen in FIG. 7C, electrical connector 70 may be designed to electrically connect the fuel electrodes 26 of two adjacent SOFCs 13 or to connect the fuel electrode 26 and the electrical interconnect 23 of two adjacent SOFCs 13. To increase the contact area between the electrical connector 70 and the SOFCs 13, two opposing surfaces 71a, 71b of the electrical connector 70 may be shaped to match the outer surface of the SOFC 13.

It should be apparent to those skilled in the art that the shape of the cell-to-cell electrical connector may be altered while remaining within the scope of the present invention. For example, FIG. 7D is a perspective view of a cell-to-cell electrical connector 70 having a bow-tie-shaped cross section.

Figure 8A:
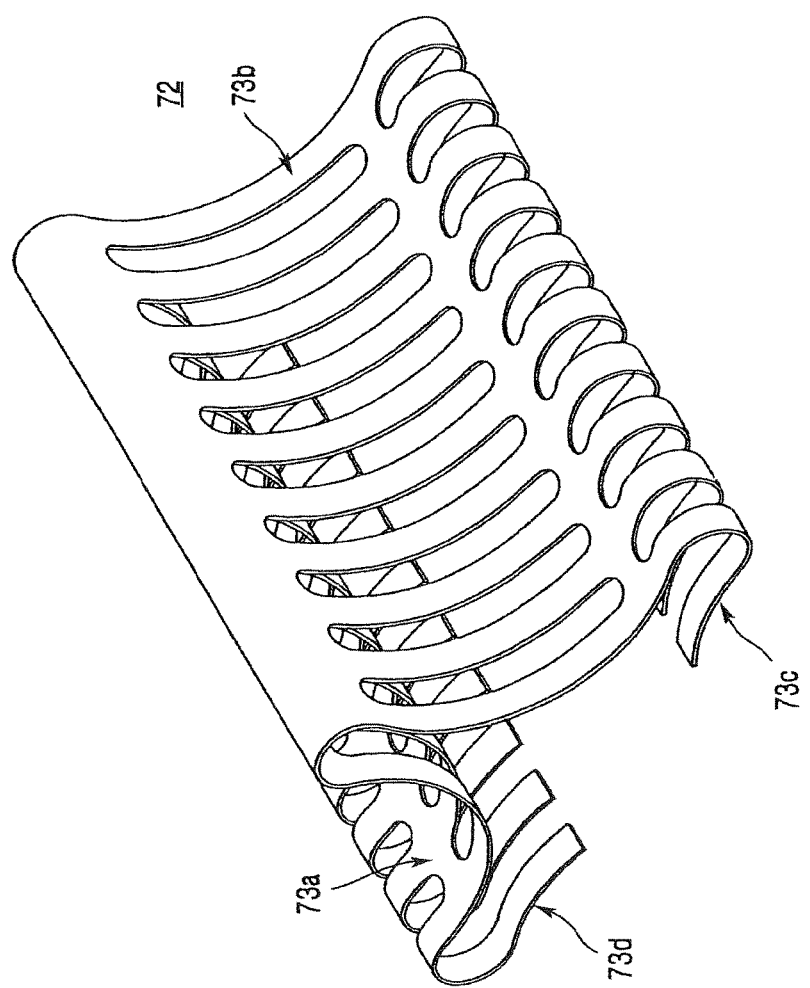
FIG. 8A is a perspective view of a cell-to-cell electrical connector according to another embodiment.
Figure 8B:
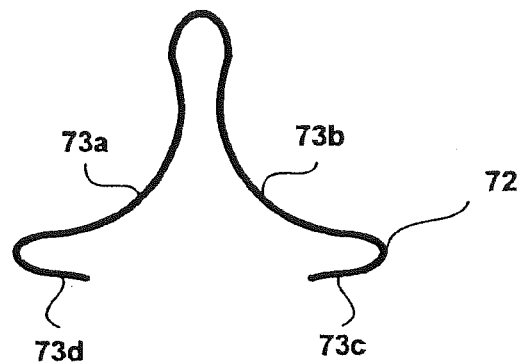
FIG. 8B is an end view of the cell-to-cell electrical connector of FIG. 8A according to one embodiment.
Figure 8C:
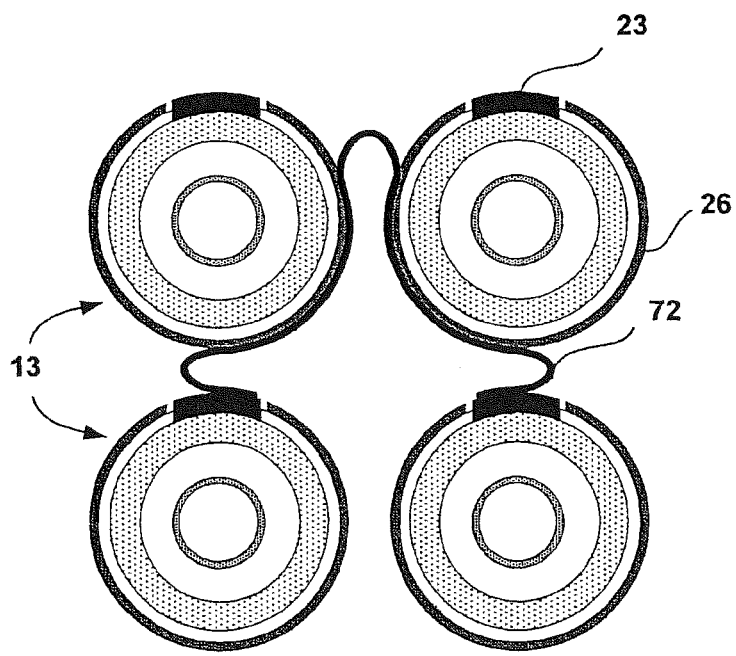
FIG. 8C is an end view of the electrical connector of FIG. 8A between several SOFCs.
Figure 8D:
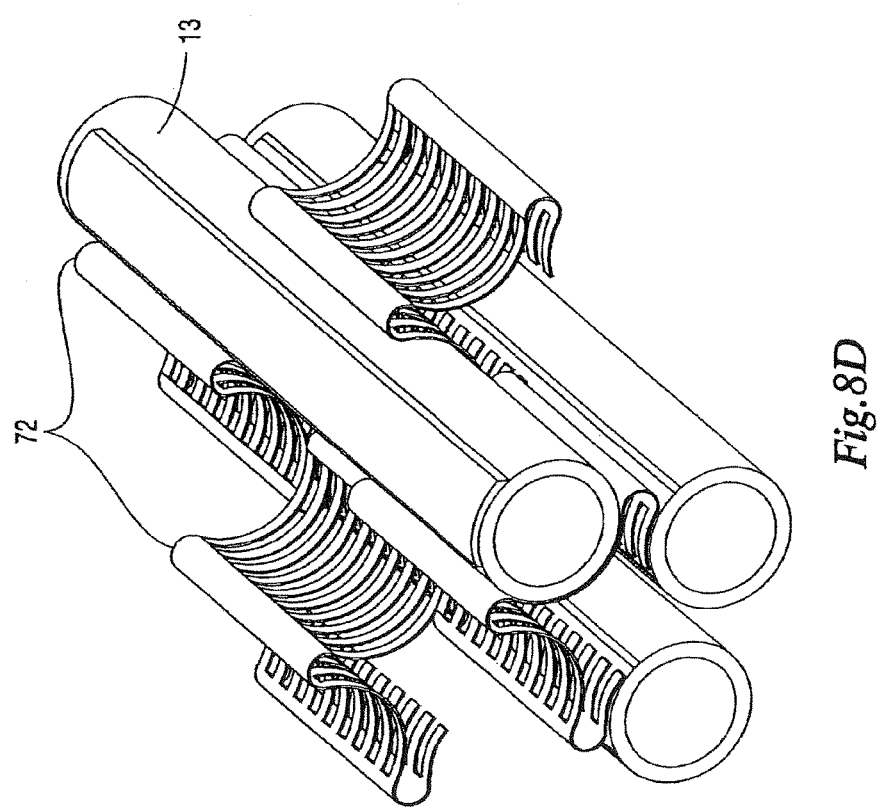
FIG. 8D is a perspective view of a cell-to-cell electrical connector of FIG. 8A between several SOFCs.

FIGS. 8A and 8B are a perspective view and an end view, respectively, of a cell-to-cell electrical connector 72 according to another embodiment. FIGS. 8C and 8D are an end view and a perspective view, respectively, of the electrical connector 72 between several SOFCs 13. Electrical connector 72 is shaped as an elongated series of curves and is sized to fit between adjacent SOFCs 13 in the multi-function bundle 10. As best seen in FIG. 8C, electrical connector 72 is designed to electrically connect the fuel electrodes 26 of two adjacent SOFCs 13 in the same row to each other and to the SOFC cell electrical interconnects 23 of two SOFCs from an adjacent row. To increase the contact area between the electrical connector 73 and the SOFCs 13, surfaces 73a, 73b of the electrical connector 72 may be shaped to match the outer surface of the fuel electrodes 26 and surfaces 73c, 73d may be shaped to match the outer surface of the electrical interconnects 23 of the SOFCs 13.

Figure 9A:
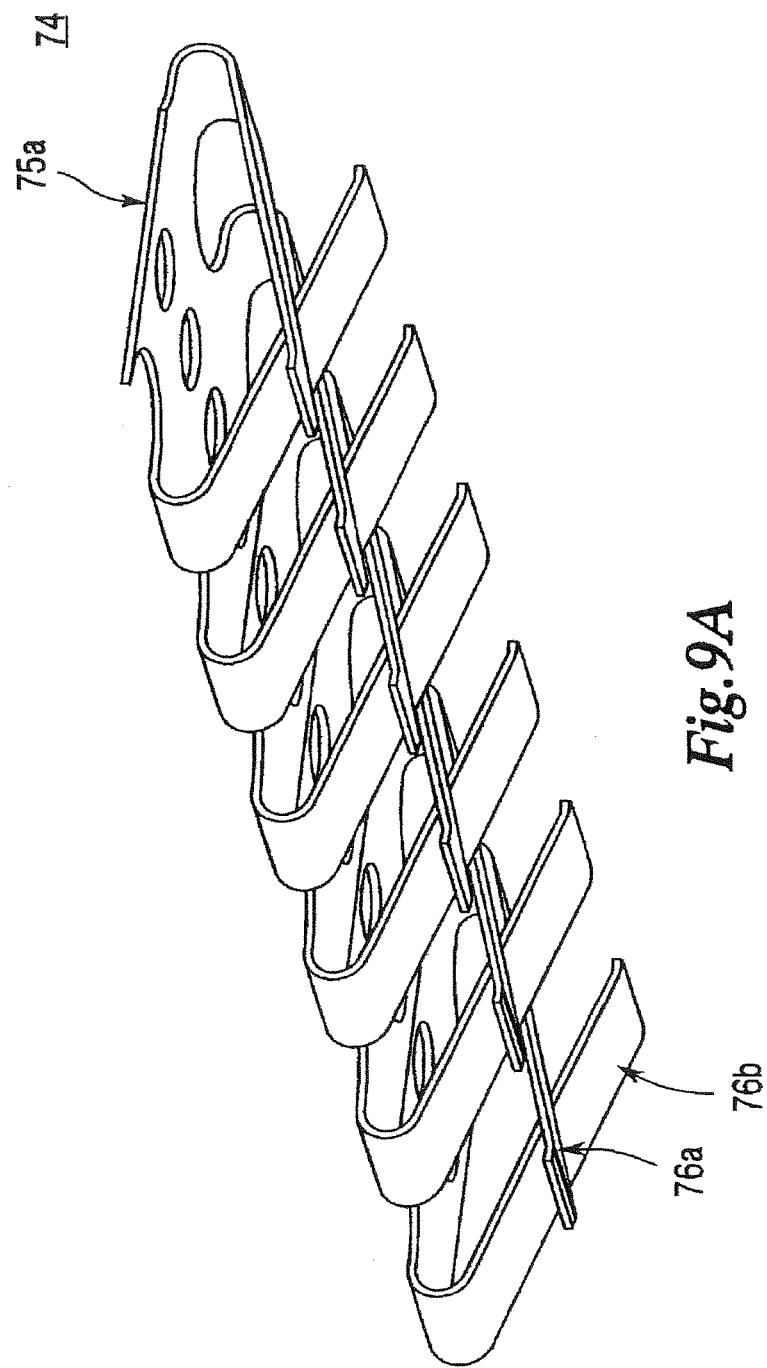
FIG. 9A is a perspective view of a cell-to-cell electrical connector according to another embodiment.
Figure 9B:
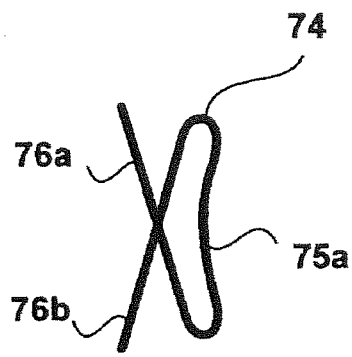
FIG. 9B is an end view of the cell-to-cell electrical connector of FIG. 9A according to one embodiment.
Figure 9C:
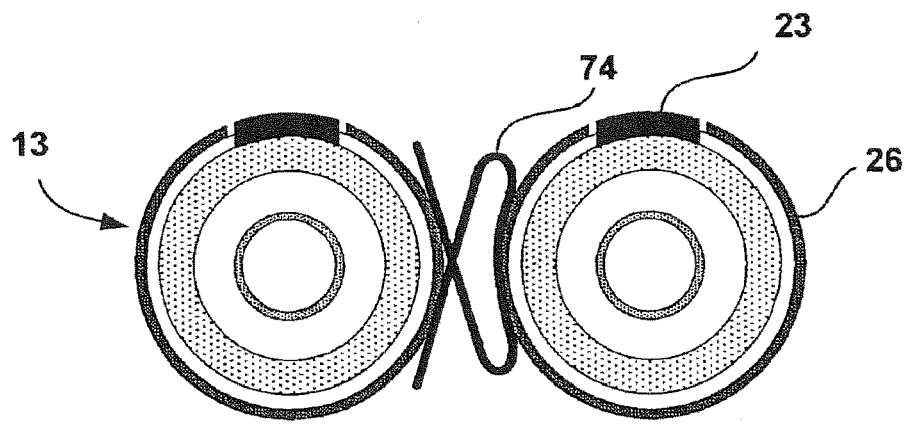
FIG. 9C is an end view of the electrical connector of FIG. 9A between two SOFCs.

FIGS. 9A and 9B are a perspective view and an end view, respectively, of a cell-to-cell electrical connector 74 according to another embodiment. FIG. 9C is an end view of the electrical connector 74 between two SOFCs 13. Electrical connector 74 has a curved back and a series of interleaved fingers 76a, 76b extending from either end. Electrical connector 74 is elongated and is sized to fit between adjacent SOFCs 13 in the multi-function bundle 10. As best seen in FIG. 9C, electrical connector 74 is designed to electrically connect the fuel electrodes of two adjacent SOFCs 13 or to connect the fuel electrode 26 and the electrical interconnect 23 of two adjacent SOFCs 13. To increase the contact area between the electrical connector 74 and the SOFCs 13, the surface 75a may be shaped to match the outer surface of the SOFC 13 and the angle between fingers 76a and 76b may be selected such that an SOFC 13 fits between the fingers 76a, 76b. Preferably, fingers 76a and 76b may be etched chemically to "roughen" their surfaces for enhancing attachment to cells 13 or other components during sintering.

Figure 10A:
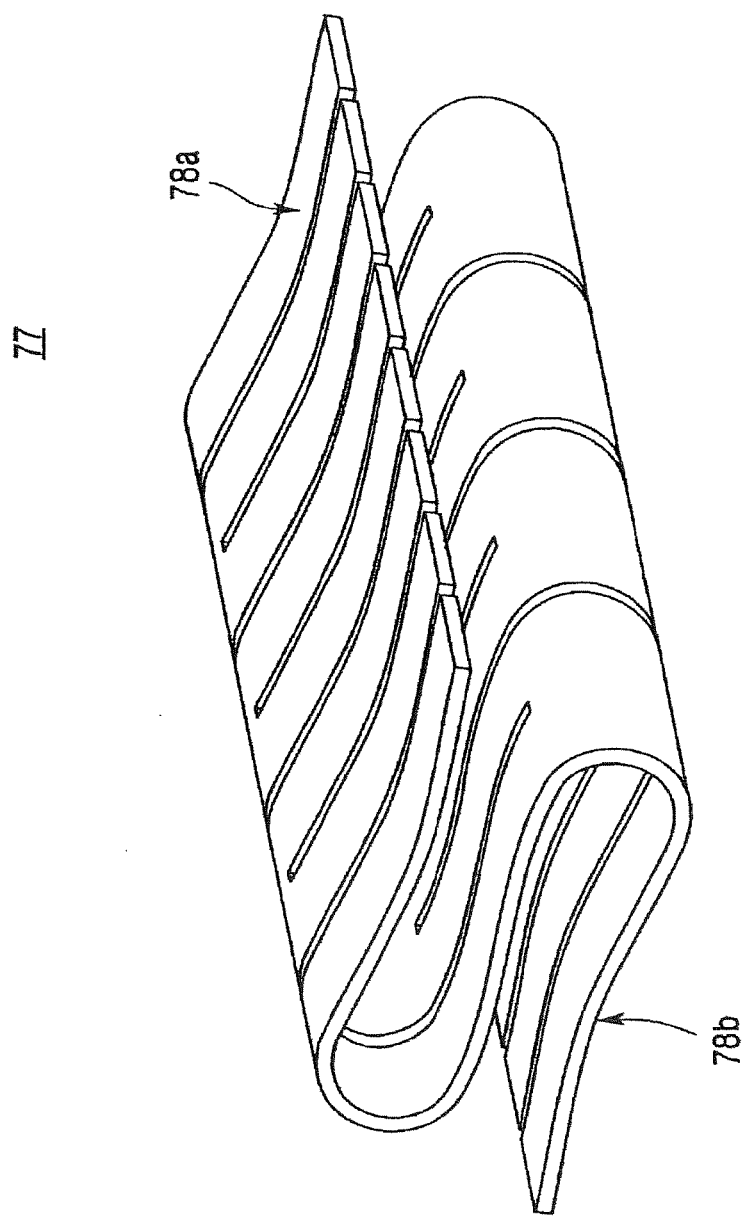
FIG. 10A is a perspective view of a cell-to-cell electrical connector according to another embodiment.
Figure 10B:
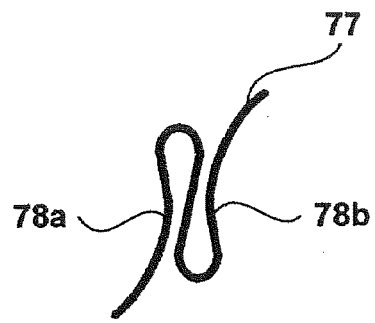
FIG. 10B is an end view of the cell-to-cell electrical connector of FIG. 10A according to one embodiment.
Figure 10C:
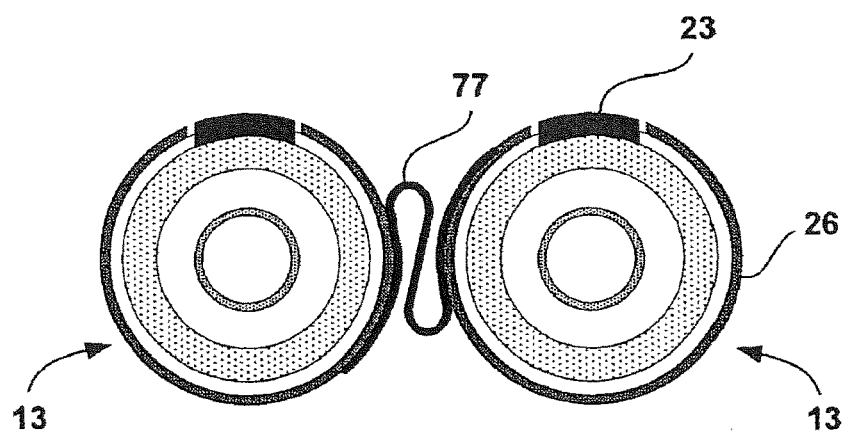
FIG. 10C is an end view of the electrical connector of FIG. 10A between two SOFCs.

FIGS. 10A and 10B are a perspective view and an end view, respectively, of a cell-to-cell electrical connector 77 according to another embodiment. FIG. 10C is an end view of the electrical connector 77 between two SOFCs 13. Electrical connector 77 is an elongated S-shape that is sized to fit between adjacent SOFCs 13 in the multi-function bundle 10. As best seen in FIG. 10C, electrical connector 77 is designed to electrically connect the fuel electrodes 26 of two adjacent SOFCs 13 or to connect the fuel electrode 26 and the electrical interconnect 23 of two adjacent SOFCs 13. To increase the contact area between the electrical connector 77 and the SOFCs 13, the surfaces 78a, 78b may be shaped to match the outer surface of the SOFC 13.

Electrical connectors 70, 72, 74, 77 may be manufactured from a single sheet of conductive material (e.g., nickel sheets). Portions of material may be removed from the sheet to reduce weight without adversely affecting the electrical conductivity of the electrical connectors 70, 72, 74, 77. The electrical connectors 70, 72, 74, 77 preferably define a plurality of parallel open slots creating a plurality of flexible members wherein the flexible members may further define holes and/or frays that may be parallel to each other. The sheet may then be folded, bent, and/or otherwise manipulated to obtain the desired shape. It should be apparent to one skilled in the art that other methods and materials may be used to manufacture the electrical connectors 70, 72, 74, 77 while remaining within the scope of the present invention.

Figure 11:
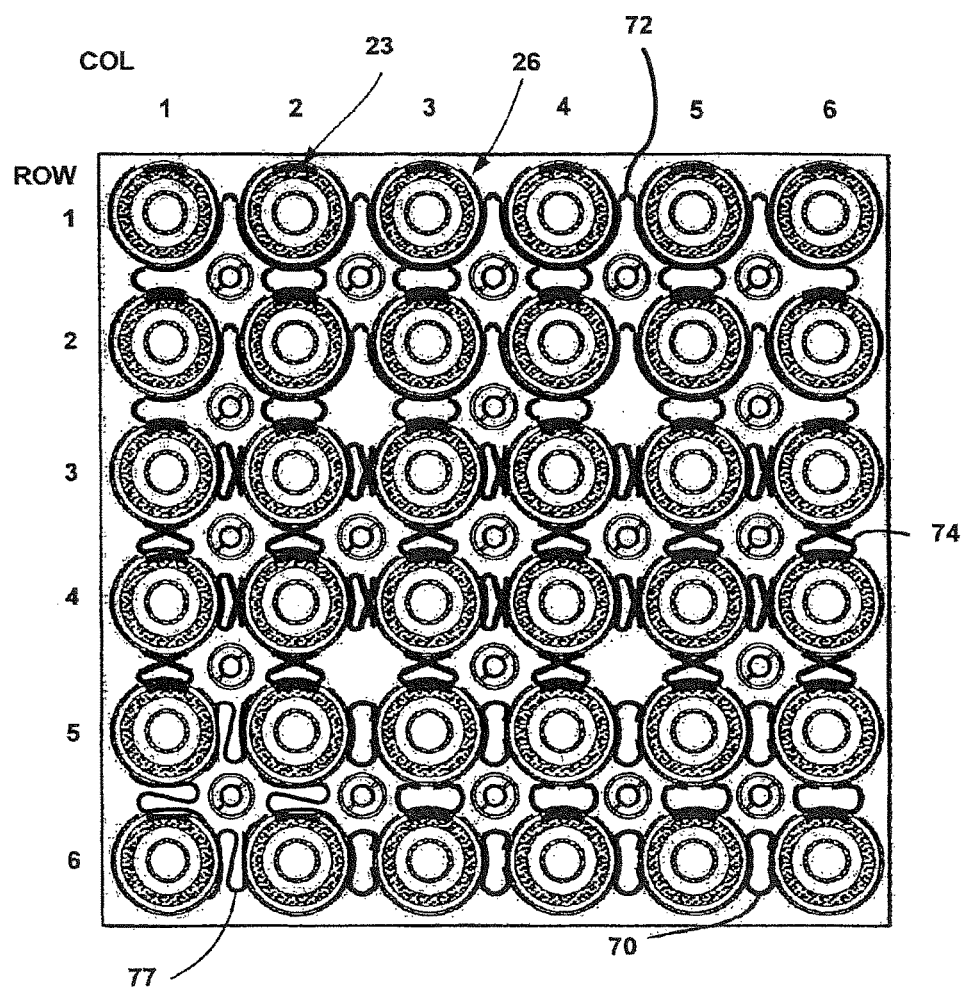
FIG. 11 is the cut-away view of the multi-function bundle of FIG. 1A illustrating cell-to-cell electrical connections according to one embodiment.

FIG. 11 is a cut-away view of the multi-function bundle of FIG. 1A illustrating the electrical connections using cell-to-cell electrical connectors 70, 72, 74, 77 according to one embodiment. For example, as seen in FIG. 11, the fuel electrode 26 of SOFC (1, 3) (i.e., the SOFC in row 1, column 3) may be electrically connected to the fuel electrodes 26 of both SOFC (1, 2) (i.e., its left adjacent neighbor) and SOFC (1, 4) (i.e., its right adjacent neighbor) and to the cell electrical interconnects 23 of SOFCs (2, 2) (2, 3) and (2, 4) (i.e., the SOFCs in row 2, columns 2, 3, and 4, respectively)

by alternatingly stacking the electrical connectors 72 (for example, as shown in the arrangement illustrated in FIG. 8D).

Additionally, the electrical interconnect 23 of SOFC (5, 5) is connected to the fuel electrode of SOFC (4, 5) by electrical connector 74, whereas the fuel electrode 26 of SOFC (5, 5) is connected to the fuel electrodes 26 of SOFC (5, 4) and SOFC (5, 6) and to the electrical interconnect 23 of SOFC (6, 5) by electrical connector 70. In addition to electrically connecting the SOFCs 13, the electrical connectors 70, 72, 74, 77 may provide structural support to the SOFCs 13. It should be apparent to one skilled in the art that the number, type(s), and pattern of electrical connectors 70, 72, 74, 77 used to connect cells within the multi-function bundle 10 and to connect two or more multi-function bundles in a stack 22 may be varied while remaining within the scope of the present invention.

Figure 12:
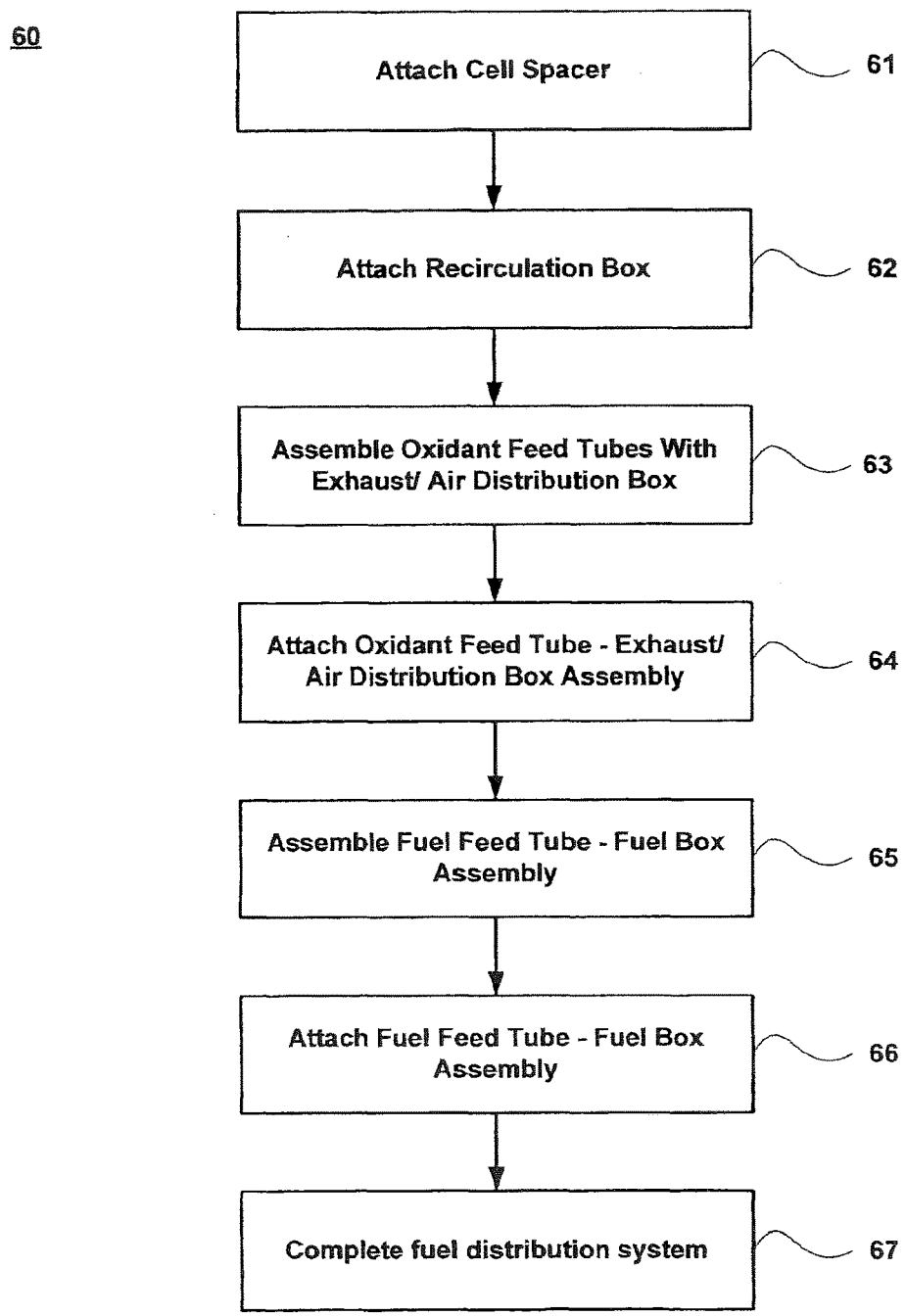
FIG. 12 illustrates an operational process for assembling the multi-function SOFC bundle of FIG. 1A according to one embodiment.

FIG. 12 illustrates an operational process 60 for assembling the multi-function SOFC bundle of FIG. 1A according to one embodiment. The assembly of the multi-function bundle 10 according to the current embodiment may be best understood with reference to FIG. 1B. In operation 61, the cell spacer 29 is attached to the primitive bundle 12 relative to the open ends of the SOFCs 13.

After the cell spacer is attached in operation 61, the recirculation box 17 is attached to the primitive bundle 12 relative to the open ends of the SOFCs 13 in operation 62. In the current embodiment, the top of the recirculation box 17 comes in contact with the cell spacer 29 attached in operation 61.

In operation 63, the oxidant feed tubes 14 are combined with the EAB 18. In one embodiment, an oxidant feed tube extender 14a is attached (e.g., with ceramic paste) to the end of each oxidant feed tube 14. The outside diameter of the lower portion of the oxidant feed tube extender 13a may be less than the diameter of the EAB box clearance holes to allow for alignment adjustments. Alternatively, the oxidant feed tubes 14 may be placed into individual seats in the EAB flat plate 18a. Ceramic paste may be applied to the oxidant feed tubes 14 or to the seats to bond the oxidant feed tubes 14 to the EAB 18.

After the oxidant feed tubes 14 are combined with the EAB 18 in operation 63 (and after the recirculation box 17 is attached to the primitive bundle 12 in operation 62), the oxidant feed tube/EAB combination is attached to the primitive bundle 12 relative to the open ends of the SOFCs 13 in operation 64. In the current embodiment, the top of the EAB 18 comes in contact with the bottom of the recirculation box 17.

In a preferred embodiment, each SOFC 13 includes a no-load voltage ring; No-load fuel electrode voltage ring or "Nernst Ring" 13c where "Nernst Voltage" is the ideal voltage of the SOFC 13 under no load, similar to the Nernst Ring 13c. Each Nernst Ring 13c is preferably made of fuel electrode slurry that has been formed into tape (sheet) that is about 0.006" thick. The fuel electrode slurry consists of about 29.66% poly vinyl alcohol (PVA) solution, about 69.84% nickel powder, and about 0.5% ceria powder (percentages based on weight). The PVA solution is made from about 13% Elvanol 75-15 PVA powder (dry) and 87% de-ionized (DI) water (percentages based on weight). The nickel powder is INCO 123 and the ceria powder is Tianjiao International 1017. The Nernst Rings 13c are cut from the sheets into short strips 0.125" wide by 1.28" long. The Nernst Rings preferably are wrapped around the cell approximately 0.06" from the edge of the fuel electrode 26 above the upper cell spacer plate 29 or 45. A 50% ethanol/DI water solution is applied to cause the Nernst Ring to bond to the surface of the cell prior to electrochemical vapor deposition (EVD) processing.

Each Nernst Ring 13c comprises a section of each SOFC electrode 26 with zero current flow. As a result, the Nernst Ring 13c comprises a sensor providing an open circuit (no current flow) voltage. The voltage from the Nernst Ring 13c is obtained from a wire 13d, preferably made of platinum, gold, rhodium or nickel or the like wrapped around the outside of each Nernst Ring 13c. The overall voltage of the SOFC 13 is measured from the fuel electrode 26 to the interconnection 23; the fuel electrode 26 and interconnection 23 represent the two polarities of the SOFC 13 (negative and positive polarities respectively). The Nernst Ring 13c is a short section of fuel electrode 26 and its voltage is also measured relative to the interconnection 23. Since the Nernst Ring 13c carries no current, its voltage is an indication of the fuel gas composition at that particular location along the length of the SOFC 13. Preferably, each SOFC 13 of each bundle 12 comprises a Nernst Ring 13c although not all of them are used for monitoring. The particular Nernst Ring voltages monitored in a bundle 12 will depend on the specific location of the SOFC 13. For example, SOFCs 13 in locations susceptible to oxygen back diffusion would likely be monitored and perhaps more than one cell's Nernst Ring 13c would be monitored from nearly the same location for redundancy in the event that an instrument lead 13d fails.

In one embodiment, the recirculation box 17 has a bottom plate 17a. The cell spacer 29, the recirculation box bottom plate 17a, and the EAB flat plate 18a each have a plurality of clearance holes therein. Each hole in the cell spacer 29 is aligned with a corresponding hole in the recirculation box bottom plate 17a, which is in turn aligned with a corresponding hole 18b in the EAB flat plate 18a. In one embodiment, the cell spacer 29, the recirculation box bottom plate 17a, and the EAB flat plate 18a each have thirty-six holes (i.e., one for each SOFC 13 in the primitive bundle 12). Note that other numbers of cells may be used to make the array. The diameter of the holes in the cell spacer 29 is preferably slightly larger than the outside diameter of the SOFCs 13. Thus, the ends of the SOFCs 13 in the primitive bundle 12 are aligned with and passed through the cell spacer 29. The diameter of the holes in the recirculation box bottom plate 17a is less than the outside diameter of the SOFCs 13. Thus, the ends of the SOFCs 13 cannot pass through the recirculation box plate 17a.

Each SOFC 13 may have an associated cell extender 13a. The cell extender 13a may be made from a ceramic material having thermal expansion characteristics comparable to those of the cell 13 (for example, zirconia or forsterite) and may be bonded to the end of the cell 13 with ceramic paste. The outside diameter of the cell extender 13a may be less than the diameter of the recirculation box clearance holes 46a to allow for thermal expansion and/or alignment adjustments. The cell extender 13a may include a shoulder 13b having a diameter greater than the diameter of the recirculation box clearance holes 46a. The shoulder 13b rests on the recirculation box bottom 17a and provides load-bearing support for the SOFC 13. The inner diameter of the cell extender 13a is greater than the outside diameter of the oxidant feed tube 14 such that oxidant can flow in the space defined between the cell extender 13a and the oxidant feed tube 14.

In addition to providing load support, the cell extender 13a prevents the depleted air from reacting with depleted fuel at the open end of the SOFC 13. The cell extender 13a also protects the open end of the SOFC 13 from wearing due to mechanical load and/or burning.

In operation 65, the top of the fuel feed tube assemblies 16 are inserted up through the appropriate holes in the CFF Spacer 20 and inserted into the corresponding appropriate holes in the bottom of the fuel box 19. The bottom of the fuel box 19 includes clearance holes to accommodate the entrance legs 40 of the fuel feed tube assemblies 16 as discussed above in conjunction with FIGS. 5A-5C. Ceramic paste is applied to the clearance between the fuel feed tube assemblies 16 and the holes in the bottom of the fuel box 19 to bond the fuel feed tube assemblies 16 to the fuel box 19.

The fuel box 19 may also have a ceramic fiber board material 21 attached to the lower surface of its bottom. The ceramic fiber board material accommodates small differences in the length of the SOFCs 13 due to manufacturing irregularities and tolerances.

After the fuel feed tube assemblies 16 are inserted through the appropriate holes in the CFF Spacer 20, through the corresponding holes in the bottom of the fuel box 19, and bonded to the fuel box 19 in operation 65, this assembly is attached to the primitive bundle 12 in operation 66.

In operation 66 the CFF spacer 20 is located with the primitive bundle 12 relative to the closed ends of the SOFCs 13. In one embodiment, the CFF spacer 20 may be made from a thin sheet of dense ceramic material (alumina) with ceramic fiber board 21 or with alumina felt between the dense ceramic material and the closed ends of the SOFCs, and may look similar to the head gasket from a conventional automotive engine. In one embodiment, the CFF spacer 20 is used to maintain the spacing between the SOFCs 13 and the fuel feed tube assemblies 16. The multi-function bundle 10 may be constructed without fuel feed tube assemblies 16 while remaining within the scope of the present invention.

In one embodiment, the multi-function bundle 10 may be placed in an oven and heated to a sintering temperature. The end loading provided by the sintering fixture collapses the ceramic fiber board material 21 underneath the fuel box 19 locally to provide custom seating surfaces for each individual SOFC 13.

After the fuel feed tube 16 and fuel box 19 combination is attached in operation 66, the remaining portion of the fuel distribution system is attached in operation 67. In one embodiment, fuel manifolds 54, an associated fuel manifold entrance port 55, and cast ceramic insulation may be added as discussed above in conjunction with FIGS. 5A-5B. Should a plurality of multi-function bundles 10 be used in a stack 22, a row header 57 and row header entrance port 58 may also be added as discussed above in conjunction with FIG. 5C. An outer shell may also be added to the multi-function bundle 10 if desired, for example, in the event bundle-to-bundle separation is needed or the module consists of only one bundle.

FIG. 13 is a cut-away side view of a fuel cell module 88 according to one embodiment. The fuel cell module 88 includes a pressure containment vessel 90 and a stack 22 of multi-function bundles 10. The pressure containment vessel 90 includes a dome 91 and base 92 which may be connected together, for example, using bolts.

The inner top portion of the dome 91 includes a series of concentric spherical end-rings, where a constant radius of curvature alternates between positive and negative for each progressively larger concentric ring. The progressive radial corrugations may result in an average external insulation thickness of 1.0 in. The corrugations also provide enough internal space to accommodate the recirculation flow passages without sacrificing active length.

In one embodiment, the dome's 91 configuration (with two radial corrugations (four diametral)) is similar to the ends of a conventional soup can. The dome 91 is designed to avoid bulging outward during normal operation. However during an overpressure condition, the dome 91 can bulge outward providing a built-in mechanism to rapidly relieve the excess pressure and absorb excess energy. Although the dome 91 may have to be replaced after such an incident, a potentially dangerous explosion can be avoided.

Figure 14:
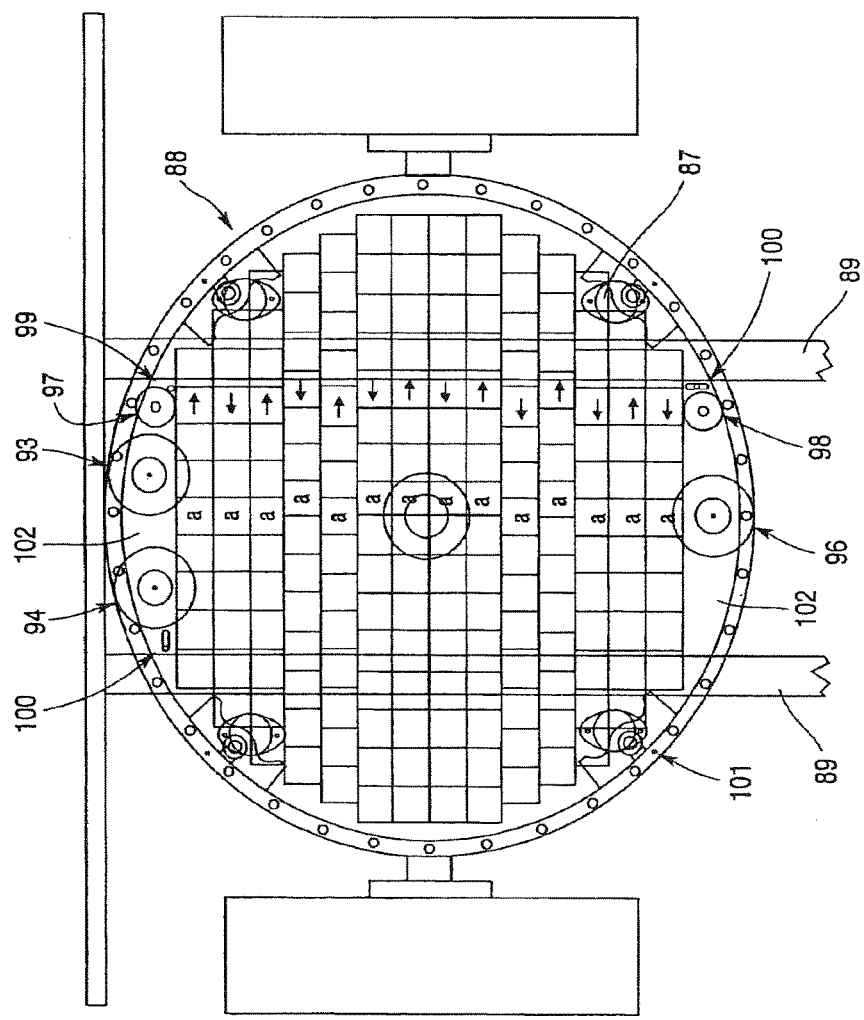
FIG. 14 is a partial top view of the fuel cell engine of FIG. 13 mounted on a truck chassis according to one embodiment.

Referring briefly to FIG. 14, the base 92 includes a recirculation entrance port feed through 93, a recirculation exit port feed through 94, an oxidant inlet port feed through 95, an exhaust port feed through 96, a positive electric terminal feed through 97, and a negative electric terminal feed through 98, among others. The base 92 may also include one or more module mounts 87 for securing the containment vessel 90, for example, to a vehicle chassis.

The base 92 serves as a fixture to provide a suitable foundation for assembling the multi-function bundles 10 into a stack 22. Returning to FIG. 13, the base 92 may include a rigid base plate 92a and a spherical outer wall 92b. Preferably, interactions between the stack 22 and the containment vessel 90 are limited to the stack's 22 contact with the base plate 92a. As a result, the upper end of the stack 22 can grow and shrink thermally within the pressure containment vessel 90 without constraint from the dome 91. The rigid base plate 92a provides a flat internal load bearing surface which may be supported by the spherical outer wall 92b. For example, the spherical outer wall 92b may include a ledge around its inner circular perimeter on which the rigid base plate 92a may rest. The rigid base plate 92a may form a false bottom relative to the spherical outer wall 92b. Thus, the rigid base plate 92a takes advantage of the rigidity of the outer spherical wall 92b while providing a means for oxidant flow distribution throughout the fuel cell module 88. With proper oxidant flow distribution, a uniform temperature may be maintained throughout the whole base plate 92 and thermal stress can be essentially eliminated. Additionally, the whole base plate 92 thermally isolates the bottom of the stack 22 from the external environment.

The rigid base plate 92a offers a flat reference plane during assembly of the stack 22 and remains flat throughout the operational range of the fuel cell module 88. Thus, the rigid base plate 92a prevents undesirable movement of the stack 22. For example, the rigid base plate 92a prevents excessive relative motion (which would result in surface fretting) between adjacent multi-function bundles 10 in the stack 22 during both normal operating conditions and during unusual conditions such as shock loading when the body forces can vary by as much as an order of magnitude.

As illustrated in FIG. 13, rigid base plate 92a is a circular plate that rests on the ledge around the inner circular perimeter of the spherical outer wall 92b. In addition, several supports 92c project upward from the spherical outer wall 92b to help support the rigid base plate 92a. In one embodiment, the rigid base plate 92a may be configured from webbed beam structures such as an "I" beam, which provide high strength per weight. The small "I" beams may be placed side-by-side and joined together to form a honeycomb structure.

FIG. 13 also illustrates the process gas flows throughout the fuel cell module 88 with respect to different activity zones. The small arrows represent the flow of various process gas. In one embodiment, the rigid base plate 92a includes three different rings of holes 92d to allow oxidant to move upward from the oxidant inlet port feed through 95 and into the EABs 18 of the multi-function bundles 10 of stack 22. Each EAB 18 has an open bottom to accommodate the oxidant flowing up through the holes in the rigid base plate 92a. The EABs 18 also have holes around the four sides to allow oxidant to flow laterally from one EAB 18 to another EAB 18.

As seen in FIG. 13, oxidant enters the fuel cell module 88 through the oxidant inlet port feed through 95 in the center of the base plate 92a. In one embodiment, the oxidant is distributed laterally in the air distribution zone 38 to all of the multi-function bundles 10 via the circular holes in the sides of the EABs 18. The oxidant enters the oxidant feed tubes 14 in each multi-function bundle 10 through circular holes in the EAB plate 18a. The fuel enters the fuel cell module 88 through the recirculation entrance port feed through 93 and is distributed to the row header entrance ports 58. The fuel then passes through the row headers 57, is distributed to the fuel manifold entrance ports 55, enters the fuel manifolds 54, and is distributed to the fuel feed tube assemblies 16.

After the fuel and oxidant electrochemically react in the active zone 32, the depleted fuel mixture arrives at the exit of active zone 32 (i.e., next to the recirculation zone 34). The depleted fuel mixture contains un-reacted fuel and reaction products (for example, a significant amount of water). The depleted fuel mixture passes from the active zone 32, through a set of controlled leakage seals (not shown), and into the recirculation zone 34. A portion of the depleted fuel mixture is extracted from the recirculation zone 36 via the recirculation exit port feed through 94 and fed to an external partial reformer via a re-circulated fuel loop and back to the recirculation entrance port feed through 93.

The remaining portion of the depleted fuel mixture passes from the recirculation zone 34, through a lower set of controlled leakage seals (not shown), and into the combustion zone 36. Combustion occurs immediately as the fuel mixture combines with depleted oxidant entering the combustion zone 36 from the open ends of the SOFCs 13. The combustion exhaust is then expelled from the fuel cell module 88 via the exhaust port feed through 96.

The electricity generated by the stack 22 of multi-function bundles 10 may be routed via leads (not shown) to an electric drive (not shown) via positive electric terminal feed through 97 and a negative electric terminal feed through 98. The electric drive may be used, for example, to drive the wheels of a truck or other vehicle.

To reduce overall weight, the dome 91 is not used to provide structural support to the stack 22, nor as a means to lift the fuel cell module 88. However, the dome's 91 flange, when properly bolted to the base plate 92a, provides a small amount of structural rigidity to the base plate 92a. The stack 22 is designed to be self-supporting when combined with the base 92, and therefore requires no support from (nor interaction with) the dome 91. The fuel cell module 88 may be lifted either from below (for example, by a fork-lift applied underneath the base plate to the thick ring support section), or from above (for example, using a special fixture that hooks into lifting holes 101 drilled into the base 92).

Little or no relative movement between the bottom of the stack 22 (i.e., the EABs 18) and the rigid base plate 92a is expected during normal operating conditions. However, in the event of unusual conditions such as an unusually large temperature differential, the stack 22 is allowed to move relative to the rigid base plate 92a without resulting in adverse loads. To control relative movement, the stack 22 may be pinned to the rigid base plate 92a.

The pin locations according to one embodiment are best seen in FIG. 14 which is a partial top view of the fuel cell module 88 of FIG. 13 mounted on a truck chassis 89. A reference pin 99 is located next to a positive electric terminal feed through 97. All relative movement between the stack 22 and the rigid base plate 92a will occur with respect to this reference pin 99. Two additional pins, called single-plane location pins 100, are also used to control stack 22 movement relative to the rigid base plate 92a. As illustrated in FIG. 14, a single-plane location pin 100 located next to a negative electric terminal feed through 98 (near the exhaust port feed through 96) allows the stack 22 to move relative to the rigid base plate 92a in a first direction. Likewise, a single-plane location pin 100 located next to the recirculation exit port feed through 94 allows the stack 22 to move relative to the rigid base plate 92a in another direction.

In one embodiment, all three location pins (the reference pin 99 and the two single-plane location pins 100) are rigid parts of the base plate 92a. The reference pin 99 fits into a tight clearance hole in an EAB end piece 102. The single-plane location pins 100 will each fit into tight clearance slots; the pin 100 next to the negative electric terminal feed through 98 only allows relative movement in the lateral front-to-back direction while the other pin 100 (next to the recirculation exit port feed through 94) only allows relative movement in the lateral side-to-side direction.

In addition to controlling the location of the stack 22 relative to the rigid base plate 92a, the location pins 100 may act as shear pins which prevent the stack 22 from undesirable movement during unusual shock loading. These pins 100 may be designed, for example, to accommodate a lateral shock load of 10 g's including a safety factor of 2×.

FIG. 15 is an isometric view of a stack 22 of multi-function fuel cell bundles 10 and associated support structures for the fuel cell module 88 of FIG. 13 according to one embodiment. The stack 22 consists of the desired number of rows of multi-function bundles 10 placed next to each other in the proper order, surrounded at the bottom by EAB end/side pieces 102, and surrounded at the middle and top by riser end/side pieces 103. A lower band 104 surrounds and holds the EAB end/side pieces 102 and an upper band 105 surrounds and holds the riser end/side pieces 103.

As illustrated in FIG. 15, the EAB end/side pieces 102 surround the EABs 18 and all together, form a structural support base for the stack 22 allowing it to make uniform contact with the rigid base plate 92a. The interface contact between the EAB end/side pieces 102 and the rigid base plate 92a provides a seal around the oxidant distribution zone of the stack 22. The seal is the result of intimate contact between the top surface of the base plate 92a and the bottom surface of the EAB end/side pieces 102.

The riser end/side pieces 103 are located directly above the EAB end/side pieces 102. The risers 103 may be made from a low-strength (low-density) ceramic material that provides thermal insulation. The additional height of the EAB end pieces 102 (relative to the EAB side pieces 102) is set to accommodate the process gas flow ducts since the riser material is unable to provide any significant structural strength. For example, FIG. 15 shows an outline (dashed lines) of an exhaust port 107 in the EAB end piece 102. The exhaust port 107 aligns with the exhaust port feed though 96 of the base 92. A recirculation exit port (not shown) is configured similarly in the EAB end piece 102 at the opposite end of the stack 22.

The stack 22 may be held together as a unit by two circumferential bands. In one embodiment, an upper band 105 may be at the height of a tongue-and-groove location on the fuel box 19 and the lower band 104 is at the height of the EAB 18 tongue-and-groove locations. As previously mentioned in addition to ensuring the relative location of adjacent bundles, the tongue-and-groove fits also enhance the zone-to-zone sealing capability. The tongue-and-groove fits allow the stack 22 to endure large loads (such as those encountered during shock loading), without significant and potentially damaging relative movement. Large relative movement normal to the axis of the tongue-and-groove is prevented. However, very small relative movement normal to the axis of the tongue-and-groove can occur when the edge friction forces are overcome, but the amount of relative movement is limited to the stack-up of the movements of the "tongues" within the clearance of the "grooves".

The clamping force provided by the bands 104, 105 holds the edge surfaces of the multi-function bundles 10 in contact with each other and thereby allows the stack 22 to act kinematically as a single unit. As a result, the force required to resist lateral shock loads is a constant regardless of the number of bundles 10 in the stack 22 (although additional rows of bundles increase the mass, they also proportionately increase the effective moment arm).

Although there are similarities, the upper band 105 may be significantly different than the lower band 104. Both upper 105 and lower 104 bands must accommodate hang-up and friction loads resulting from relative movement between the bottom of the stack 22 and the rigid base plate 92a, between the tongue-and-groove elements, and between the band 104, 105 and the material underneath the band (e.g., EAB side piece 102, riser end/side piece 103, etc.). In addition, both upper 105 and lower 104 bands must accommodate lateral shock loads and thermal expansion differences during both normal and start-up operating conditions of the fuel cell module 88.

Because the bottom of the stack 22 is pinned to the base plate 92a, the shock loading on the lower band 104 is significantly greater than that of the upper band 105. Also, the flexibility (inverse of stiffness) of the upper band 105 may be significantly greater than that of the lower band 104 to accommodate the low-strength characteristics of the risers 103 that are sandwiched between the upper band 105 and the fuel boxes 19.

In one embodiment, the lower band 104 may be 1.25 in high by 0.172 in thick. The overall thickness of the band may be achieved by combining eleven layers, each 1/64 in thick, to provide a combined thickness of 11/64 (0.172 in). The 1.25 in height is selected to be 0.25 in greater than the height of the EAB side pieces 102, thereby providing a small lip around the outer perimeter of the EAB side pieces 102 to help locate the riser side pieces 103. The lower band 104 may be made from inconel 718 which may be the same as the material of the EAB end/side pieces 102 to eliminate different thermal expansion rates. The cross-sectional area of the lower band 104 may be set to allow the band 104 to accommodate a large lateral shock load, for example, 10 g's. In addition, the cross-sectional area of the clamping-bolt (not shown) that holds the ends of the lower band 104 together may be the same (9/16-18 bolt).

During assembly and normal operating conditions, the temperature of the lower band 104 will be equal to the temperature of the EAB end/side pieces 102, therefore, there will be no thermal growth difference. Thus, lower band 104 flexibility is not needed for assembly and normal operating conditions. However, during start-up conditions, there is a significant thermal gradient across the EAB end/side pieces 102 resulting in a difference in temperature (and thermal growth) between the EAB end/side pieces 102 and the lower band 104. The lower band 104 may yield from stress due to thermal growth difference when the average temperature of the EAB end/side pieces 102 is 800 F greater than the average temperature of the lower band 104.

Figure 16:
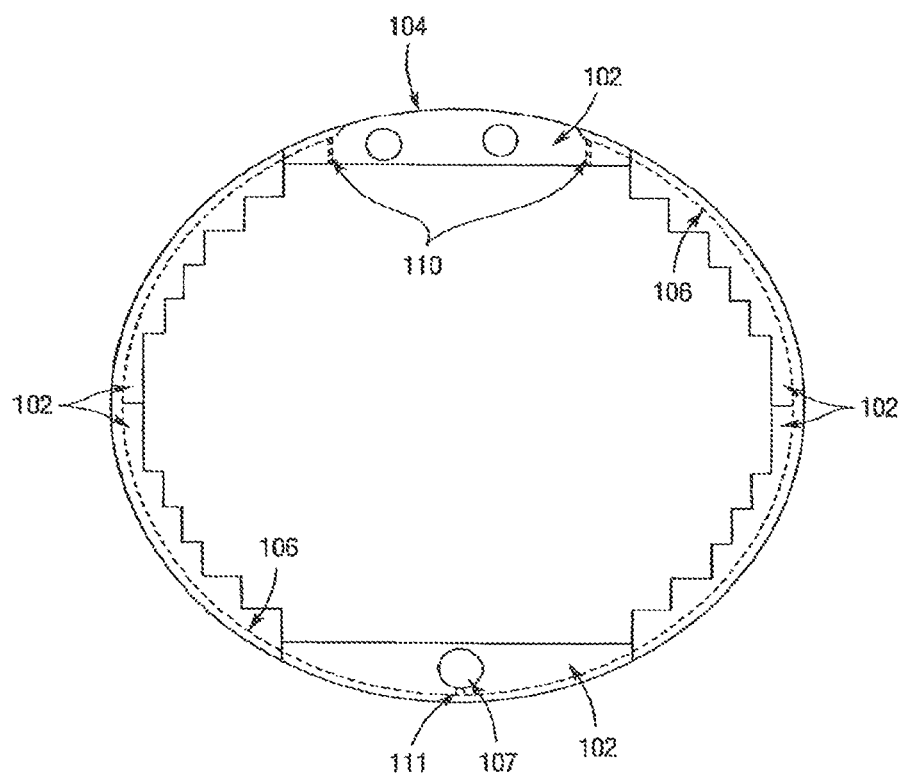
FIG. 16 illustrates the layout of the lower support structure of FIG. 15 relative to the base of the pressure containment vessel of the fuel cell engine of FIG. 15 according to one embodiment.

To make sure the average temperature of the EAB end/side pieces 102 cannot exceed the lower band 104 average temperature by 800 F, a small bleed-off groove 106 is machined in the outer surface of the EAB end/side pieces 102, underneath the band 104. Referring briefly to FIG. 16, heated oxidant is supplied to the bleed-off groove 106 via two oxidant distribution zone links 110. The oxidant flows through the bleed-off groove 106 and exits via an exhaust link 111 connected to the exhaust system. In one embodiment, the bleed-off groove 106 may be 0.25 inches wide by 0.25 inches deep. At the recirculation end of the stack 22, the groove 106 is linked to the oxidant distribution zone by two separate 0.25 inch diameter oxidant distribution zone links 110 drilled through the EAB end piece 102. At the exhaust end of the stack 22, the groove 106 is linked to the exhaust by a 0.35 inch diameter exhaust link 111 in the EAB end piece 102. FIG. 11 shows the overall layout of the bleed-off groove 106 arrangement for the lower band 104.

In one embodiment, the lower band 104 may be made from a high strength steel (for example, inconel 718) whereas the EAB 18 and EAB end/side pieces 102 may be made from a ceramic material (for example, alumina) having a thermal expansion rate significantly lower than that of the lower band 104. Clamping bolts (not shown) may be used to hold the ends of the lower band 104 together and provide sufficient preload on the lower band 104 to maintain the desired clamping load during assembly, normal operating conditions, and start-up/shut-down conditions. The small bleed-off groove 106 may be used to provide oxidant flow to maintain the temperature of the EAB end/side pieces 102 at a temperature near the temperature of the lower band 104.

The above-described embodiments of the invention are intended to be illustrative only. Numerous alternative embodiments may be devised by those skilled in the art without departing from the scope of the following claims. For example, the electrodes of the SOFCs 13 may be reversed such that the oxidant electrode forms the outside surface and the fuel electrode 26 forms the inside surface of the SOFC 13. With a few modifications, the fuel supply system and the oxidant supply system may be reversed in this embodiment. More specifically, the feed tubes inserted into each SOFC 13 are used to supply fuel to the fuel electrode. Fuel is supplied to these feed tubes using the EAB. These feed tubes may include a catalyst material to aid fuel reformation. Additionally, the feed tube assemblies inserted between each fuel cell are used to supply oxidant to the oxidant electrodes. Oxidant is supplied to these feed tube assemblies using the fuel manifolds. These feed tube assemblies do not need a catalyst material.

Figure 26:
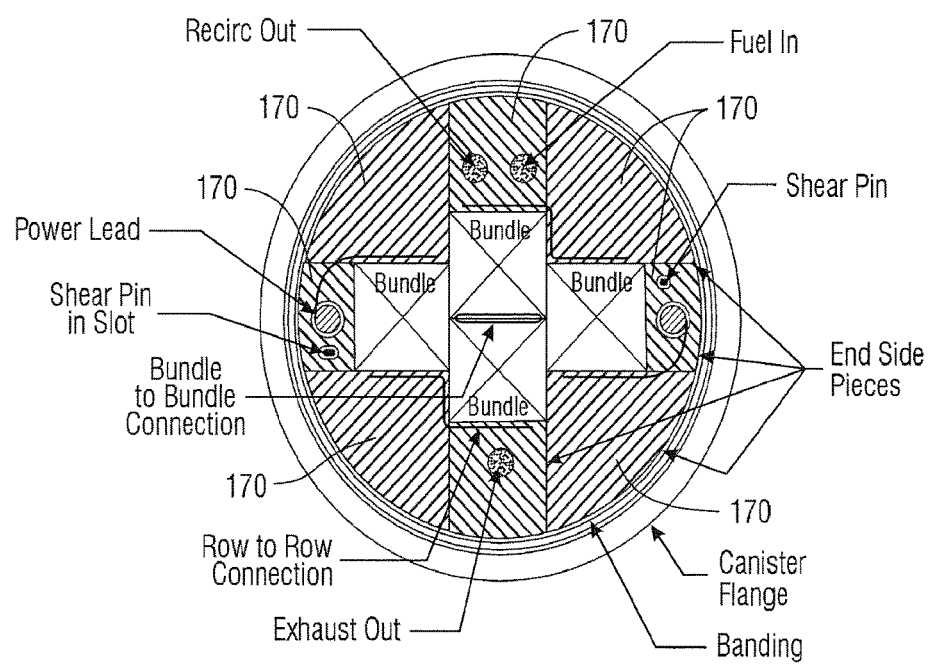
FIG. 26 shows a top plan view of a preferred insulation end pieces forming a bottom end stack assembly according to the present disclosure.

FIGS. 18, 19, 25 and 26 show preferred embodiments bottom-end stack configuration of the present disclosure for effective SOFC process gas handling in an SOFC bundle. FIG. 26 shows a top plan view of a preferred four-bundle stack according to the present disclosure. The insulation end pieces (IEPs) 170 (corresponds to EAB end piece 102 in FIGS. 14, 15, and 16 above) shown in FIG. 25 (having line shading and defined in the drawing as "End-side pieces") surround and hold the air combust recirc (ACR) box assemblies 172 or 180 for the SOFC bundles 10 shown in FIGS. 17, 19, 23, and 25. The IEPs 170 make up a significant part of the bottom end assembly 171 of the stack as shown in FIGS. 18, 19, 25-26. For the 4-bundle stack shown in FIG. 26, nominal pipe diameters of one inch (inside diameter) are preferred for all of the process gas flow lines (alternately the exhaust line of 1.25 inch diameter). Pipe diameters are preferably based on maximum load conditions and 100 ft/sec flow velocity to maintain reasonable line pressure drops.

Figure 28:
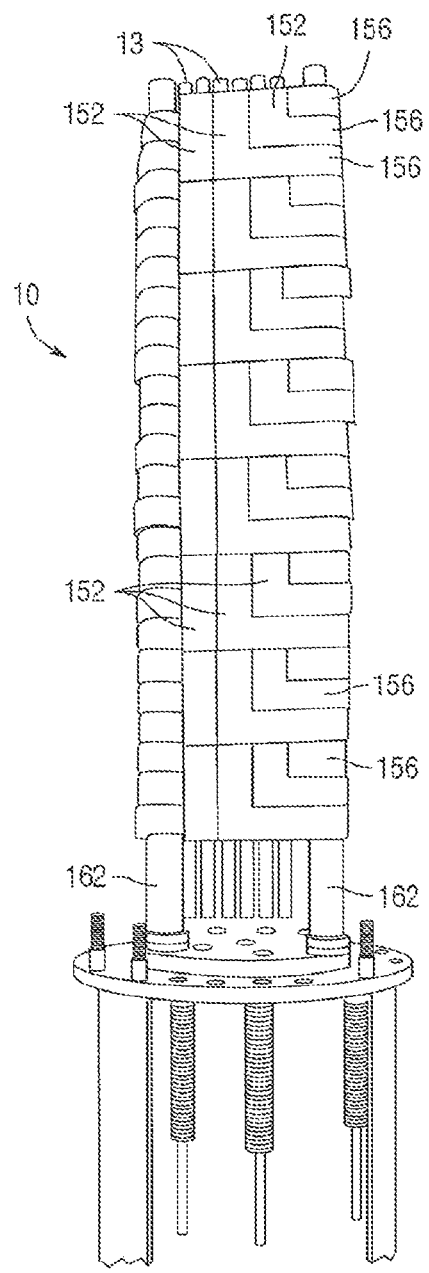
FIG. 28 illustrates a preferred multi-function bundle having a preferred flexible power lead transmission system of the present disclosure comprising cross-over plates and flag or ribbon-type transmission lines.

In addition to bundle-to-bundle (B-B) connection, the four-bundle stack also has row-to-row (R-R) connections. These R-R connections are preferably similar to demonstrated power lead connections for the SOFC bundles. B-B connection preferably comprise cross-over (C—O) plates 152 while R-R connections preferably comprise flexible flag electrical transmission lines 156 as in FIG. 28 described herein.

Figure 17:
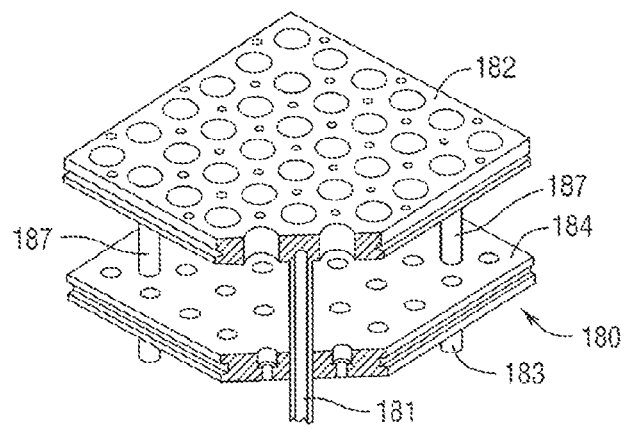
FIG. 17 is a top perspective view of a preferred pin-sleeve ACR box according to the present disclosure with a portion cut away to show the pin-sleeve arrangement.
Figure 18:
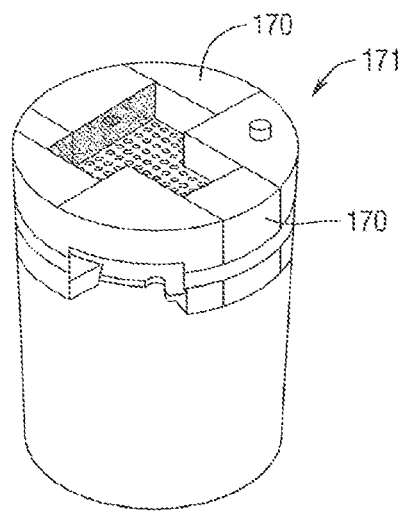
FIG. 18 is a top perspective view of preferred insulation end pieces forming a bottom end stack assembly according to the present disclosure.
Figure 19:
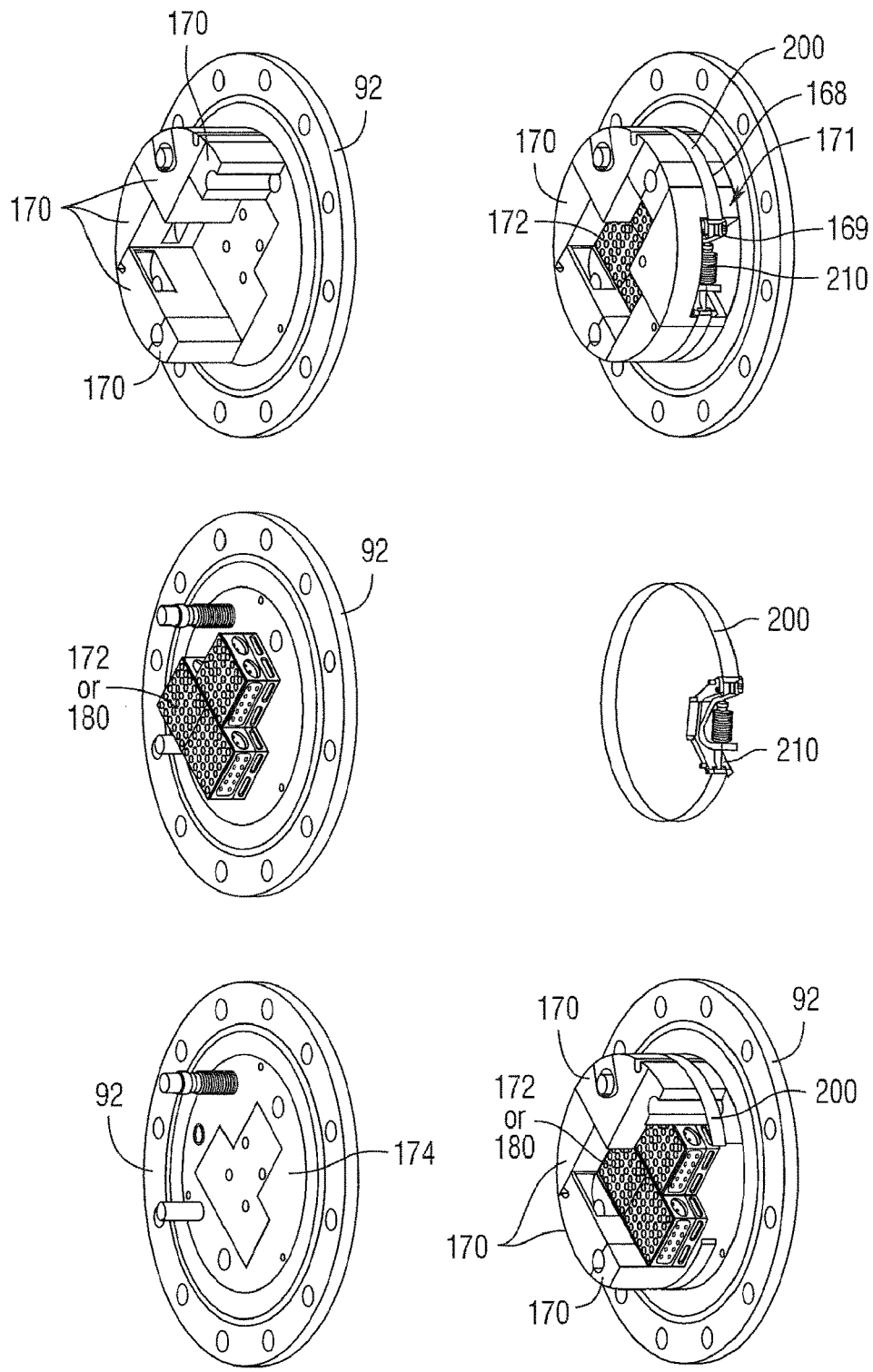
FIG. 19 shows top perspective views of various stages of assembly of preferred insulation end pieces forming a bottom end stack assembly according to the present disclosure.
Figure 20A:
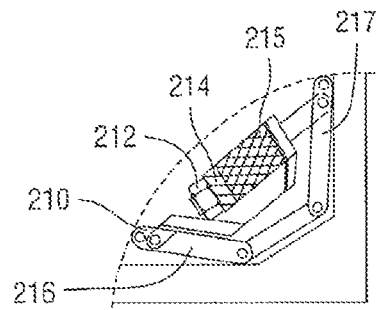
FIG. 20 shows top plan views of a preferred band clamp mechanism and components thereof for a preferred bottom end stack assembly of the present disclosure.
Figure 20B:
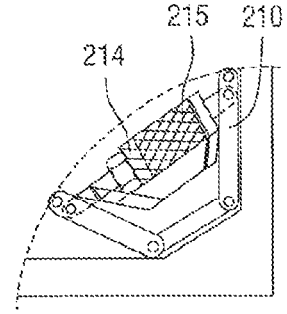
Figure 20C:
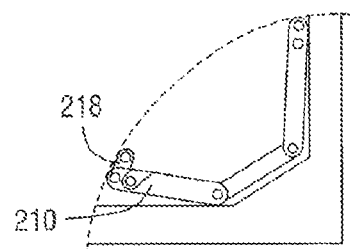
Figure 20D:
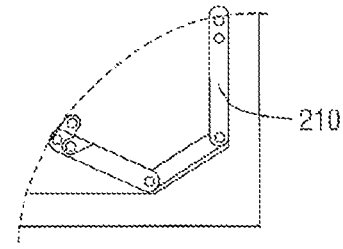

In a preferred embodiment shown in FIG. 17, the ACR box 180 of the present disclosure comprises a top plate 182 for receiving and spacing individual SOFCs 13 while bottom plate 184 receives and spaces oxidant feed tubes 14 that are disposed in respective SOFCs 13 and supply oxidant thereto. Support pins 181 and spacer sleeves 183 and 187 maintain the spatial relationship between plates 182 and 184. The design of ACR box 180 provides separation of process gases between the air, combustion and recirculation zones of the bundle 10. The design of the ACR box 180 allows for lateral movement relative to a much colder base 92 of a pressure containment vessel 90 of a preferred fuel cell engine of the present disclosure. The design of ACR box 180 is also simple to manufacture, accommodates effective sealing between the air, combustion and recirculation zones of the bundle 10, handles very high thermal gradients, is readily bondable to air feed tubes AFTs (oxidant feed tubes 14) and provides reliable face seal support for the open ends of the SOFCs 13.

The bundles are placed together to form rows so that the electric current passes from one bundle to another along the row length. Rows are then placed side-by-side to form a stack where row-to-row electrical connections are made at each row end such that all of the bundles in the stack are configured electrically in series.

Within each bundle preferably is a 6×6 array of 36 cells with 6 rows in each bundle having 6 cells connected electrically in series as described herein above; the 6 rows in the bundle are connected to each other electrically in parallel. Nominal cell voltage and current values are 1V at 0 Amps and 0.5V at 70 Amps. The resulting nominal bundle voltage and current values are 6V at 0 Amps and 3V at 420 Amps. For the four-bundle stack, the resulting nominal voltage and current values are 24V at 0 Amps and 12V at 420 Amps. The resulting four-bundle stack could produce 5.04 kW (12V×420 A=5040 W=5.04 W). Preferably optimally designed turbo machinery would increase the power output by approximately 16% due to pressurization and also approximately 13% due to heat engine energy recovery to become 6.6 kW (5.0 hp).

Surrounding the stack 22 of multiple bundles 10 are insulation end pieces (IEPs) 170. The IEPs 170 are located at the ends and sides of the stack 22 to provide a uniform circular outer shape so that circumferential banding can be applied to hold the stack 22 and IEPs 170 together as a unit. A layer of ceramic paper (gasket) preferably is placed between the flat mating surfaces for the purpose of spreading out any leakage thereby preventing the concentration of heat generated from combusted leakage.

Preferably, tongue and groove (T&G) fits may be provided along the sides of the boxes at two different location planes: around the perimeter of the first floor (air feed tube support floor) and around the perimeter of the second floor (tubular fuel cell support floor). A gas leakage assessment was done pertaining to controlled leakage seals such as the sliding gas seal between the bottom of the stack 22 and the base-plate 92, between the IEPs 170 and the stack 22, and between the IEPs 170 and other IEPs 170.

Preferably, an approach for sealing these mechanical face seals is to make the mating surfaces very flat so that there would be minimal clearance between the two surfaces for gas leakage. However, it may be difficult to establish and maintain suitable flat mating surfaces particularly when one includes corners and also joints between sections of the same kind of part. Thus, another preferred approach is similar in that the mating surfaces will be held tightly together. However, between the surfaces will be a layer of ceramic paper gasket.

Below is a characterization of the face seal having a layer of ceramic paper to form a gasket between the mating surfaces: preferably, the thermal conductivity of the ceramic cloth material should be as high as possible to help dissipate the heat from reacted combustible gas leakages.

There are two primary reasons for reducing the leakage: (1) engine performance impact: this will be small relative to localized heating, and (2) damage from localized heating: ceramic fiber gasket material should be placed between flat sealing surfaces to spread leakage out thereby preventing the concentration of heat generated from combusted leakage.

Below is a list of characterizations pertaining to the design of the IEPs: (1) determination of vertical split-lines for side-end pieces: need to be solid (no split) at all inside corners, need to be split at all outside corners, and need to be solid at all straight row-to-row joints; (2) need to implement shear pins between IEPs and the base-plate in at least two diametrically opposed side-end pieces for shock load; (3) one having tight fit and the other slotted to accommodate thermal expansion; and (4) need to connect gas ports to the multiple-bundle/stack via IEPs, represents new exhaust and recirc ports, fuel feed pipe can be implemented same as bundle test; would be through clearance hole in IEP.

For supporting the air feed tubes (AFTs), the effort focused on the alternative spacer plate design for reducing the heat transfer out the bottom of the stack, for keeping the AFT support plate and bottom ends of the AFTS hot, and thereby for keeping the bottom open ends of the SOFCs hot. Calculation of the conductive heat transfer through the AFTs showed 35 W heat loss to the air box based on $\Delta T=100$ C; the actual $\Delta T$ would likely be several hundred degrees. The alternative spacer plate design for supporting the AFTs uses two support plates where the AFTs are attached to the upper (hot) plate and the lower (cold) plate is attached at only four points for minimal heat conduction and for maintaining a small gap to provide radiation shield.

Preferably, the bundles 10 of SOFCs 13 will be employed in a solid oxide fuel cell (SOFC) engine for transportation applications. A current preferred bundle is a 6×6 array of 36 tubular SOFCs 13. A plurality of bundles 10 comprises a stack 22. Preferably, for a stack 22 of 3 bundles surrounding the base of such stack is to be an assembly of insulation end pieces (IEPs) 170. The outside diameter of the IEP assembly preferably is 13 inches and the thickness is 4.7 inches. A band preferably made of Inconel surrounds the IEP assembly and holds everything together.

The IEPs 170 preferably contain penetrations for power leads and tie-down rods. The insulation end pieces 170 also contain cut-outs for exhaust and recirculation gas ports.

Preferably, filler boards were machined out of AL-30 alumina insulation board; there were numerous pieces and all were 1 inch thick. These filler pieces were used primarily to fill the void space around the bundle. For a preferred 3-bundle stack, the IEPs 170 take the place of filler pieces at the lower end of the stack, are thicker (~4.7 inches thick), provide a uniform circular outer shape so that circumferential banding can be applied to hold the IEPs 170 and ACR boxes 172, 180 as a unit, collect and direct different process gas flows from and to the ACR boxes 172,180, provide a means for process gas feed-thrus with the base-plate 92, and provide a means for accommodating lateral shock loads via sheer pins between the IEPs 170 and the base-plate 92.

The preferred general requirements for the insulation end pieces 170 preferably include the following: Low thermal conductivity for low heat transfer out the bottom of the stack. Uniform surfaces for mating with gasket materials. Fairly good corners and edges to provide substrate support for gasket materials. Moderately high strength to structurally contain the bundle support boxes, transfer the banding load to the gasket seals, and transfer the lateral shock load of the stack to the shear pin (one of the penetrations is used as a shear pin). Comparable thermal expansion coefficients as bundle support boxes (dense alumina) to avoid large relative growth differences.

The splits were included to allow the IEPs 170 to be assembled and disassembled without having to remove the things that pass through the IEPs (power leads, tie-down clamp rods, recirc port that is an Inconel pipe used as a shear pin for locating the whole assembly).

Load-deflection tests were completed on six insulation blocks for the purpose of evaluating the composite strength with regard to coating particle size (large and small), firing temperature (1300 C and 1350 C), and coating application amount (none, "single", and "double"). Each of the six blocks was subjected to the same set of test conditions. Load was applied to provide a particular deflection starting at 0.002" and increasing to 0.011" in 0.001" increments. At each load condition, the actual load was recorded ("high"), and after a brief period of time, the reduced load ("low") was also recorded.

The tests provided fairly consistent results and also showed a fairly substantial increase in strength for most of the coating configurations. Large particle double-coat and single-coat fired at 1300 C appear to provide the greatest increase in strength. Small particle double-coat and single-coat fired at 1300 C show similar results except much lower strength increase. The results indicate that firing at 1350 C should not be used; the results were substantially lower strength (than those fired at 1300 C) and in some cases there was actually a decrease in strength from the coating.

Preferably, the process gas feed-thrus in the base-plate 92 may comprise metal-to-metal connections (with the base-plate) without need for the assemblies of ceramic pipes, metal bellows, and Conax fittings that are located below the base-plate 92. The design was primarily the result of the effectiveness of the 0.04 inch thick alumina paper as a gasket sealing material during bundle 10 sintering.

In another preferred design, alumina paper 0.04 inch thick is used as a gasket underneath the IFPs 170. This gasket forms the seal (controlled leakage seal) between the air distribution space and the fuel-side (thin annulus between the outer periphery of the IEPs 170 and the inside of the containment canister).

The process gas feed-thrus penetrate this gasket except for the air inlet which is preferably connected to a small metal chamber attached directly to the bottom of the base-plate 92. In a preferred embodiment, air may be fed into the metal chamber and flows upward through an array of holes in the base-plate and then into the bottom of the ACR boxes. In a preferred embodiment, there is no need for gasket material between the ACR boxes and the base-plate.

Each of three preferred process gas feed-thrus may be handled somewhat differently. Preferably, the feed-thru simply may be a hole in the base-plate 92 that would match up with a hole in the appropriate TEP 170. This concept can work for the exhaust port which is the least demanding. Leakage between the exhaust port (through the gasket) and the air distribution space is not combustible. Leakage between the exhaust port (through the gasket) and the fuel-side is only moderately combustible; the exhaust gas contains low oxygen concentration plus the path length to sustain combustion with the fuel-side would be long and tortuous.

The recirc port is the most demanding feed-thru with regard to gasket leakage. Using a simple hole in the base-plate 92 to match up with a hole in the IEP 170 is preferred. However, the area of concern is the leakage between the recirc port (through the gasket) and the air distribution space; this mixture is readily combustible. The leakage between the recirc port and the fuel-side is irrelevant (it's like leaking back to itself).

To address the potential combustible leakage, the recirc port was combined with the shear pin (needed to locate the stack 22 assembly on the base-plate 92 and to accommodate lateral shock loading in the TFCE). In another preferred design, the shear pin is in the form of an Inconel tube that is inserted through a close-fitting hole in the base-plate 92 and then welded to the Inconel base-plate 92 to form a gas-tight seal.

The gasket is placed onto the base-plate 92 and then the IEP 170 fits tightly (slight press fit) over the Inconel pipe and forced down onto the gasket. The gasket still provides resistance to leakage. However, the Inconel pipe substantially increases the length of the leakage path. The Inconel pipe also eliminates any direct (line-of-sight) leakage path. In addition, the Inconel pipe (and base-plate) provides a means for cooling any burning that may occur.

A preferred fuel inlet port has the bellows, Conax fitting, and ceramic pipe connection contained inside the canister above the base-plate 92 instead of below the base-plate. An Inconel Conax fitting is welded to an Inconel bellows that is welded to a hole in the base-plate 92. The appropriate length of ceramic fuel inlet pipe is then inserted and tightened into the Conax fitting after which the upper IEP 170 is fitted (slight press fit) onto the upper end of the ceramic fuel inlet pipe.

The joint between the fuel inlet pipe and the upper IEP should not be cemented in order to allow disassembly. To remove the pipe from the Conax fitting requires the Conax cap to be removed so that a core drill can be assembled (slide) over the ceramic pipe for removing the sealing gland packing in the Conax fitting.

Gaskets

The installation of gasket material in the tongue and groove (T&G) fit/seals along the sides of the ACR boxes and in the fit/seals along the sides of the insulation end pieces (IEPs) is preferred for certain embodiments of the present disclosure. Preferably for T&G, some places (groove) get gasket material and some (tongue) do not; the concern is the seal (or lack of seal) where the gasket stops and starts. Preferably, if all mating surfaces had grooves ("G") for G&G seal/fit, each surface could contain its own thermally expanding Mat for sealing; there would be no need to add something during assembly (the thermally expanding Mat could be applied consistently before final assembly).

For gasket leakage assessment: The width of the key ("tongue") does not appear to be a significant factor for gasket leakage. For the design of the ACR box 172, 180

(T&G seal/fit), it may preferable to reduce the width of the T&G seal/fit which would help to increase the thickness of the thin lip along the edge of the upper support plate. The Nextel and Cotronics sleeves already come in ⅛" wide strips in rolls that are 25 feet long. The groove width should remain at ⅛" wide unless the thin lip along the edge of the upper support plate becomes prohibitive. The tongue width (1/16" or 3/32") was not a critical factor for the leakage tests.

For strength of the ACR box 172, 180 structure, it is preferable to reduce the groove depth of the T&G fit/seals. Tongue and groove (T&G) fit/seal configuration works well along straight sections without breaks in the ACR boxes and IEPs. However, the interface between the ACR boxes 172, 180 and the IEPs 170 includes corners and breaks, thus it is preferable that: (1) Inside corner: Has no break in side-end piece or Has no break in ACR box; (2) Outside corner: Has break in side end pieces or Has no break in ACR box; (3) Straight section: Has break in side-end pieces or Has no break in ACR box; (4) Other straight section: Has no break in side-end piece or Has break in ACR boxes The T&G gasket leakage test results show that seal leakage perpendicular to the T&G seal can be controlled fairly well. However, there are "gap areas" along each side of the tongue that are not sealed (gasket material does not fill the "gap area"). Leakage gas can flow along and through these gap areas and eventually to vertical gaps such as the breaks between ACR boxes 172 and IEPs 170. Vertical splits that are not fully sealed provide an outlet for these leakage flow paths.

The gasket leakage across the T&G fit/seal can be made fairly low. The "gap areas" provide a leakage flow path along the axis of the T&G seal; this may require a short section of expanding Unifrax Mat or similar seal material oriented vertically at corners and breaks to block leakage through "gap areas".

It is preferable to seal between the IEPs 170 and the ACR boxes 172 on the sides of the stack having no "tongues". There are no "tongues" on the side-end pieces. To use T&G sealing approach would require the installation of a rod to simulate the tongue or make the side-end pieces with T&G configuration.

Anything causing a rigid "fit" between the ACR boxes 172 and the IEPs 170 would be difficult with regard to vertical fit and alignment. The IEPs 170 rest on ceramic paper gasket material which allows the vertical height to vary somewhat. The ACR boxes 172 rest directly on the base-plate.

Preferably, the gasket material fills the groove to result in a reasonable gas seal (in all directions) yet does not have sufficient shear strength to apply significant shear force to a mating component. Preferably, Unifrax Mat material provides a fit as well as a seal. The Unifrax Mat had little or no shear strength which is exactly what is preferred.

In some preferred embodiments of the present disclosure, an important aspect of the design is the gasket seal configuration of the IEPs 170 compared to that of the ACR boxes 172. Use groove and groove (G&G) seal configuration for ACR boxes 172: (1) No ceramic paper gasket underneath ACR boxes 172; (2) Use Mat gasket in all grooves. No grooves in IEPs 170: (1) No Mat gasket required; (2) Use ceramic paper gasket underneath IEPs 170; (3) Use ceramic paper gasket between IEPs 170.

In some preferred embodiments of the present disclosure, the relative growth difference between the stack (ACR boxes 172 and IEPs 170) and the base-plate 92 depends on the thermal coefficients of expansion, the rise in temperature, and the characteristic length. The recirc port preferably may be used as the shear pin and therefore the remainder of the stack 22 grows or shrinks relative to the location of the recirc port. For the multiple-bundle stacks shown in FIGS. 18, 19, 24, 25 and 26, the furthest feed-through from the recirc port is the power lead 162 (~10 inches).

The thermal expansion of the stack 22 is assumed to be that of alumina. The temperature of the interface between the stack 22 and the base-plate 92 is assumed to be 420 C The resulting difference in growth between the base-plate 92 and the stack 22 is 0.027 inch; the base-plate 92 grows 0.027 inch more than the stack 22 for a length of 10 inches when heated to 410 C (from 20 C room temperature). Therefore, the base-plate 92 feed-thrus and attachments that penetrate the stack 22 preferably need to have sufficient clearance to accommodate this relative growth difference.

The ceramic paper gaskets preferably must be compressed with pre-load such that they can relax at operating temperature (or other conditions) and still maintain sufficient compression for sealing. The ceramic paper gaskets requiring the greatest flexibility to accommodate thermal growth differences are those between the vertical splits of mating IEPs 170; of these, the most demanding location for vertical split gaskets is along the side of two adjacent ACR boxes 172 in the 3-bundle stack 22 shown in FIGS. 18, 19, 24, and 25. The ceramic paper gasket between the IEPs 170 and the base-plate 92 does not require compression flexibility to accommodate thermal growth differences.

In some preferred embodiments of the present disclosure: the tie-down clamp load has a direct effect on leakage through the top and bottom horizontal face gaskets; the banding clamp load has a direct effect on the vertical gasket leakage; removing the pipe unions (tie-down clamp enclosures) had very little impact on leakage. This may be related to the beveled base-plate surface causing the gasket sealing to occur mostly in the inner areas next to the ACR boxes; increasing the vertical gasket thickness (by 2X) had the greatest impact on combust zone leakage; although all leakage increased as a result of increased vertical gasket thickness, the combust zone was affected most; greater banding clamp load is needed to compensate for increased vertical gasket thickness; the amount of alumina coating on the IEPs has a direct effect on leakage through the IEPs; thermal cycling the gaskets reduces leakage despite burning out gasket binders; gaskets are unusable and should be replaced after disassembly when binders are burned out from thermal cycling; operation at high temperature results in lower gasket leakage due to expansion of the leakage gas at temperature; the banding should be "seasoned" before use in actual application in order to eliminate stretch from the end loops when operated at high temperature; IEP thin sections (next to the tie-down bolts) are susceptible to breaking.

Banding Clamp

The clamping force from the banding 200 preferably must overcome the forces needed to compress the vertical split gaskets (APA-1 ceramic paper) and also the gaskets around the periphery of each ACR box 172 (thermally expanding Mat). The force to compress the ceramic paper gaskets was based on 8 psi loading which appears to be the maximum load the ceramic paper can sustain. The force to compress the Mat gasket is composed of two parts: Cold compression (initial load to compress the gasket prior to thermal cycle); Thermal expansion (the force created by the gasket as a result of permanent expansion from thermal cycling).

The banding clamp 210 apparatus depends on a simple linkage to allow the disc spring assembly 212 to be nestled in the insulation end piece (IEP) 170 while at the same time maintain "tangential" clamping pull force on the banding 200. The clamp apparatus 210 can also be put together and readily tightened/loosened from outside the perimeter of the banding 200. The connections between the banding 200 and the clamp 210 preferably are designed to allow length adjustments for accommodating small differences in banding length resulting from tolerance build-up and slack.

The diagrams of FIG. 20 show a preferred stack banding clamp 210 configuration. The first two sketches (A and B) show the clamp for accommodating minimum and maximum banding length respectively. The two sketches (A and B) show how the clamp configuration can accommodate different banding lengths within a range of ~0.5 inch. The double 215 and single 214 cross-hatched areas represent the fully compressed disc spring 212 length and the change in disc spring 212 length (total deflection) respectively.

In sketches A and B, both left and right-hand hinge plates 216, 217 are identical. In sketches C and D, the left-hand plate has been replaced with a special hinge plate 218 for accommodating additional banding slack. All of the linkage joints as well as the banding connections are preferably made with 3/16 inch diameter Inconel 718 pins. Preferably, the banding 200 wraps around the pin 220 and fastens to itself via TIG welding.

Preferably, the banding 200 and clamp assembly 210 are designed to provide the force needed to hold the gasket seals together initially at room temperature and also at operating temperature which includes manufacturing. In a preferred embodiment, the temperature at the centerline of the banding 200 was estimated to be 634 C (1173 F) during operation. The actual temperature may be somewhat higher or lower. The temperature of the banding assembly 210 may also be different when being used in the setup for bundle-to-bundle (B-B) and row-to-row (R-R) sintering.

Preferably, the banding clamp 210 is designed to apply a substantial clamping force at room temperature. At operating temperature, the disc spring 212 deflection should account for the thermal expansion difference of the different materials. If the banding 200 were to be exposed to very high temperature, it would yield somewhat. However, there would still be sufficient strength to maintain the gaskets for sealing.

Preferably, the end loops on the banding are formed in the shape of a "P" cross-section in order to avoid sticking out beyond the outer circumference of the band 200 around the IEP 170 assembly. To form the "P" cross-section, the bent tab ("kick") at the end of the band should be at an angle of ~45°. The band loop is then formed around two pins; the second pin is necessary to hold the end. To get the "P" shape, the loop is placed in a sharp-corner vise for pushing on the end of the tab (with the pin in place).

In a preferred embodiment of the present disclosure, the clamping force of clamp 210 straightens out the linkage consisting of the low-angle side piece and the bottom piece. The straightening out effect reduces the inward bending of the band 200 at the low-angle side thereby keeping the band closer to a circular arc over the cut out 169 for the banding clamp 210 in the IEP 170. The clamping force causes the bottom end of the high-angle side piece of the banding clamp to move toward the side wall of the cut out 169 in the IEP 170. The side wall may need to provide a lateral reaction force. The bottom wall may need to provide a bottom reaction force but only when that band connection moves away from the side wall.

Preferably, the clamp is symmetrical even though this may reduce the allowable span length of the cutout 169 in the IEP 170.

Figure 21:
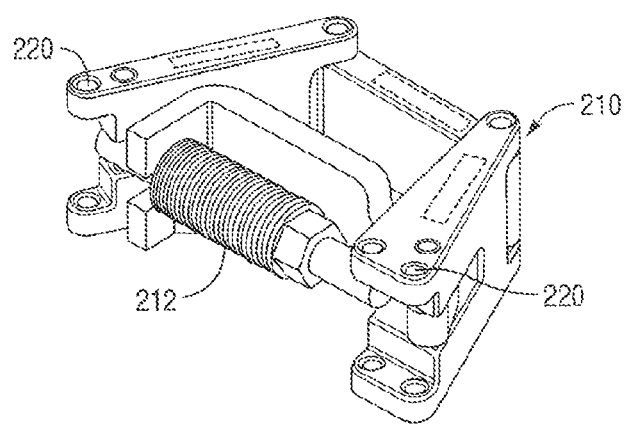
FIG. 21 shows a top perspective view of a preferred band clamp mechanism for a preferred bottom end stack assembly of the present disclosure.

In another preferred embodiment of the present disclosure, the banding clamp 210 is a non-symmetrical clamp to take advantage of the maximum length (span) of the cutout 169. However, the non-symmetry aspects could result in too many unknowns particularly with regard to the movement of the linkage. The symmetrical design allows the cutout 169 to better constrain the movement of the bottom linkage. Symmetrical also preferably makes the movement of both end linkages the same regardless of band length, and prevents the band 200 from over compressing the edge of the cutout 169. FIG. 21 shows a preferred "symmetrical" banding clamp 210 design of the present disclosure.

Figure 22A:
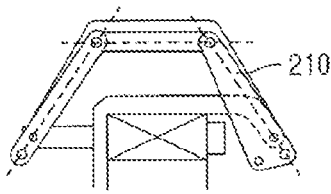
FIG. 22 shows top plan views of a preferred band clamp mechanism in open and closed positions for a preferred bottom end stack assembly of the present disclosure.
Figure 22B:
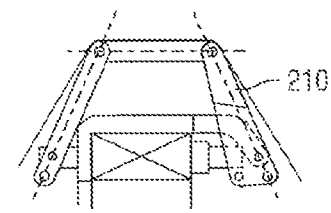

FIG. 22 is a drawing made so that the resulting configuration could be viewed as a symmetrical design. Overlay sketches were then made to show the clamp 210 fully extended and also fully closed to reveal the relative movement of the clamp components. The disc spring retainer-end connection was modified to provide room for the bolt-end when the clamp 210 is fully contracted. FIG. 22 shows the banding clamp 210 fully open FIG. 22(A) and fully contracted FIG. 22(B) for comparison.

In a preferred embodiment, the cutout 169 in the IEP 170 was modified to remove the floor so that the cutout extends to the Inconel base-plate. This was done primarily for the following two reasons: when the cutout 169 includes a floor, it would be very difficult and costly to machine particularly when trying to hold close tolerances for fitting tightly to the banding clamp 210. Removing the floor from the cutout allows the cutout 169 to be readily machined via end mill from the bottom side. Removing the floor from the cutout 169 allows greater heat transfer from the banding clamp 210 to the Inconel base-plate 92 thereby reducing the temperature of the banding clamp 210 (to maintain its temperature below 600 C, 1100 F). Although the upper portion of the side wall of the cutout would be the same height as the high-temperature combustion zone, the bottom portion would be directly across from the low-temperature air distribution zone which would also help to maintain low temperature.

In a preferred embodiment of the present disclosure, the size of the cutout 169 is preferably determined by the following: when the banding clamp 210 is fully open, its radial location is determined by the banding end connections. The outermost point on the inside diameter of the pin joint hole should be tangent with the circumference of the banding groove 168 in the insulation-end piece (IEP) assembly. The outer width of the cutout 169 should be equal to the outer width of the fully open banding clamp 210. When the banding clamp 210 is fully contracted, its radial location is determined by the depth of the cutout. The depth of the cutout 169 should be such that the outermost point on the inside diameter of the pin joint hole should be tangent with the circumference of the banding groove 168 in the IEP 170 assembly. The lower width of the cutout 169 should be equal to the lower width of the fully contracted banding clamp 210.

The disc spring 212 assembly could stick out beyond the 13-inch diameter of the IEP 170 assembly as long as it does not interfere with the stack containment canister. The hinge connection with the banding 200 (pin joint) should not stick out beyond the diameter of the IEP 170 assembly; doing so would unload the corner of the IEP 170 that contains the banding clamp 210 assembly. The bottom (connecting) plate of the clamp hinge assembly should not contact the bottom of the slot opening in the IEP 170. The ends (connections) of the banding 200 will determine the location of the clamp 210. Multiple locations for connecting the banding 200 to the clamp hinge should be included as part of the hinge and not the end of the banding. Multiple attachment hinge location 218 should be used only if the banding 200 is too long for the overall IEP 170 assembly. Preferably do not need groove 168 around perimeter of IEP assembly 171 for containing the banding. When the banding clamp 210 bottoms out in the cutout 169, the bottoming out contact helps to support the banding clamp 210 and to prevent the banding 200 from deforming the IEP 170 particularly at the edge of the cutout 169.

Tie-Down Clamp

Preferably, the insulation-end piece (IEP) 170 design and the tie-down clamp design are inter-related. The objectives of the tie-down clamps 299 for the 3-bundle stack are similar to those for a complete Turbo Fuel Cell Engine (TFCE) and include the following: hold the stack in contact with the base-plate 92 to avoid loose parts and also to minimize and avoid relative movement between contacting surfaces that are intended to be fixed relative to each other; accommodate thermal growth differences in the vertical direction; provide sufficient vertical clamping force to prevent the bundles 10 from losing contact with the lower end support surfaces (ACR boxes 172, 180 to base-plate 92 and cells 13 to ACR boxes 172, 180) in the event the vehicle were to turn upside down; provide sufficient vertical clamping force on the horizontal gasket 174 underneath the IEPs 170 for acceptable leakage through the controlled leakage gasket seal.

In a preferred embodiment of the present disclosure, the calculated values from the Detailed Conceptual Design Report (DCDR) for a full-scale Turbo Fuel Cell Engine (TFCE) were used for characterizing the operating requirements of the tie-down clamps 299 when scaled to the 3-bundle stack demo: The DCDR bundle weight was 16.9 lb (including ACR box, AFTs, FFTs, fuel box, cells, and cell-to-cell electrical connectors (finger contacts); the corresponding scaled weight of 3 bundles would be 50.7 lb. The stack clamping force under normal operation was 16% greater: 58.8 lb. The cold, pre-load force was 68% greater: 85.2 lb. The start-up load was 134% greater: 118.6 lb.

The cold, pre-load was set to be 68% greater than bundle/stack weight so that there would be 16% greater force remaining after heat-up (during normal operation). The changes being accommodated would be due to thermal expansion differences of the different components affecting the load.

The start-up load was 134% greater than bundle/stack weight as a result of the thermal gradient. During start-up, the stack would be hotter in the center than around the periphery (where the tie-down clamps are located) thereby causing the larger load from the tie-down clamps 299 as a result of the transient thermal expansion differences.

Another Preferred Embodiment of an ACR Box

The Air-Combustion-Recirculation (ACR) box 180 provides the separation of process gases between the air, combustion, and recirculation zones. It has very demanding requirements and preferably: must be free to move laterally relative to the much colder base-plate; must be simple to manufacture; must accommodate effective gasket sealing between zones; must accommodate very high zone-to-zone thermal gradients; the material must be readily bondable to low-cost air feed tubes, and must provide a reliable face seal support for the open ends of the fuel cells.

In a preferred embodiment, the top-end stack clamp and tie-down assembly 299 serves three main functions. First, it must provide a radial clamping force around the top of the stack 22 to keep the bundles 10 located relative to each other.

Second, it needs to maintain a positive contact force between the bottoms of the cells 13 (open ends) and the support structure (ACR boxes 180 and base-plate 92) that the bundles 10 rest on under all conditions. Third, it must be capable of supporting the stack 22 under an overturning condition. Constraints on the design are primarily due to fitting the hardware into the existing engine envelope, minimizing hardware weight, and maintaining adequate strength during hot conditions. The concept relies on an upper (beveled) Inconel clamping ring 300 and interfacing (beveled) upper insulation end pieces (UIEPs) 302 surrounding the top end of the stack 22 (similar to the Insulation-end Pieces (IEPs 170) at the bottom end of the stack 22) and tied to the base-plate 92 with multiple Inconel tie rods 306. Tensioning of the tie rods 306 is accomplished with springs that bear against the bottom of the base plate 92.

Figure 24A:
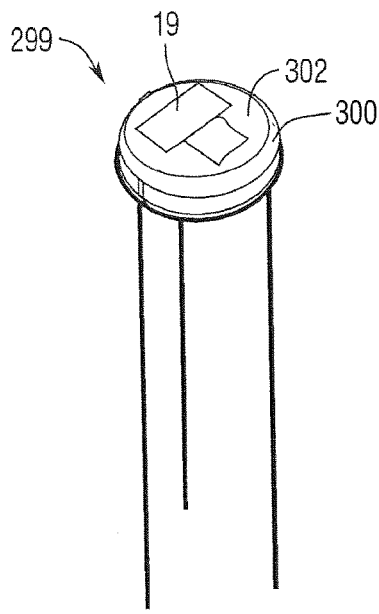
FIG. 24a is a top perspective view of certain components of a preferred top tie down clamp assembly according to the present disclosure.
Figure 24B:
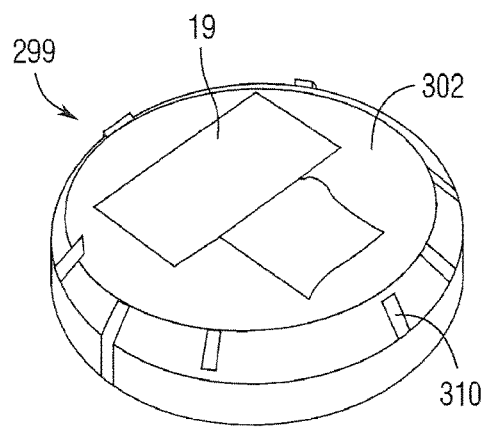
FIG. 24b is a top perspective view of certain components of a preferred top tie down clamp assembly according to the present disclosure.
Figure 24C:
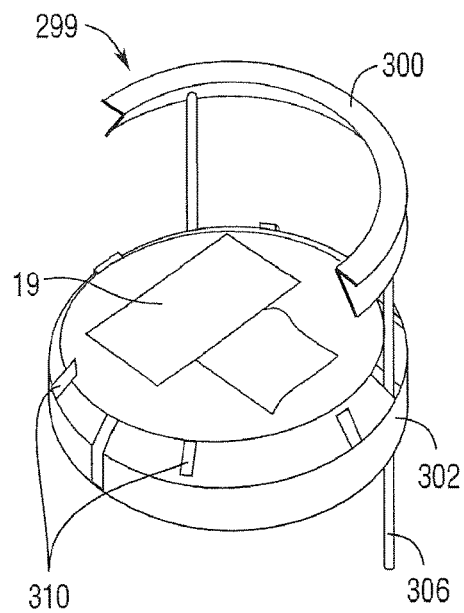
FIG. 24c is a top perspective view of certain components of a preferred top tie down clamp assembly according to the present disclosure.
Figure 25:
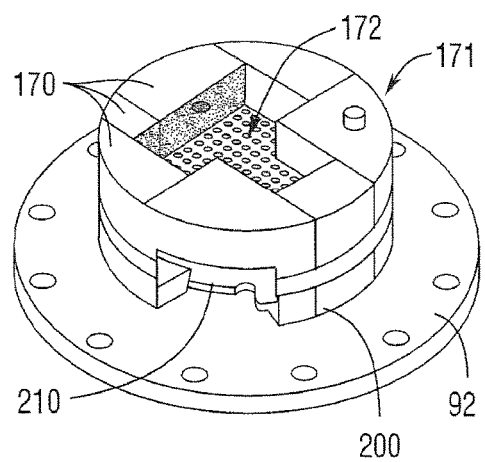
FIG. 25 shows a top perspective view of a preferred insulation end pieces forming a bottom end stack assembly according to the present disclosure.

FIGS. 24a-24c show the top end of the stack 22 consisting of the upper insulation end pieces (UIEPs) 302 (with beveled outer corner) surrounding the three fuel boxes 19 of the corresponding three bundles 10 that make up the 3-bundle stack.

Preferably, the Inconel ring 300 (cross section) with tie-down rods 306 are shown in FIG. 24c; the bottom inner corner of the Inconel ring 300 is beveled to match the bevel on the outer corner of the UIEPs 302.

FIG. 24a shows the Inconel ring 300 pulled down onto the UIEPs 302 to provide the following: Applies positive pressure to cell open ends regardless of engine orientation; Maintains engine integrity in the event of a complete vehicle rollover; Accommodates both radial and axial thermal expansion of the stack 22 while maintaining adequate clamping force.

Figure 23:
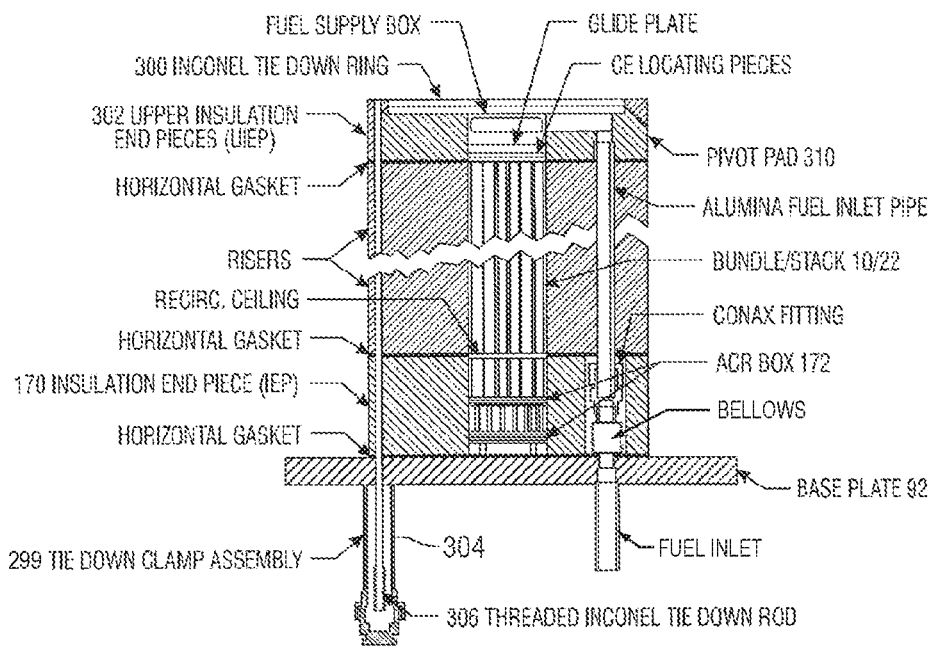
FIG. 23 is a cross-section view of a preferred stack assembly showing a preferred top tie down clamp assembly and components thereof according to the present disclosure.

FIG. 23 provides a cross-section side view of the stack 22 showing the key components pertaining to the design of the tie-down clamp assembly 299. The tie-down clamps 299 provide the required hold-down load on the bundle/stack 10/22 via disc springs 304 that act on the tie-rods 306 (connected to the Inconel ring 300) relative to the base-plate 92. To allow moderately low temperature, the disc springs 304 are located in small containers underneath the base-plate 92. Stacks of disc springs 304 are arranged in series configuration for "low" spring rate in order to accommodate changes in spring deflection due to thermal expansion differences between the Inconel tie-rods 306 and the bundle/stack 10/22 without significant changes in the hold-down load.

Initially, the strength of vacuum formed alumina insulation for the UIEPs 302 was evaluated and compared with the strength of vacuum formed alumina insulation coated with varying percentages of alumina. Alumina coating significantly increases the strength of vacuum formed alumina insulation and also reduces bypass leakage through the insulation.

Testing showed that regardless of the improved insulation strength from higher density and/or alumina-coat application, the beveled Inconel ring 300 would deform the beveled UIEPs 302 until it obtained the proper angle, resulting in reduced load carrying capability and an inability to move freely over the beveled surface.

It was also learned that a difference in surface angle between the beveled UIEPs 302 and the beveled Inconel ring 300 was needed to prevent the Inconel ring 300 from gouging into the UIEPs 302. However, the greater difference in angle tends toward line contact and away from surface contact resulting in increased deformation and reduced load capability. Being able to inherently match the surface angle is highly preferable, but it was not practical to match the angle of the Inconel ring 300 appropriately with the angle of the UIEPs 302.

Figure 27:
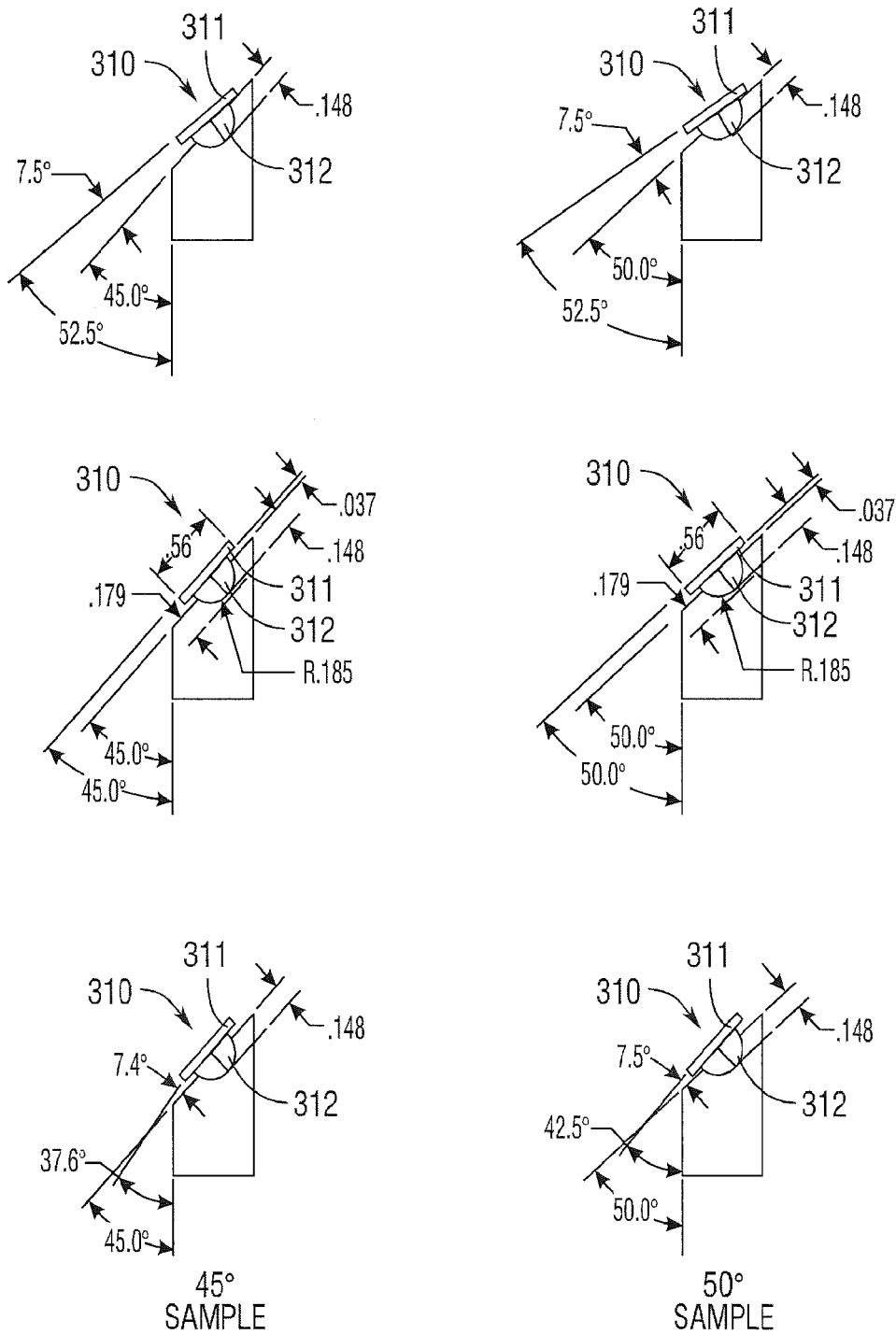
FIG. 27 shows side plan views of a preferred tilt pad assembly for a preferred tie down clamp assembly according to the present disclosure.

The beveled UIEPs 302 were supplemented with a tilt-pad assembly 310 consisting of a small, dense alumina plate 311 integrated with a half-sphere 312 where the spherical surface fits into a properly-sized hole in the UIEP 302 as shown in FIGS. 23, 24b, 24c and 27. The dense alumina plate 311 can tilt in all directions to accommodate the angle of the beveled Inconel ring 300. FIG. 27 showing preferred nominal dimensions for the tilt pad assembly 310.

The tilt pad assembly 310 concept preferably uses a ½" diameter pivot sphere 312 and alumina-coated (nominal 30% coating) AA45 insulation but with no alumina-coat on or in the receptacle hole as it was shown that alumina-coating the receptacle holes did not enhance the effectiveness of the tilt pad assembly 310. Load-deflection tests were used to evaluate the yield strength of relevant test samples for direct application to the tilt pad assembly 310 design. (1) The tilt-pad assembly 310 load from the ½" diameter spherical pivot 312 was being effectively transferred to and throughout the insulation piece 302. (2) Unsupported overhang of the UIEP 302 resulted in significant reduction in load capability. (3) The maximum load capability scales nearly proportional to the cross-sectional area of the spherical indenter (the projected area of the spherical pivot sphere 312 under the tilt pad 311. (4) Individual tilt pad loads up to 200 lb could be accommodated by ½" diameter spherical pivots 312 under the tilt pads 311. (Based on the design of the riser bearing test assembly, this was considered to be well over the design requirement. (5) Individual tilt pad 311 load capability could be increased above 200 lb by increasing the diameter of the spherical pivot 312 under the tilt pads 311. However, doing so would increase the required width of the tilt pads 311. These represent design tradeoffs for evaluation along with the required number of tie-down bolts and spacing between tilt pad assemblies 310.

The clamping ring 300 may become deformed when the clamping preload is applied; this deformation peaks midway between the clamping bolts and is currently estimated at 0.052 inches for the full-sized engine assuming that four clamping bolts are used. It may be necessary to increase the number of tie-down bolts 306 to reduce the span. Reducing the span will increase the stiffness of the assembly and reduce deformation of the ring 300.

The tilt pad 311 is preferably made from dense alumina ceramic. The hemisphere 312 fits into a 0.500 inch (+/−0.003 inches) hole drilled in the beveled surface of the UIEPs 302. The depth of the hole needs to be 0.210 inches (+0.003/−0.000) to the point for the tilt pad 311 to have sufficient range of motion.

Preferably, the shape of the pivot pads 311 is rectangular in contrast to a symmetrical circular disc. The Inconel ring 300 has an inherent arc; it may be close to being flat for very large diameters but it's not flat. The size of the pads 311 is 0.55"×1.0" that is 0.062" thick with generous radii along the edges (~0.032"). The long-lengths of the rectangular pads 311 are installed perpendicular to the tangent of the Inconel ring 300. As a result, each pivot pad 311 has two sliding bearings ("scoots") to accommodate the relative movement between the UIEPs 302 and the beveled Inconel ring 300.

What is claimed is:

1. A support structure for a fuel cell assembly of one or more fuel cell bundles, the support structure comprising:
   one or more insulation end pieces in thermal communication with a top of a fuel cell assembly defining a top assembly, wherein each insulation end piece has a top surface, a side portion, and a beveled portion disposed between the top surface and the side portion to provide a beveled shoulder around the top assembly; and
   a top clamp having a beveled inner surface complementary to the beveled shoulder that interfaces against a plurality of pivot pads disposed on the beveled shoulder when the top clamp is tensioned against the top assembly wherein each of the plurality of pivot pads comprise an upper plate and a half sphere connected to the bottom thereof.

2. The support structure of claim 1 wherein the top clamp is configured to be tensioned against the top assembly by a plurality of tie rods attached to the top clamp and releasably secured to a base plate.

3. The support structure of claim 1 wherein the top clamp comprises a clamping ring, the top assembly is generally cylindrically-shaped, and the beveled shoulder is annular.

4. The support structure of claim 1 wherein the upper plate is rectangular.

5. The support structure of claim 1 wherein the upper plate is circular.

6. The support structure of claim 1 wherein the half sphere of each of the plurality of pivot pads is disposed in a respective hole defined by the beveled shoulder.

7. The support structure of claim 6 wherein the holes in the beveled shoulder for receiving the respective half sphere of each of the plurality of pivot pads is generally half spherically-shaped to allow for the pivot pad to tilt in all directions to accommodate the angle of the inner beveled surface of the clamping ring.

8. The support structure of claim 7 wherein each pivot pad comprises a ceramic.

9. The support structure of claim 7 wherein the long-lengths of the rectangular plates are installed perpendicular to a tangent of the clamping ring.

10. The support structure of claim 7 wherein the edges of the rectangular plates are radiused.

11. The support structure of claim 7 wherein the clamping ring defines an arc across its diameter.

12. The support structure of claim 1 wherein the support structure comprises:
   a base plate; and
   a plurality of lower insulation end pieces disposed on the base plate and surrounding the lower ends of a fuel cell bundle to provide a uniform circular outer shape.

13. The support structure of claim 12 wherein each lower insulation end piece is made of alumina.

14. The support structure of claim 12 further comprising ceramic paper disposed between adjacent lower insulation end pieces.

15. The support structure of claim 12 further comprising a band and clamping mechanism to secure together the lower insulation end pieces and a bottom assembly.

16. The support structure of claim 12 wherein one of the lower insulation end pieces defines an outer cavity in which a clamping mechanism is disposed.

17. The support structure of claim 12 wherein one or more of the lower insulation end pieces define apertures for one or more of a power lead bar, a tie down rod, an exhaust port, a gas recirculation port, a shear pin, a fuel inlet line, and an instrumentation port.

18. The support structure of claim 12 further comprising ceramic paper disposed between the lower insulation end pieces and the base plate.

* * * * *